(12) United States Patent
Guzik

(10) Patent No.: US 10,419,722 B2
(45) Date of Patent: Sep. 17, 2019

(54) CORRELATED MEDIA SOURCE MANAGEMENT AND RESPONSE CONTROL

(75) Inventor: Thomas Guzik, Edina, MN (US)

(73) Assignees: WHP Workflow Solutions, Inc., North Charleston, SC (US); Getac Technology Corporation, Taipei (TW)

( * ) Notice: Subject to any disclaimer, the term of this patent is extended or adjusted under 35 U.S.C. 154(b) by 677 days.

(21) Appl. No.: 12/894,698

(22) Filed: Sep. 30, 2010

(65) Prior Publication Data

US 2011/0018998 A1   Jan. 27, 2011

Related U.S. Application Data

(63) Continuation-in-part of application No. 12/637,685, filed on Dec. 14, 2009, now Pat. No. 8,311,983.

(Continued)

(51) Int. Cl.

| | |
|---|---|
| H04N 7/18 | (2006.01) |
| H04N 21/21 | (2011.01) |
| H04N 21/23 | (2011.01) |
| H04L 29/06 | (2006.01) |
| H04W 4/80 | (2018.01) |
| G06K 9/00 | (2006.01) |
| H04L 29/08 | (2006.01) |
| H04W 4/02 | (2018.01) |
| H04W 84/12 | (2009.01) |

(52) U.S. Cl.
CPC .......... *H04N 7/18* (2013.01); *G06K 9/00221* (2013.01); *H04L 65/605* (2013.01); *H04L 65/80* (2013.01); *H04L 67/06* (2013.01); *H04L 67/1074* (2013.01); *H04N 21/21* (2013.01); *H04N 21/23* (2013.01); *H04W 4/02* (2013.01); *H04W 4/80* (2018.02); *H04W 84/12* (2013.01)

(58) Field of Classification Search
USPC .......................... 348/143, E07.085; 340/540
See application file for complete search history.

(56) References Cited

U.S. PATENT DOCUMENTS 5,877,756 A   3/1999   Um
6,157,880 A   12/2000   Mersseman et al.
(Continued)

FOREIGN PATENT DOCUMENTS

EP   1550968 A1   7/2005
KR   20110098531   9/2011
(Continued)

OTHER PUBLICATIONS

Final Office Action for U.S. Appl. No. 12/637,685, dated Mar. 27, 2012, Thomas Guzik, "Correlated Media for Distributed Sources", 21 pages.

(Continued)

*Primary Examiner* — Christopher S Kelley
*Assistant Examiner* — Ana Picon-Feliciano
(74) *Attorney, Agent, or Firm* — Han Santos, PLLC

(57) ABSTRACT

Response personnel may be dispatched based on nature of the data assets received. A data asset that is captured by a user device is received, the data asset includes capture time and date data. The data asset is reviewed for an event that warrants dispatch of a responder. The responder is dispatched to the location of the event when the capture time and date data indicates the event occurred within a predetermined time of a current time.

15 Claims, 18 Drawing Sheets

Related U.S. Application Data

(60) Provisional application No. 61/173,459, filed on Apr. 28, 2009.

(56) References Cited

U.S. PATENT DOCUMENTS

| | | | |
|---|---|---|---|
| 6,529,484 B1 | 3/2003 | Quinquis et al. | |
| 6,975,346 B2 | 12/2005 | Kumhyr | |
| 7,046,273 B2 | 5/2006 | Suzuki | |
| 7,047,359 B1 | 5/2006 | Krevelen et al. | |
| 7,091,852 B2 | 8/2006 | Mason et al. | |
| 7,171,567 B1 | 1/2007 | Bayer et al. | |
| 7,173,526 B1* | 2/2007 | Monroe | 340/521 |
| 7,302,481 B1* | 11/2007 | Wilson | H04L 63/0281 709/224 |
| 7,460,521 B2 | 12/2008 | Son | |
| 7,612,680 B2 | 11/2009 | Eubank et al. | |
| 7,782,363 B2 | 8/2010 | Ortiz | |
| 7,872,593 B1 | 1/2011 | Rauscher et al. | |
| 7,917,617 B1 | 3/2011 | Ponnapur et al. | |
| 7,925,284 B2 | 4/2011 | Stubbs | |
| 8,065,325 B2 | 11/2011 | Crossley et al. | |
| 8,645,579 B2 | 2/2014 | Young et al. | |
| 8,665,087 B2 | 3/2014 | Greene et al. | |
| 8,818,829 B2 | 8/2014 | Delia et al. | |
| 9,374,460 B2 | 6/2016 | Nath et al. | |
| 2001/0005889 A1 | 6/2001 | Albrecht | |
| 2002/0188522 A1* | 12/2002 | McCall | G06Q 30/0613 705/26.41 |
| 2003/0020816 A1 | 1/2003 | Hunter et al. | |
| 2003/0085989 A1 | 5/2003 | Tay | |
| 2003/0217287 A1 | 11/2003 | Kruglenko | |
| 2004/0002188 A1 | 1/2004 | Chung | |
| 2004/0021888 A1 | 2/2004 | Chang | |
| 2004/0024644 A1* | 2/2004 | Gui et al. | 705/22 |
| 2004/0051741 A1 | 3/2004 | Venturino | |
| 2004/0101178 A1* | 5/2004 | Fedorovskaya et al. | 382/128 |
| 2004/0126038 A1 | 7/2004 | Aublant et al. | |
| 2004/0146272 A1 | 7/2004 | Kessel et al. | |
| 2004/0155960 A1* | 8/2004 | Wren et al. | 348/150 |
| 2004/0217884 A1 | 11/2004 | Samadani et al. | |
| 2004/0263314 A1 | 12/2004 | Dorai et al. | |
| 2005/0054381 A1 | 3/2005 | Lee et al. | |
| 2005/0073575 A1 | 4/2005 | Thacher et al. | |
| 2005/0080800 A1 | 4/2005 | Parupudi et al. | |
| 2005/0101334 A1 | 5/2005 | Brown et al. | |
| 2005/0118983 A1 | 6/2005 | Camp | |
| 2005/0132348 A1 | 6/2005 | Meulemans et al. | |
| 2005/0168574 A1* | 8/2005 | Lipton et al. | 348/143 |
| 2005/0216193 A1 | 9/2005 | Dorfman et al. | |
| 2005/0258942 A1 | 11/2005 | Manasseh et al. | |
| 2005/0278703 A1 | 12/2005 | Lo et al. | |
| 2006/0004579 A1* | 1/2006 | Claudatos | G08B 13/1672 704/270 |
| 2006/0072014 A1* | 4/2006 | Geng et al. | 348/159 |
| 2006/0092043 A1 | 5/2006 | Lagassey | |
| 2006/0182055 A1* | 8/2006 | Coffee | H04L 67/04 370/328 |
| 2006/0224797 A1* | 10/2006 | Parish et al. | 710/62 |
| 2006/0234758 A1 | 10/2006 | Parupudi et al. | |
| 2006/0274829 A1* | 12/2006 | Siemens et al. | 375/240.01 |
| 2007/0033265 A1 | 2/2007 | Anderson et al. | |
| 2007/0173266 A1 | 7/2007 | Barnes, Jr. | |
| 2007/0177606 A1 | 8/2007 | Jabri et al. | |
| 2007/0177616 A1 | 8/2007 | Jabri et al. | |
| 2007/0201391 A1 | 8/2007 | Belmonte et al. | |
| 2007/0208776 A1 | 9/2007 | Perry et al. | |
| 2007/0255618 A1 | 11/2007 | Meerbergen et al. | |
| 2007/0268367 A1* | 11/2007 | Agmon | 348/143 |
| 2007/0268392 A1 | 11/2007 | Paalasmaa et al. | |
| 2007/0291303 A1 | 12/2007 | Tanaka et al. | |
| 2008/0005116 A1 | 1/2008 | Uno | |
| 2008/0020803 A1 | 1/2008 | Rios et al. | |
| 2008/0031426 A1 | 2/2008 | Weeks | |
| 2008/0032739 A1* | 2/2008 | Hoodbhoy et al. | 455/556.2 |
| 2008/0052628 A1* | 2/2008 | Bugenhagen et al. | 715/736 |
| 2008/0059989 A1 | 3/2008 | O'Connor et al. | |
| 2008/0182587 A1 | 7/2008 | Bennett | |
| 2008/0187181 A1 | 8/2008 | Meadow et al. | |
| 2008/0189789 A1 | 8/2008 | Lamontagne | |
| 2008/0207137 A1 | 8/2008 | Maharajh et al. | |
| 2008/0209067 A1* | 8/2008 | John et al. | 709/231 |
| 2008/0218335 A1 | 9/2008 | Attar | |
| 2008/0231460 A1 | 9/2008 | Owen et al. | |
| 2008/0250328 A1 | 10/2008 | Konttinen | |
| 2008/0252485 A1 | 10/2008 | Lagassey | |
| 2008/0280637 A1 | 11/2008 | Shaffer et al. | |
| 2008/0301757 A1 | 12/2008 | Demarest et al. | |
| 2008/0303902 A1* | 12/2008 | Romer et al. | 348/143 |
| 2009/0002157 A1* | 1/2009 | Donovan et al. | 340/540 |
| 2009/0006336 A1 | 1/2009 | Forstall et al. | |
| 2009/0015672 A1* | 1/2009 | Clapp | G06F 17/30796 348/143 |
| 2009/0049004 A1 | 2/2009 | Nurminen et al. | |
| 2009/0054029 A1* | 2/2009 | Hogberg | H04L 41/5006 455/404.2 |
| 2009/0063419 A1* | 3/2009 | Nurminen | G06F 17/30206 |
| 2009/0067586 A1* | 3/2009 | Fano | H04M 3/51 379/49 |
| 2009/0070761 A1 | 3/2009 | Zhao | |
| 2009/0083121 A1* | 3/2009 | Angell et al. | 705/10 |
| 2009/0087161 A1 | 4/2009 | Roberts et al. | |
| 2009/0089294 A1 | 4/2009 | Davis et al. | |
| 2009/0094527 A1 | 4/2009 | Parupudi et al. | |
| 2009/0186596 A1 | 7/2009 | Kaltsukis | |
| 2009/0204885 A1* | 8/2009 | Ellsworth | G06F 17/30044 715/234 |
| 2009/0207852 A1 | 8/2009 | Greene et al. | |
| 2009/0252134 A1* | 10/2009 | Schlicht | H04L 1/0015 370/338 |
| 2009/0280784 A1 | 11/2009 | Mousseau et al. | |
| 2009/0284348 A1* | 11/2009 | Pfeffer | G08B 25/006 340/7.3 |
| 2009/0322874 A1 | 12/2009 | Knutson et al. | |
| 2010/0009700 A1 | 1/2010 | Camp, Jr. et al. | |
| 2010/0058049 A1 | 3/2010 | Fein et al. | |
| 2010/0090827 A1 | 4/2010 | Gehrke et al. | |
| 2010/0157061 A1 | 6/2010 | Katsman et al. | |
| 2010/0182145 A1 | 7/2010 | Ungari | |
| 2010/0207787 A1 | 8/2010 | Catten et al. | |
| 2010/0211575 A1 | 8/2010 | Collins et al. | |
| 2010/0231714 A1 | 9/2010 | Flores et al. | |
| 2010/0274816 A1 | 10/2010 | Guzik | |
| 2010/0321183 A1* | 12/2010 | Donovan | G08B 13/19645 340/540 |
| 2010/0332131 A1 | 12/2010 | Horvitz et al. | |
| 2011/0018998 A1 | 1/2011 | Guzik | |
| 2011/0060520 A1 | 3/2011 | Heo et al. | |
| 2011/0069172 A1 | 3/2011 | Hazzani | |
| 2011/0227728 A1 | 9/2011 | Mathis | |
| 2011/0302130 A1 | 12/2011 | Lee et al. | |
| 2012/0042162 A1 | 2/2012 | Anglin et al. | |
| 2012/0110135 A1 | 5/2012 | Sparks | |
| 2012/0203742 A1 | 8/2012 | Goodman et al. | |
| 2012/0303736 A1 | 11/2012 | Novotny et al. | |
| 2014/0096134 A1 | 4/2014 | Barak et al. | |
| 2014/0237016 A1 | 8/2014 | Diwakar | |
| 2015/0381736 A1 | 12/2015 | Seltzer et al. | |

FOREIGN PATENT DOCUMENTS

| | | |
|---|---|---|
| WO | WO2004042673 | 5/2004 |
| WO | WO2007082166 | 7/2007 |
| WO | WO 2008008448 A2 * | 1/2008 |
| WO | 2008045003 A1 | 4/2008 |

OTHER PUBLICATIONS

Extended European Search Report dated Apr. 19, 2013 for European patent application No. 09844205.6, 13 pages.

Office action for U.S. Appl. No. 13/646,677, dated Jul. 31, 2013, Guzik, "Correlated Media for Distributed Sources", 5 pages.

(56) References Cited

OTHER PUBLICATIONS

PCT Search Report dated Feb. 28, 2013 for PCT application No. PCT/US12/60521, 13 pages.
U.S. Appl. No. 12/637,685—Non Final Office Action dated Sep. 26, 2011, 19 pages.
U.S. Appl. No. 12/637,685—Notice Of Allowance dated Jul. 5, 2012, 11 pages.
EP09844205.6—Rule 70(2) dated May 8, 2013, 1 pages.
U.S. Appl. No. 13/646,677—Final Office Action dated Jul. 18, 2014, 17 pages.
U.S. Appl. No. 13/646,677—Non Final Office Action dated Apr. 28, 2015, 15 pages.
U.S. Appl. No. 13/653,372—Restriction Requirement dated Aug. 19, 2014, 5 pages.
U.S. Appl. No. 13/653,372—Non Final Office Action dated Oct. 22, 2014, 21 pages.
U.S. Appl. No. 13/653,372—Final Office Action dated Mar. 12, 2015, 25 pages.
Notice of Allowance dated Sep. 23, 2015, for U.S. Appl. No. 13/646,677, 15 pages.
Non-Final Office Action dated Jun. 29, 2015, for U.S. Appl. No. 13/653,372, 29 pages.
Final Office Action dated Dec. 21, 2015, for U.S. Appl. No. 13/653,372, 30 pages.
Non-Final Office Action dated May 18, 2016, for U.S. Appl. No. 13/653,372, 29 pages.
Final Office Action dated Oct. 18, 2016, for U.S. Appl. No. 13/653,372, 34 pages.
Esri, "Public Safety and Homeland Security Situational Awareness," Feb. 2008.
V. Ghini et al., "Mobile E-Witness," Jul. 19, 2007.
Non-Final Office Action dated Mar. 6, 2017, for U.S. Appl. No. 13/653,372, 36 pages.
International Search Report & Written Opinion dated Oct. 24, 2017 for PCT Application No. PCT/US2017/039908, 11 pages.
Final Office Action for U.S. Appl. No. 14/826,140, dated Apr. 3, 2018, 40 pages.
Non-Final Office Action for U.S. Appl. No. 14/826,140, dated Jan. 24, 2018, 50 pages.
CA 2,759,871 Office Action dated Sep. 23, 2013, 3 pages.
U.S. Appl. No. 14/826,140, Office Action dated Sep. 5, 2018, 28 pages.
U.S. Appl. No. 15/197,709, Office Action dated Mar. 4, 2019, 16 pages.

* cited by examiner

CORRELATED MEDIA SOURCE MANAGEMENT AND RESPONSE CONTROL

This patent application is a continuation-in-part application of co-pending, commonly-owned U.S. patent application Ser. No. 12/637,685, entitled "Correlated Media for Distributed Sources", filed on Dec. 14, 2009, which claims priority to U.S. provisional patent application Ser. No. 61/173,459 filed on Apr. 28, 2009.

TECHNICAL FIELD OF THE SUBJECT MATTER

This subject matter of the present application relates to aggregating and correlating distributed media.

BACKGROUND OF THE SUBJECT MATTER

Media data comes in many forms including, but not limited to, video, audio, still images, and text. Presently, media data is captured, that is recorded, and stored on a storage media that is dependent on the form of media data. For example, video is captured by video cameras, audio is captured via microphone and recorders, and still images are captured by cameras.

Currently, video cameras and digital recorders are used for a wide range of applications. While the use of video cameras and digital recorders is typically associated with personal events. There are many applications of the use such devices for commercial purposes including security and surveillance. For example, police car video cameras are used to record stop encounters.

As described above, more than one form of media may be used to capture an event. For example, a security camera and a digital audio recorder may capture both video and audio data respectively from a crime scene. Afterwards, a police officer or security supervisor may add text captions to the video using computer-based software or on-camera functions. Combining different forms of media for presentation is termed multimedia, and accordingly there may be multimedia capture of security events and crime scenes.

Presently, captured media is most commonly stored as digital data, thereby becoming a data asset. Digital data assets may be streamed to users or consuming devices in real time, or may be captured and later transported as a file for streaming.

The consumer electronics revolution has made digital video cameras, digital still cameras, and digital recorders ubiquitous. Accordingly, commoditized video cameras and digital recorders have become available for security applications. Digitization and miniaturization has led to the production of video cameras that can fit in a mobile phone with ever improving resolution. Further, the advent of commoditized compact memory has enabled large amounts of video data to be stored in such devices, in a cost effective manner. As of this writing, 16 gigabytes (GB) of storage space can store 40 hours of video data with average resolution. Accordingly, large amounts of digital data assets may be captured from many different sources and in many different media. Furthermore, the individuals that capture a security event or crime scene with a camera or recorder need not necessarily be related. For example, at a crime scene, there may be surveillance cameras that were stationed in the area long before the scene; there may be police officers with mobile cameras and recorders, and another police officer taking still shots with a digital camera.

With the Internet, digital data assets may be shared in both in edited and non-edited form. In the past, files were shared simply by transferring peer-to-peer, such as e-mailing files or uploading to a LAN based server. Later, digital data assets were posted and distributed via web pages via internet protocols. Currently police officers and security personnel can post and distribute digital data assets to a centralized location via web services, with facilities to search and tag on posted assets. In this way, different recordings of the same crime scene might be aggregated to help solve a crime case, regardless of who originally captured or uploaded the digital asset.

In general, there is presently a critical mass of digital data assets that can be correlated and combined together. For example, panoramic software can stitch together different still photos taken at the same time of the same event and result into a single photo. Different video and audio feeds may be mixed together to make a composite rendering. However, such efforts are typically manual in nature and use relatively short media clips.

At present, automating the correlation and combination of multimedia of relatively large long data assets, such as those hundreds or thousands of hours in length is not done. Moreover, recording metadata to aid in correlating the data assets with other data assets is not presently done. Finally, using such correlating metadata to automate correlations of data assets into a combination presentation is not presently done.

SUMMARY OF THE SUBJECT MATTER

The embodiments described herein relate to a comprehensive system to capture and store data assets, associate correlating metadata, share data assets in either a peer to peer manner or via a web service or equivalent, retrieve data assets, and present data assets either singularly or in various combinations. Embodiments herein may further analyze the data assets to effectuate responses to events or incidents captured in the data assets.

In at least one embodiment, response personnel may be dispatched based on nature of the data assets received. A data asset that is captured by a user device is received, the data asset includes capture time and date data. The data asset is reviewed for an event that warrants dispatch of a responder. The responder is dispatched to the location of the event when the capture time and date data indicates the event occurred within a predetermined time of a current time.

In additional embodiments, a quantitative parameter of a mobile client may be determined. Accordingly, the mobile device may transmit full-motion video and full-quality audio captured by the mobile client, along with metadata generated at the mobile device, to a recipient device when the quantitative parameter does not reach a threshold However, when the quantitative parameter does reach the threshold, the mobile device may transmit at least one still shot and the full-quality audio captured by the mobile client along with the metadata to the recipient device.

In further embodiments, one or more parameters related to the transmission of a video input from a capture device to a recipient device may be determined. As a result, the video input may be transmitted as full-motion video or at least one still shot from the capture device to the recipient device based on the one or more parameters.

BRIEF DESCRIPTION OF THE DRAWINGS

Non-limiting and non-exhaustive examples are described with reference to the following figures. In the figures, the left-most digit(s) of a reference number identifies the Fig. in which the reference number first appears. The use of the same reference numbers in different figures indicates similar or identical items or features.

DETAILED DESCRIPTION OF THE PREFERRED EMBODIMENT

Combining and Correlating Digital Data Assets

Figure 1:
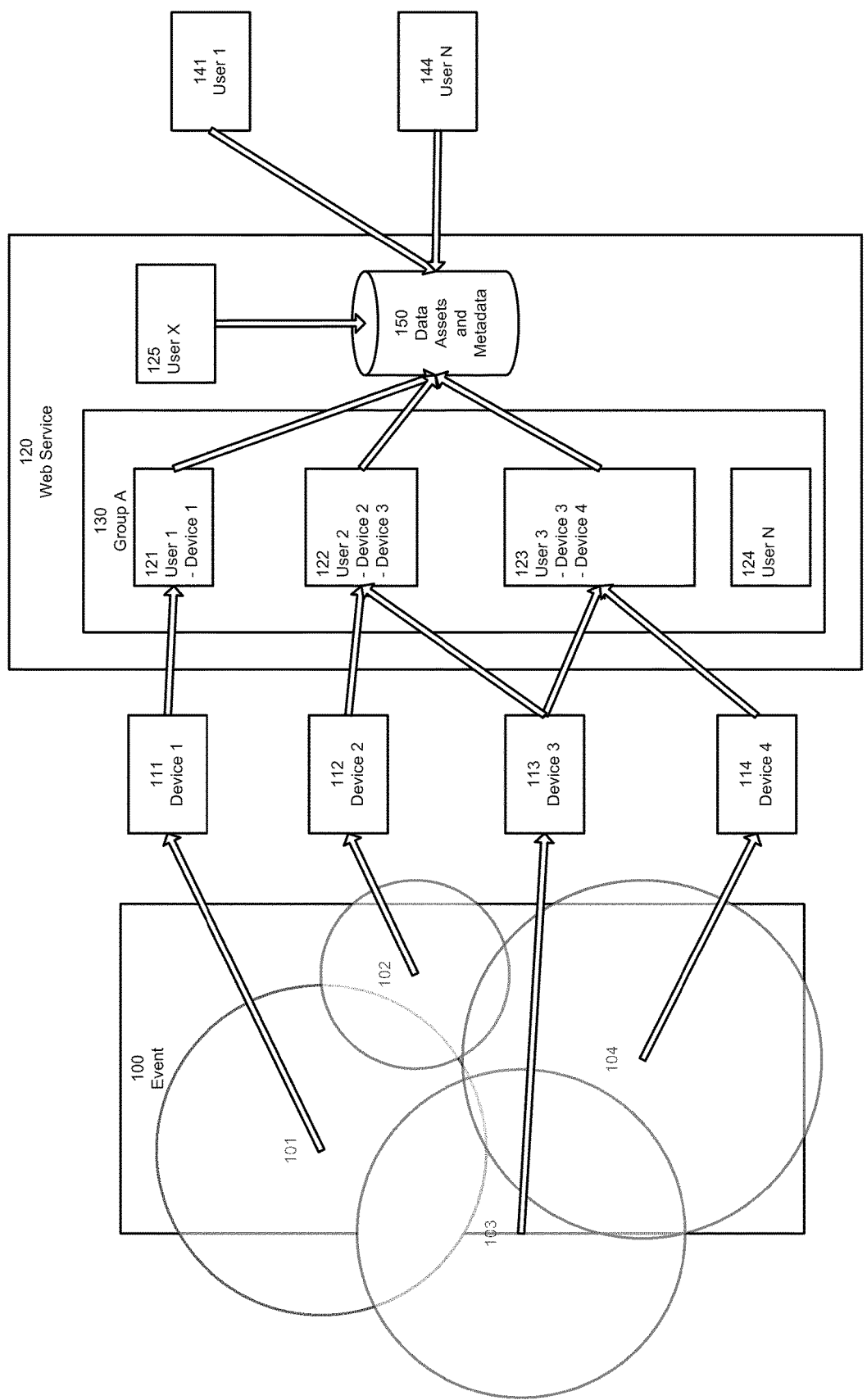
FIG. 1 is a diagrammatic illustration showing individual actors, hardware, and software in a web service embodiment of correlating media for distributed services.

The embodiments described herein pertain to methods, systems, and apparatuses for capturing digital media as data assets, associating correlating metadata with those assets, and retrieving and correlating data assets at least partially based on the correlating metadata. In this way, the task of correlating disparate data assets into a coherent combination may be automated.

There are many different types of combinations of data assets. Such combinations may be of similar media, as in making a panoramic composite photo by stitching together different digital photos. Further, such combinations may be of different media, such as adding a custom audio track to a video. Such combinations may even be of the same context, such as providing different views of the same police, fire and/or security incident. In extreme situations, different contexts may be combined such as with a mashup. Such combinations need not be composites and may be presented as various different correlated media assets displayed side by side, or as combined into an integrated whole.

To support automating such a varied range of combination presentations, the embodiments described herein allow a rich range of correlating metadata to be associated with a data asset. When two or more data assets are to be combined, as a composite or otherwise, the metadata may provide a referent by which each data asset may be correlated. Common metadata may includes, but is not limited to, date/time stamp and location metadata.

For example, a video clip may have date/time information stored for each frame, and an audio clip may have date/time information stored for each track segment. The video clip and the audio clip may be combined into a multimedia presentation by correlating the date/time stamps of the two files. In this case the correlation is a synchronizing of the two files and the presentation is a composite of the two files. Of course, the number of such files that may be so combined is not limited to just two.

Correlation can be based on multiple metadata values. For example, multiple still photos might be stored not only with date/time stamp metadata, but also with location metadata, possibly from a global positioning satellite (GPS) stamp. A software tool that collects all stored still photos taken within a window of time, for example during a security or police response to a crime incident, and close to the scene of a crime, may combine the photos of the incident into a sequence of pictures with which for investigation purposes. Here the correlation is both by time and location, and the presentation is a non-composite simultaneous display of different data assets.

Correlating metadata can be based on a set of custom fields. For example, a set of video clips may be tagged with an incident name. Consider three field police officers each in a different city and in a different time zone, recording videos and taking pictures at exactly at midnight on New Year's Day 2013. Each officer might tag their videos and their still photos with "New Year's Day 2013 Security Watch". A software tool may collect all stored videos with that tag, and may further provide a presentation rotating between the videos and photos for the event. Here the correlation is made using a custom tag, is not specific either to time or location, and is a non-composite display of different data assets.

This degree of flexibility means that correlations can be both by absolute referent and by relative referent. Most incidents occur at an absolute time and location, and incidents may occur at different locations (such as a bank robbery occurring at a bank, and a breaking and entering at a power main to shut off the power to enable the robbery). Another example would be the security of an event over multiple locations such as the election or Olympics which are held at different venues in a city or different cities. In other situations, incidents, such as a high speed chase may span multiple counties. The above is a correlating example of synchronizing video and audio by means of a relative referent, whereby the time stamp need not be of absolute time, but could potentially be synchronized to the beginning of the data clips. The above example of the New Year's Day event is an extreme example of correlating by a relative referent. The "New Year's Day 2013 Security" tag is arbitrary, and correlates data assets without regard to traditionally absolute referents of date/time and location. This example is also known as date/time shifting and location shifting.

Exemplary Platform for Correlating and Combining Data Assets

Figure 2:
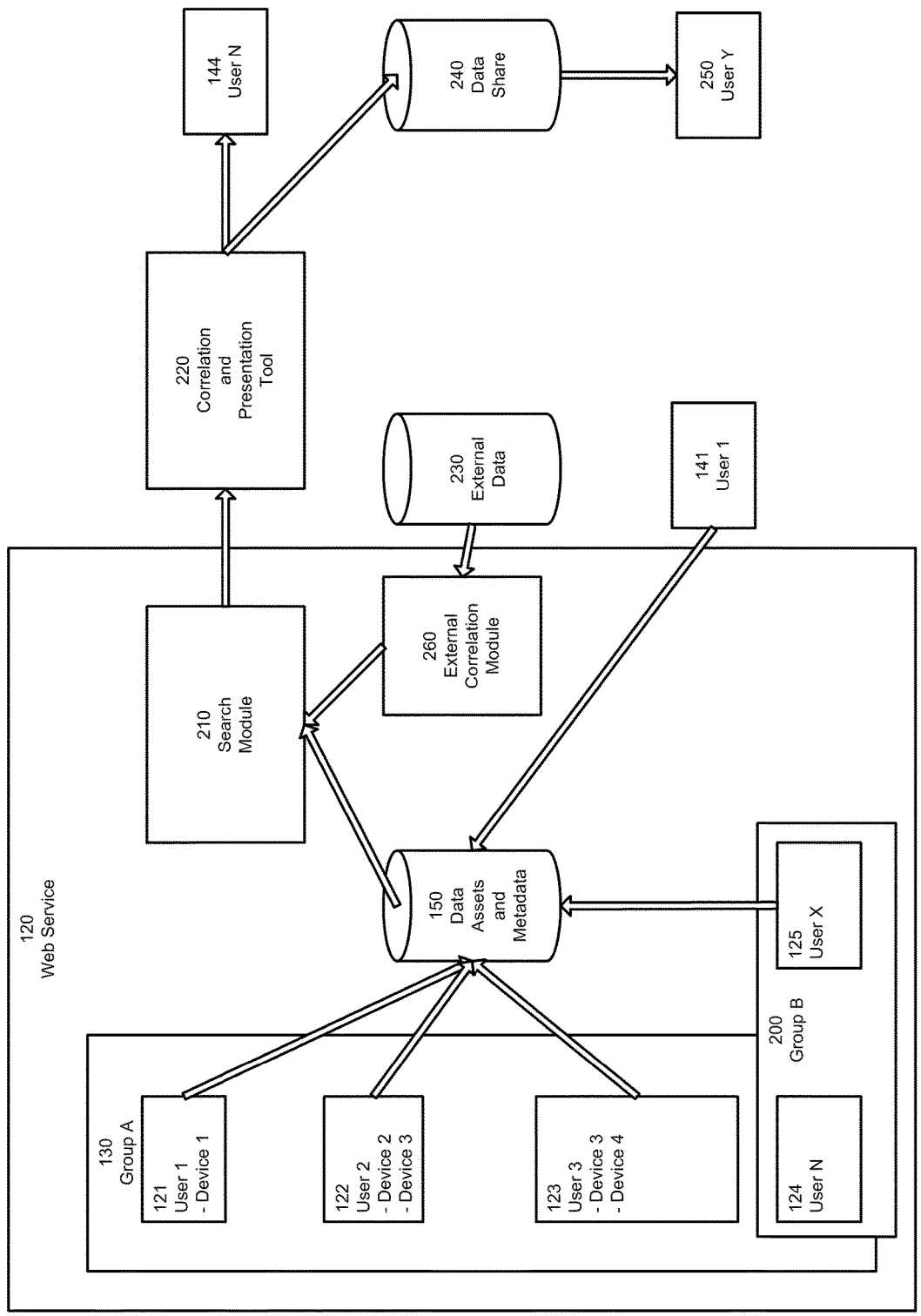
FIG. 2 is a diagrammatic illustration showing individual actors, hardware, and software for sharing and correlating data assets in accordance with a web service embodiment of correlating media for distributed services.

FIGS. 1 and 2 illustrate an exemplary platform for correlating and combining data. FIG. 1 illustrates capture of data. FIG. 2 illustrates presentation of data.

In this exemplary platform, event 100 is to be captured by recording devices 111-114 each of which is to capture some part of event 100 as represented by scopes 101-104, respectively. The data captured by the respective scopes 101-104 may be uploaded in the form of files to a web service 120 by users with accounts 121-123 that can transfer files from their respective devices 111-114. The web service 120 groups users into groups, e.g., users with accounts 121-124 belong to group 130. Note that device 113 can be associated with multiple user accounts 122 and 123. Note that the user with account 124 does not have a device but can still participate in a group. The users thus organized can store the data assets into a central storage 150. The user with account 125 which does not belong to group 130 may potentially belong to any number of other groups on the web service, or alternatively may join group 130. The user with account 125 may have devices (not shown) and upload to the central storage 150. Users 141 and 144, with accounts 121 and 124 respectively, may log on later to tag, comment, annotate, or otherwise associate metadata with the uploaded files. The following discussion describes this configuration in more detail.

Event 100 may represent the capture of any set of media data. Usually an event consists of a discrete real-world event such as a crime incident. However, some users may wish to combine different events in different locales and time zones. These different events may not even have any context in common, save for a user's preferences. For example, a police supervisor may be looking for patterns of assaults in a jurisdiction. Each individual assault was perpetrated independently, but studying the aggregate data, the police supervisor may detect areas of high risk.

An event can be captured by one of many commonly available devices 111-114. Exemplary devices include, but are not limited to, video cameras, digital audio recorders, or digital still cameras. Another example of a recording device might be a laptop that stores GPS samples or other location service samples to track location. Devices 111-114 may record data in analog format but then convert the data to digital format later for sharing. Devices 111-114 may further have the capability of capturing different types of media at the same time. For example, a video recorder usually captures video and audio at the same time. Alternatively, many digital cameras support both video and still modes of capture. Notwithstanding the many features of present day devices, usually a single device at best can only capture a subset of an event as represented by scopes 101-104. Each scope only covers a subset, but a combination of the scopes may provide a more complete capture of the event.

Devices 111-114 may generally store captured media either as files or stream the captured media to a remote device that will persist the data. Eventually the captured media may be stored as a digital data asset, usually as a file. In the alternative, data may be persisted on analog tape.

Devices 111-114 may have the ability to associate metadata either before capture or at time of capture. For example the respective devices may provide for a user to provide a default tag for all files such as camera identifier (ID). During capture, the respective devices may store data/time stamp information or location service tracking location data such as GPS with the file.

An example of a default tag associated before time of capture is an Event ID (also called a Pounce™ ID) that may be used to indicate which files are candidates for correlating for an event. Generally an Event ID corresponds to a unique event. The end to end process is discussed in the context of FIG. 4. Metadata association is discussed in more detail below in the context of FIG. 5.

In the exemplary platform in FIG. 1, each device 111-114 belongs to at least one user (not shown), and each user has an account 121-123. In the case where data is being shared peer to peer, accounts may not be necessary since devices 111-114 may access each other without the need for intermediate storage and because the user is operating only one device. However, in the FIG. 1 exemplary platform, note that the user associated with account 123 is operating both devices 113 and 114. Further note that devices 111-114 need not have been operated at the same time. For example, a user might record video in a police car on a device for an incident and on a separate device record video and/or audio that may or may not begin or end at the same time.

Accounts 121-124 may be aggregated on web service as 120 as a group 130. As a default, a group may be identified to include all users with data files with the same Event ID. A group may also be either a predefined or a self selecting group, for example a set belonging to a security agency, or a set of all police officers belonging to the homicide division, or even a set of officers seeking to share data regardless if they bellowing to an organized or unorganized group. A group may also be related to some other grouping external from the web service, e.g., a law enforcement Case ID seeking all data assets that might have captured an event such as a crime in progress.

In this exemplary platform, users with accounts associated with devices 111-114 then may upload files to central storage 150. Users may belong to zero, one, or more groups. An example of where a user belongs to zero groups is includes a user having initially established an account, although an alternative embodiment may include a user creating a default group. An example of a user belonging to multiple groups includes a video file belonging both to a group to capture a security event and to a group showing what other security personnel were doing on a given day.

Users with accounts in a group may also have the ability to add metadata after capture of the media data. As illustrated by users 141 and 144, adding metadata may include, but is not limited to, commenting on files by manually adding meta data or by automation, such as tagging, which may be performed via software tools and by scripting.

Users with accounts are not limited to associating data assets with metadata. Users with accounts in a group also have the ability to edit the data assets directly. For example, a still photo may be uploaded and later cropped using a digital photo editor. The editor may be provided as on-line tool as part of the web service or, alternatively, may be provided as desktop software by which the user may download the file, edit, and re-upload the edited file.

User account 124 pertains to a user who is not associated with a device. In general, user accounts may be associated with zero, one, or more devices. Because users can add metadata after capture, a user may still participate in a group without being responsible for providing data assets to the group. This is a common scenario for master editors as well as mixers who use data assets as samples.

In this exemplary platform embodiment, the result is a central store 150 of data assets that have been associated with correlating metadata from before, during, and after time of capture. At least some subset of the metadata may be used for correlation.

FIG. 2 includes references to features first introduced with reference to FIG. 1 to continue discussion of this exemplary platform embodiment. Central store 150 may be accessed by external users for metadata inclusion and final presentation. An external user 144 may access correlation and presentation tool 220 that translates user 144's operation into a query performed by search module 210. At least some of the query criteria may be based on correlating metadata. The search module 210 may retrieve data assets, from central store 150, that match the criteria of the query. Additionally the search module 210 may retrieve external data sources. The search module 210 may forward query criteria to an external correlation module 260, which retrieves data assets from an external data store 230 and associates the necessary correlation metadata with the data assets. Examples of external data include, but are not limited to, map data and to advertising data. External data may be retrieved by the search module 210 along with data assets from central store 150. The search module 210 may then return the combined data to the correlation and presentation tool 220. Accordingly, additional correlations may be made, others correlations removed, and the data assets may be presented side by side, in rotation, or potentially in composite form to user 144. A final presentation may be saved as a single file or single distribution, and persisted on data store 240 where it may then be viewed by other users 250, regardless of affiliation with a group or from the web service. The following discussion describes this process in more detail.

The correlation and presentation tool 220 is represented as a single entity. However, correlation and presentation may be implemented in different modules, for example as different dynamic link libraries (DLLs) within a single application or as separate plug-ins from a browser. The correlation and presentation tool 220 may have a query tool (not shown) that provides for simple queries, e.g. retrieve all data assets relating to "New Year's Day 2013 Security Watch." Alternatively, the tool may provide the back end infrastructure for a domain specific application such as a law enforcement dispatch tool. Several such applications, including applications for law enforcement and for transportation are discussed below.

The correlation and presentation tool 220 may invoke search module 210 in the form of a query. The query may be a SQL query that retrieves data assets according to a series of where clauses. For example in the following SQL pseudo-code:

```
select data_asset_id
from data_asset_table, group_table
where data_asset_table.group_id = group_table.group_id
and group_id = [group_id]
and data_asset_table.date_time_stamp = [date_time_stamp]
``` the correlation and presentation tool 220 may retrieve all data asset identifiers in a specified group at a particular time. In the alternative, the query may simply be a parameterized DLL call invocation as in, for example, the following function declaration pseudo-code:

ReturnDataAssetByTimeStampagroup([group_id], [date_time_stamp]).

In addition to filtering and correlating via predefined fields, the embodiments described herein may support filtering on custom metadata. One option to support custom metadata is to support a number of custom fields within a relational database. In this way, a simple text comparison may return all data assets when a custom tag equals, e.g., "New Year's Day 2013 Security Watch." In the alternative, some relational databases may support stored procedures that can invoke binaries. For example, MICROSOFT SQL SERVER™ allows invocation of COM object and ORACLE 10G™ allows invocation of JAVA™ objects.

In the above examples, the actual binary to execute the queries is the search module 210. The search module may not only invoke data assets in the central store 150, but also zero, one, or more external databases 230 via the external correlation module 260. Example external databases may store, as examples only, mapping data, advertising data assets, domain data such as public Securities and Exchange Commission (SEC) filing data, or integration with other applications such as law enforcement case management databases. At this stage, correlations may occur in the form of join statements in SQL, or binary equivalents.

The external correlation module 260 may be responsible for returning data assets from the external database 230 along with correlation metadata. The data assets may be returned with at least an Event ID to allow general correlation with the other data assets returned from the central store 150. Any metadata that was captured before or during recording may be converted to a format correlatable with the data assets on the central store 150. For example, if a date-time stamp is in a different format, the external correlation module may convert the date-time stamp to the central store 150 format.

The external correlation module 260 may have access to multiple databases, so it may use one external database for data assets and another database for metadata. One example is a Joint Photographic Experts Group ("JPEG") file that has GPS information which is correlated with a geolocation advertising database that links ads specific to the JPEG's location.

When the search module 210 retrieves data assets and associated metadata, it may return the data to the correlation and presentation tool 220 optimally as a rowset. Specifically, it may return a binary enumerable set of rows in which each data row contains a data asset ID, an Event ID, related metadata and at least an accessible reference to the data asset so that the correlation and presentation tool 220 may actually retrieve the data asset. In the alternative, when a high bandwidth dedicated connection is available, the data assets may be served as a binary large object ("BLOB"). In the alternative to a rowset, the search module may return the data asset id, event id, metadata, and data asset reference as an eXtensible Markup Language ("XML") file.

Once at the correlation and presentation tool 220, the data assets may be further correlated for presentation. For example, once the data assets are local to the correlation and presentation tool 220, further filtering may be performed resulting in changing correlations. For example, when the rowset returns all data assets focusing on a particular crime incident, it may be possible to retrieve only the data assets focusing only on a particular person under surveillance. Because of the extent of possibilities, correlations may be driven by a custom rules engine.

The correlation and presentation tool 220 may further support displaying the data assets both simultaneously and as composite. One example of such displaying would be to have multiple synchronized videos of a security incident playing on small screens and providing a control to view images from a selected one of the small screens on a large screen. Another example would be to stitch together individual still images into a single composite. Yet another example would be to display a first video followed immediately by a second correlated video.

Composite presentations may require editing capabilities on the subject data assets. For example in stitching, the different JPEGs taken from different cameras and different locations will vary in shading, color filtering, and the like. Software post processing modules may be resident in the correlation and presentation tool 220 to apply digital photo processing to correct and homogenize the JPEGs to be stitched.

As a result of the correlation and presentation functions being integrated into the same tool 220, the correlation engine itself may be used to determine which data assets are to be post processed. For example, the correlation function may identify which JPEGs have an average darkness beyond a predetermined threshold. In the alternative, the correlation engine might calculate an average darkness and homogenize the images to that average.

After post processing, the correlation and presentation tool 220 may be used to present the final presentation to the user 144. The user may apply other processing as desired.

The user 144 has the option of storing the final presentation as a single multimedia file or, in the alternative, as a single distribution of multiple files. The single file or distribution may be stored on an intermediate data store 240 where other users 250 may view or access.

The intermediate data store 240 may be a networked share drive or a file server accessible via the web. In the alternative, it may be portable media such as a memory stick or DVD-ROM. Access to the data on the intermediate data store 240 may be encrypted or password protected.

In this exemplary platform embodiment, the result is a single multimedia file or single distribution that combines multiple data assets that have been correlated for consumption by a user.

Exemplary Peer to Peer Embodiment

Figure 3:
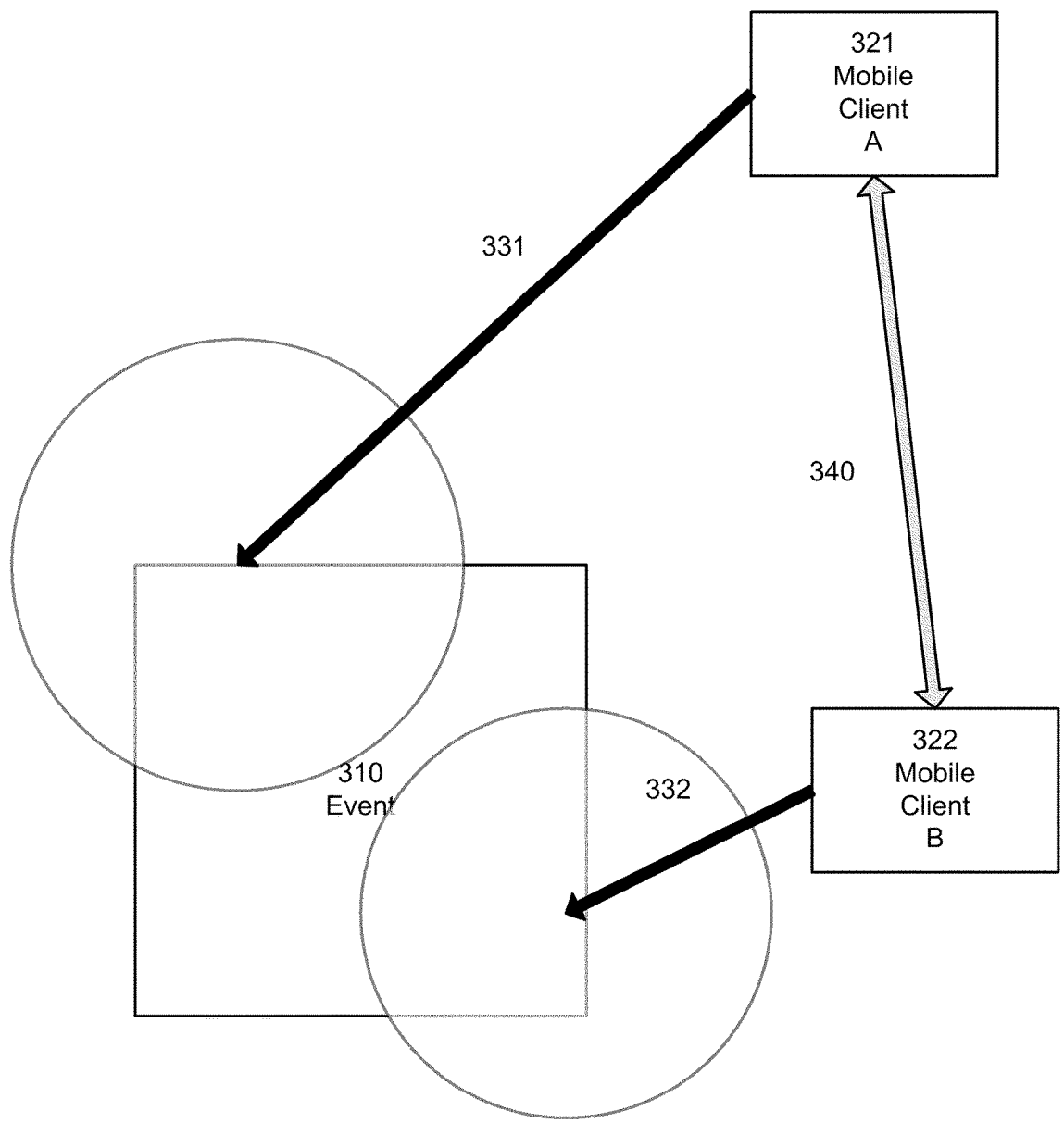
FIG. 3 is a diagrammatic illustration showing individual actors, hardware, and software for capturing an event, sharing data assets, and correlating the data assets into a final result. In a peer-to-peer embodiment of correlating media for distributed services.

FIG. 3 illustrates a peer to peer embodiment, whereas FIGS. 1 and 2 illustrate a web service centric embodiment.

Event 310 may be captured by mobile clients 321 and 322, both configured in accordance with the embodiments described herein. Mobile client 321 may then capture a portion of event 310 via video recording 331. Mobile client 322 may similarly capture a portion of event 310 via video recording 332.

During the recording, both mobile clients 321 and 322 may store metadata identifying the date/timestamp and location of the recording. Potentially each client may also store data assets with different date/timestamps and locations.

After the event is over, mobile client 321 and mobile client 322 may attempt to establish a peer to peer, mesh, LAN, or WLAN connection over the Infrared Data Association ("IRDA") protocol. Specifically, if mobile client 321 initiates, the mobile client may first generate an Event ID based on the mobile client's device number. The user of the mobile client may add additional metadata, e.g., the name of the event. Mobile client 321 may then send this metadata over to mobile client 322 via IRDA. When mobile client 322 sends an acknowledgement, a link 340 may be established. Henceforth, any data assets transferred over the link may be tagged with the Event ID and associated metadata.

Because this is a peer to peer collection, mobile clients 321 and 322 can enumerate each other's data assets. Mobile client 321 may enumerate all data assets on mobile client 322 taken near the GPS location of one of his video recordings taken at the event and around the times of the event. Then mobile client 321 may retrieve all those data assets. When the data assets are transferred, the data assets may be tagged with the Event ID and associated metadata. Mobile client 322 may similarly perform such an action to mobile client 321.

After data transfer, either mobile client 321 or 322 or both may opt to terminate data connection 340.

Exemplary Correlation Method

Figure 4:
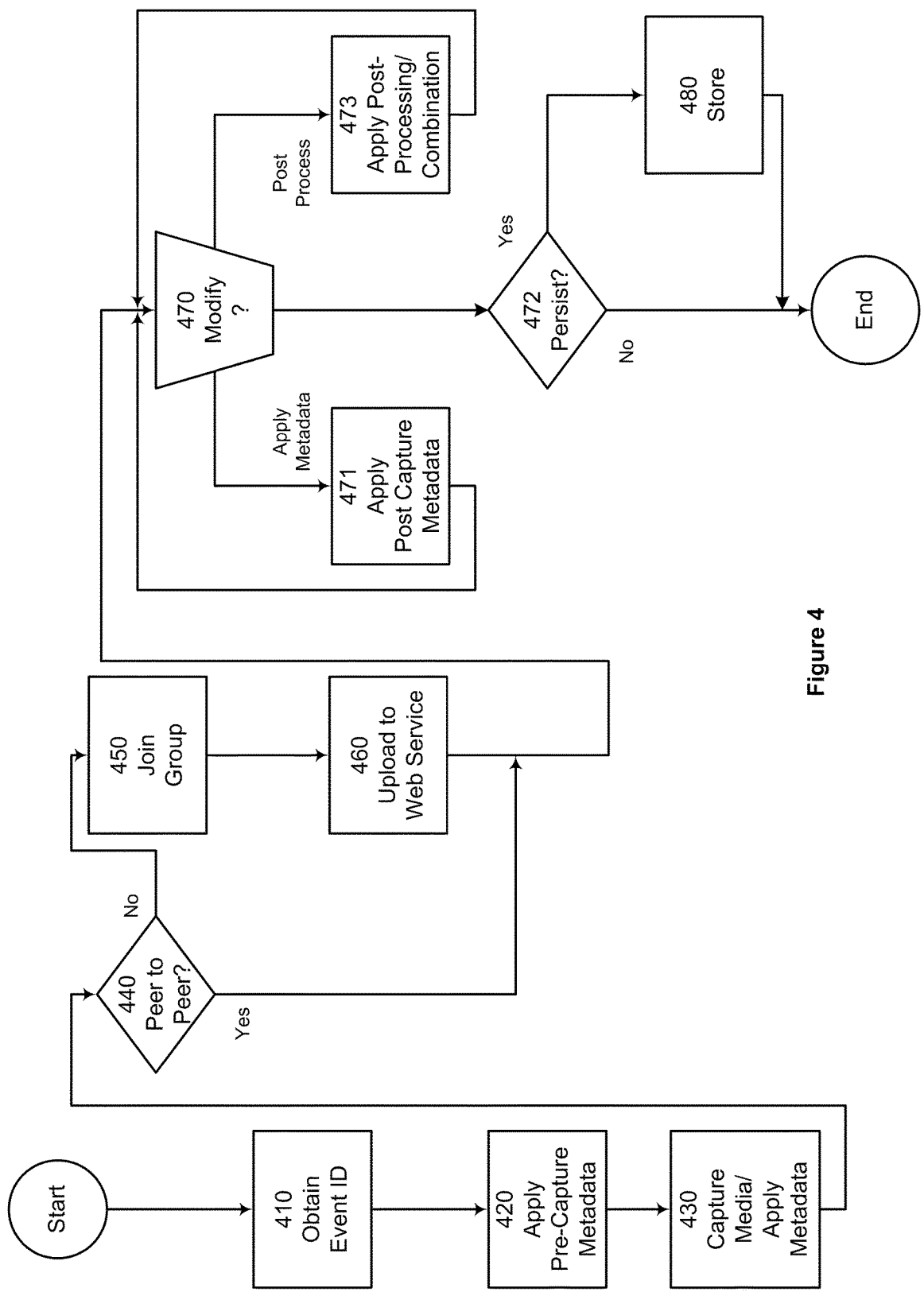
FIG. 4 is a flowchart of an exemplary method for correlating media for distributed services.

FIG. 4 illustrates an exemplary method for correlating data assets regardless of platform.

In step 410, an Event ID (also called a Pounce™ ID) may be obtained. This Event ID is provided as the minimal amount of metadata to correlate the resulting data asset with other data assets. Data assets with the same Event ID may be retrieved together. A data asset may eventually have more than one Event ID.

In step 420, correlation metadata prior to capturing the data asset may be applied. Correlation metadata may include, but is not limited to, the Event ID. Other correlation metadata may include the identity of the person capturing the data and a location stamp.

In step 430, data capture commences. During capture, correlating metadata may be captured along with the media. For example, GPS samples may track location during a mobile video recording in progress.

Once recording is complete, at decision block 440 a decision is made if the resulting data asset is to be shared in place via a peer-to-peer connection or uploaded to a web service.

If the data asset is to be uploaded to a web service, a group corresponding to the Event ID may have to be joined 450 and then uploaded to a central store 460 via the web service. Alternatively, if the data asset is to be shared in place, there is no need to upload the data.

In step 470, the data asset may be modified multiple times. In 471, additional metadata, correlating or otherwise may be applied.

In step 473, the data asset may be post-processed. For example, if the uploaded data is a still JPEG, it may be cropped. Another example includes correlating the data asset with other data assets and integrating them together.

At decision block 472, a decision of whether to share the final data asset may be made.

If the final data asset is to be shared, in step 480 the data asset may be stored in a memory different than central storage, such as a memory stick or a DVD-ROM, and the data asset may then be ready for distribution. Otherwise, the data asset remains in storage for further retrieval and other actions. The following discussion describes this process in more detail.

In step 410, the Event ID may be created in many different ways provided that the Event ID is sufficiently unique to identify one or more sets of data assets covering at least a portion of an event. Again, while an event may correspond to an actual real world event, for purposes of the embodiments described herein, an event may be a set of recordings that are to be collected together for any reason, real-world, artistic, or otherwise. For clients enabled with consumer software to create an Event ID (e.g., Pounce™ software), the Event ID may be a globally unique identifier ("GUID") generated by software such as guidgen.exe from MICROSOFT™. Alternatively, the Device ID of the capturing device may be used. On a cell phone if the transport is short message service ("SMS"), the SMS ID may be used as an Event ID. For yet another example, for Twitter™ based distribution, the PID plus additional supporting text may be used for an Event ID.

In step 420, pre-capture metadata is to be applied to the one or more sets of data assets. The metadata may include the Event ID as well as any metadata globally applicable to the one or more sets of data assets such as, but not limited to, name of the person capturing the event, date/time stamp, location, and device type. The pre-capture metadata preferentially is stored within a data asset persisted as a file. For example the MICROSOFT™ advanced systems format ("ASF") supports the placing of support metadata within the file format itself. Alternatively, the metadata may be stored separately and distributed as a companion file for the one or more sets of data assets.

In step 430, media is captures, which may include capturing an event and metadata at the same time. Examples include, but are not limited to, location markers, timestamp, and telemetry. As in step 420, the metadata may be stored along with the data in the asset as a file, but could alternatively be stored separately in a companion file.

In scenarios where there are a small number of users with a small number of files, the files may be retrieved or edited in place in a peer to peer network. In such situations, a web service may not be necessary, and per step 440, may bypass joining a group and participating in a web service.

However, in peer to peer connections, the larger the number of users, the more cross-connections and communication overhead is required. For N users, there are (N*(N+1))/2. Thus, for example, three users would require six cross-connections and four users would require ten cross-connections. Since the overhead to maintain connections would become prohibitive, for a large number of users, a web service may be preferable. Per step 440, a non peer-to-peer scenario may involve a web service by which a group may be joined corresponding to the Event ID and the data asset being uploaded to a central storage. For example, when uploading a videofile to a web-based video repository, a user may upload an associated text field which in turn may contain an Event ID. As part of the upload, the user may also upload license data (not shown). As an alternative to a web service, a service on a corporate LAN might be employed as well.

In step 470, once the data asset has been captured, a decision to modify the data asset may be made. The modification may include, but not be limited to, one or more of adding metadata, applying post-processing including combining data assets via correlation metadata, or persisting the data asset for distribution in steps 472 and 480.

In step 471, metadata is applied after the data is captured. In fact, the Event ID may be edited or changed, or an additional Event ID may even be added. Further, custom metadata may be added; or if custom fields of metadata are redefined, old metadata may be made consistent with a new format. In the case of external data assets being added, as described in reference to FIG. 2, items 230 and 260, metadata may be converted to match metadata of other data assets. In step 473, data assets are post-processed. Such post-processing may include editing the data asset, e.g., cropping photos, changing color distribution; providing other special effects; or combining data assets. For example, combining and correlating an audio track and a video track may be considered to be post-processing or perhaps are just combine virtually for during the process. An example is a police video from a car in the form of a file and audio overlaid from the device that recorded audio while outside of the car.

In step 472, if the decision is to share the data asset separate from the platform as disclosed, the data asset may be stored on a separate portable media such as a memory stick or DVD-ROM. Alternatively it may be stored on a network drive. The sharing may be in the form of a single file, or alternatively in a distribution of one or more data and one or several metadata files.

In this exemplary method embodiment, the result is a single multimedia file or single distribution that combines multiple data assets that have been correlated for consumption by a user.

Exemplary Hardware Platform

The platform implemented by the various embodiments described herein may be based on commodity hardware. In the alternative, custom hardware may be applied to implement the platform for improved speed or efficiency. The server hardware may be based on a standard personal computer ("PC") architecture, or may be based on cloud computing as will be described later. The client may be a PC client with the ability to capture media, or a custom mobile client as described in FIG. 5.

(i) Standard PC Architecture

Both servers and clients for the platform implemented by the various embodiments described herein may be based on a PC architecture. Specifically, there may be a processing unit comprised of one or more central processing units ("CPUs") that each has one or more cores. There may be an on board read only memory ("ROM"), e.g., a basic input/output system ("BIOS"), which manages boot up. For working memory, there may be random access memory ("RAM"); for storage, including virtual swap space, there may be one or more hard drives. There may further be an input/output interface to support both serial and parallel operations. The input/output interface may contain support for a mouse and keyboard, or the PC may have a separate interface. All these parts may be connected on a bus to multiplex data and instruction connectivity. There may be a fast bus for CPU communications to RAM and a slow bus for input/output operations. Connectivity between the two buses may be handled by a northbridge.

The input/output interface may include connectivity to a number of peripherals. Expansion cards or on-motherboard functionality may be directly connected to the bus. Further, there may be a video graphics card, which, in turn, may provide connectivity to a video monitor. If the PC is to be networked, there may be a modem or network interface card ("NIC"). NICs may support a wide range of protocols. The PC may even have a cellular modem. Audio functions such as microphone and speaker support may be supported by an audio card. Interface for optical storage such as CD-ROM, DVD-ROM, and BluRay™ disks may be handled through the input/output interface. Other portable storage such as memory sticks/thumb drives and legacy floppy drives may also be handled through the input/output interface.

In the case of clients, for media capture, cards supporting fast input/output such as Universal Serial Bus ("USB") 2.0 and Institute of Electrical and Electronics Engineers standard no. 1394 ("IEEE 1394"), also known as "FireWire" interfaces can be supported by a PC, e.g., high resolution microphones and video cameras. However, fast input/output can be any sort of data acquisition, including, but not limited to, location sampling, telemetry, or other streaming data feeds.

In the case of servers, large arrays of storage, such as Redundant Array of Inexpensive Disks ("RAID arrays") are common. Multiple CPU and multiple core configurations with relatively large amounts of RAM provide support for large numbers of users.

(ii) Exemplary Mobile Client

Figure 5:
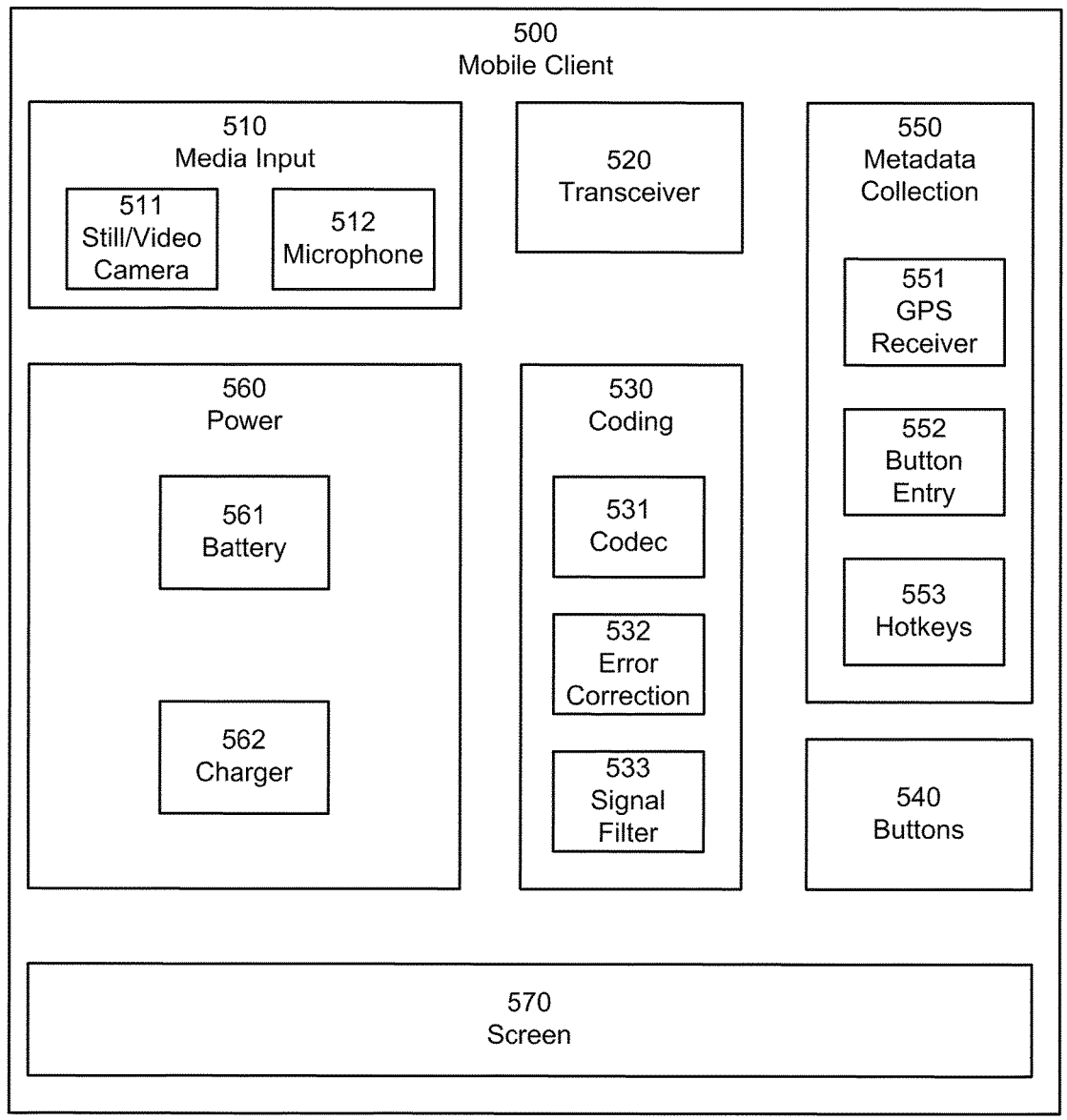
FIG. 5 is a diagrammatic illustration showing key components of hardware for an exemplary mobile client in accordance with various embodiments for correlating media for distributed services.

FIG. 5 shows a client embodied in the form of a multimedia cell phone. Exemplary mobile client 500 contains functionality for cell phone communications including, but not limited to, transceiver 520 and a set of coding functions usually embodied in a chip set 530. Known computing functions such as a processor, bus, system clock, and memory, including but not limited to RAM, ROM, flash ROM and connectivity hardware such as antennae are not shown.

Mobile client 500 is powered by power functions 560. Information is entered via buttons 540, and potentially via a screen 570 if it is a touch screen. Visual output is provided through screen 570. Media can be captured through media input functions 510, including video and still cameras 511, and microphones 512. Metadata including correlating metadata may be entered via metadata collector functions 550. These functions are described in detail as follows.

Client 500 may receive a signal via the antenna (not shown), and then signal may then be sent to the receiving function of the transceiver 520. After the transceiver, there may be a function to determine what type of signal is being received (not shown), to distinguish between background noise and actual voice input. After the signal type has been determined, the signal may be sent to codec 531 in the coding functions 530. The decoded signal may then be forwarded to filters 533 and error corrector 532, both of which may improve the quality of the decoded signal. Finally, the signal may be forwarded to an appropriate rendering mechanism. For example, if the signal is a voice signal, then it may be sent to a transducer such as a speaker (not shown); if the signal is SMS or web browsing data or other software data, it may be sent to an appropriate software application and then displayed on screen 570.

A signal may be then generated in response, be it through voice from a transducer such as a voice microphone (not shown), through buttons 540, or other inputs such as a stylus (not shown) or screen 570 if it supports touch screen functions. Regardless if the input is voice or software, or a combination of the two, the signal is then forwarded to the appropriate codec 530 for coding, and then for transmission in the transmission function of the transceiver 520, and then to the antenna (not shown).

Client 500 has the ability to capture media. Contemporary cell phones also support on board media input 510 for video and still data via a camera 511 and via a microphone 512. While these are known forms of input, further media input may be through data connections such as pod casts and other streams (not shown).

Client 500 further includes the ability to respond to triggering events. For example, a Radio Frequency ID ("RFID") reader (not shown), can provide a software notification that an RFID card has been read an acknowledged. In turn, the camera may be turned on for recording. Another example is a vehicle collision detector creating a software event to turn on recording.

In additional to capturing media and triggering events, client 500 includes metadata collection functions 550. For example, samples of location metadata may be collected by location service receiver 551. Geolocation metadata may include Global Positioning System ("GPS") metadata. However, because GPS is prone to error from GPS signals bouncing off of buildings in urban settings, geolocation metadata may alternatively be determined by triangulating signal strength or weakness from different cell towers with known locations. For relatively immobile clients, receiver 551 may collect geolocation metadata via internet protocol ("IP") address.

Another form of metadata is date/time data. Obtaining date/time metadata for client 500 may be accomplished using an onboard clock (not shown). Alternatively, date/time metadata may be obtained from a signal from a cell phone tower.

Yet another form of metadata is text, generally entered by a user pushing buttons 540. Client 500 may utilize a software application by which the user enters metadata values via the 10 key pads or via a touch screen 570. Such traditional button entry would be handled via button entry function 552.

Alternatively, custom functions for hotkeys 553 may be employed. Specifically, hotkeys may be used to enter common tags. For example, a user may enter the "#" key to indicate the use of a metadata tag key. Further, the user may enter a number, for example "2" if the number was not already defined and text in the value for a metatag, such as "Jane." Thus, the next time the user wanted to tag a photo with the name "Jane", the user would press "#" to trigger metadata mode and then press "2," and then "Jane" would then be associated with the photo. If no photo or media file was available upon triggering the hotkey, the user may be prompted to delete or edit the hotkey for different use. This would ease the otherwise cumbersome task of associating metadata with a restricted user interface.

Other metadata input/output functions, may include, but not be limited to USB and FireWire. Input/output functions on client 500 may include but are not limited to: (1) providing other sources of media capture, (2) providing sources of detectors of triggering events, and (3) providing sources of metadata capture. Accordingly, in alternative to FIG. 5 where all of these functions are on board the mobile client 500, these functions could be accomplished via peripheral hardware.

Not shown are custom chips to aid in functions typically enabled via software. These include but are not limited to data compression chips and encryption algorithms.

Power functions 560 provide power to the all of client 500. Typically this is in the form of a battery 561. But a charger/AC input 562 typically recharges the battery or provides direct power.

An alternative form of charging may be performed using inductance coils. In situations such as law enforcement, remembering to charge a client device may not always be present in a user's mind. By implementing the charger as an inductance system including a program to manage the charging. Specifically, the program may determine when the system is being charged, how much power to convert, and when the system is to be disconnected. The on board mobile client processor (not shown) or a separate processor may alternatively be used, as may the on board mobile client RAM (not shown) or separate memory be used. The mobile client may also have an inductance coil to receive energy, and then to the power functions 560 and there to the battery.

An off board charger may be configured as an inductance coil that connects to an electrical power source, and may further include a processor and memory to indicate when to charge and how much to charge the client device. The off board charger may even further include an indicator having a charge status indicator in the form of colored light emitting diodes ("LEDs") or, alternatively, an LED array.

Alternative charging configurations may include placing the mobile client's charger 562 off of the device and elsewhere on the person of the user. For example, coils may be placed in the sole of a user's shoe, in or on the seat of the user's pants, in the user's belt, or in the web gear of the user. The corresponding charger may further be disposed on the gas pedal of the user's car or even on a car seat, which could then charge the client device whenever the coils are proximate.

(iii) Mobile Client Chassis

In order to support vehicle mounting, the mobile client may be placed within a chassis of aluminum or other material, with an extendable arm that connects to the windshield of a car, much like a rear view mirror. The chassis may have tamperproof qualities and may include one or more security locks that prevent theft or unauthorized modification of the mobile client.

The mobile client components may be divided into two portions to support a secure recorder configuration: (1) the data gathering portion, including cameras and microphones, and (2) the storage portion which contains the stored data. This latter storage portion may be secured in a hidden and hardened portion of the vehicle to prevent theft or unauthorized modification. The data gathering portion should be in public view; therefore, in order to best capture the surrounding events, the ability to conceal this portion is limited. However, if a malicious actor steals the camera, the actor steals only the device but not the data, which then may be later used for its intended purpose, or even to help determine who stole the camera. The hidden portion may also be hardened such that in the event of an accident, the data storage may be recovered or still functional to upload data.

Several alternatives may be exercised to prevent stealing the data gathering portion. One alternative is to integrally mount the data gathering portion into the vehicle's dashboard, such that removal requires removing the dashboard and unbolting the device. This alternative would lengthen the amount of time to remove the data gathering portion to greatly increase the chances that a would-be thief would be caught. For scenarios where an officer wants an option to move the camera, the camera may be removed from the vehicle when not in operation, and stored securely in a separate location. In either alternative, a would-be thief is deterred or prevented from stealing the data gathering portion.

Connectivity

Embodiments of the platform support data connectivity. Data connectivity from a PC architecture client is primarily from a network interface card, for example an Ethernet card, or in the alternate from a dial up modem. Data connectivity from a mobile client most commonly would be via a cellular connection. Clients are not limited to just one form of connectivity, and may have multiple data connections. For example, a PC client may have both a modem and a network interface card; or a mobile client may have both a cellular and a Wi-Fi connection.

Connectivity support is not limited to data connectivity. Connectivity support may also be for voice data as with ordinary cellular connectivity. Support for device communication, e.g., Bluetooth support, may also be available.

Various embodiments of the client may support a full network stack. At the data link layer, client support may include, but is not limited to, Ethernet support for PC clients and Wi-Fi support for both PC clients and mobile clients. For Network/Session/Transport layer protocols, support may include transmission control protocol/internet protocol ("TCP/IP"), user datagram protocol ("UDP"), and other protocols. For application layer protocols, file transfer protocol ("FTP") support for uploading large media files may be available, hypertext transfer protocol ("HTTP") may be available for web access, and simple mail transfer protocol ("SMTP") may be available for email access.

Embodiments of the platform may support peer-to-peer connectivity, by which client devices may create an ad hoc network to access and trade files. In the alternative, embodiments of the platform as disclosed may also support dedicated networks. For example one remote client may videotape an event and another client may record the audio of an event. The remote clients may support infrared data association ("IRDA") standards and may be able to transfer files to each other. Since IRDA is slower than Wi-Fi, the remote clients may support Wi-Fi and set up a private ad hoc network between the two. Finally the remote clients may participate in a dedicated network along with PC clients.

Extended Platform

Since multimedia files are large, even with compression, embodiments of the platform may create large amounts of data. Accordingly the data may be stored on cloud computing centers. By integrating with cloud computing, the embodiments described herein may make available large amounts of storage and further provide access to compute-intensive applications available on cloud computing platforms. However, integration may result in degraded performance and over-reliance on a third party.

There are a number of compute-intensive applications that may be hosted alone on large computer clusters. Face recognition is one such application. However, when such applications and databases are hosted on a cloud computing node, in addition to having higher availability of a larger number of compute resources, the application is not inherently networked. One application of the various embodiments described herein includes a client camera capturing a video frame or still image, extracting out a subject's face using standard algorithms, and then calling a cloud computing database.

Figure 6:
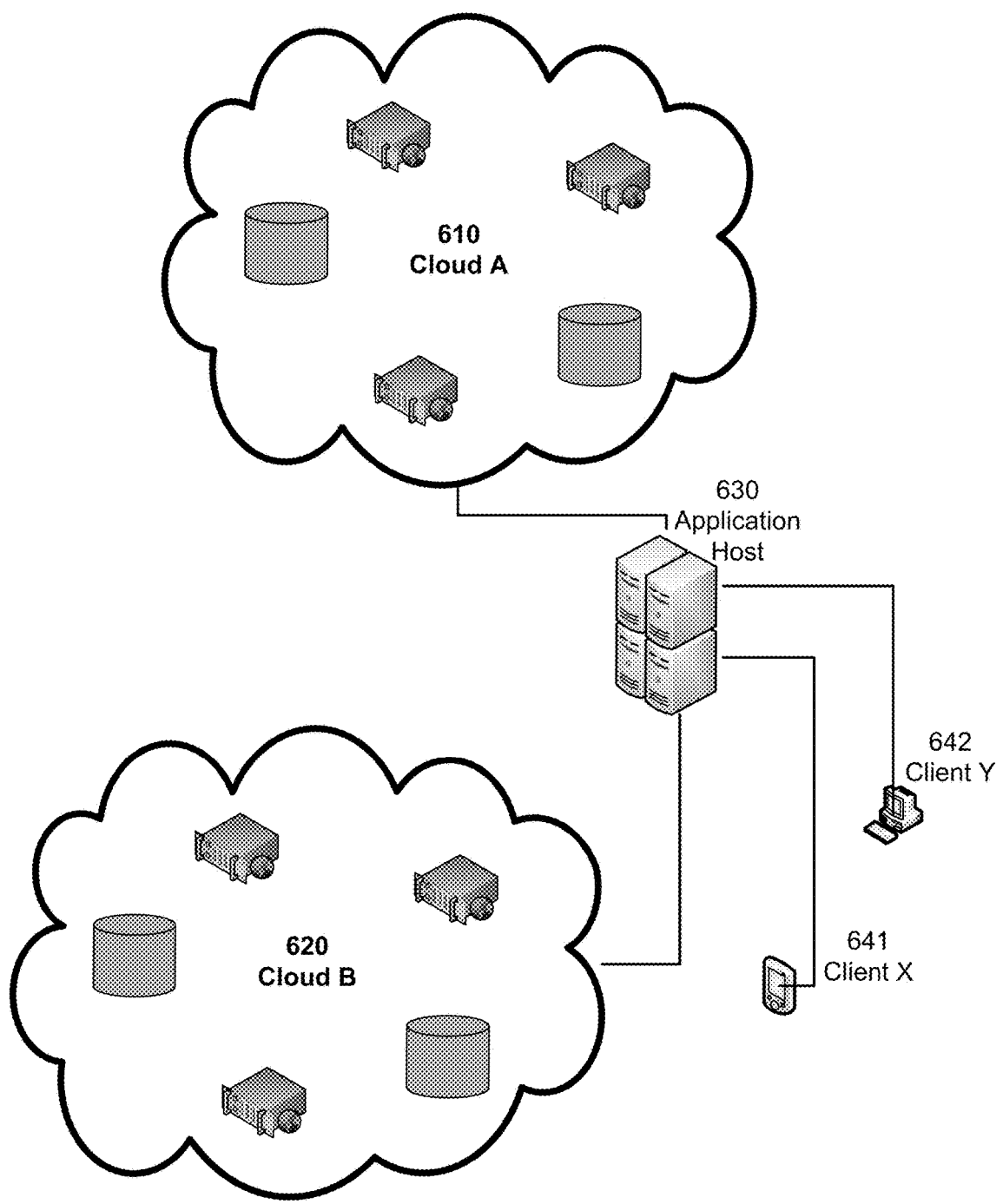
FIG. 6 is a diagrammatic illustration of correlating media for distributed services in a cloud computing environment.

FIG. 6 indicates an exemplary implementation of such a scheme. Cloud 610 has a number of web servers, hosted applications, including but not limited to the face recognition software, and databases, including but not limited to a database of faces. An application host 630 may include an uploading web service but may delegate cloud computing requests to applications from non-cloud clients 641 and 642.

An embodiment of the uploading implementation may be described with respect to remote client 641, which has a still camera, and PC client 642, which has a number of still photos stored as files. PC client 642 with may store a number of still photos with the name of the person stored with the file as correlation metadata in the form of a tag. The PC client 642 may upload the photos to the application host 630 via a web service. The application host may then store the photos to central storage in cloud 610 where is the photos may be available for retrieval via search and correlation. In the alternative, PC client 642 may upload the untagged photos and then tag them with metadata after the uploading.

An embodiment of the download process may be described with respect to remote client 641, which takes real-time still photos at an event. The context may be in law enforcement surveillance or in photojournalism. Regardless, the user of remote client 641 may automatically tag the photo with the names of individuals on the photos. Remote client 641 may upload the photos to application host 630 via a web service which may then store the photos on a central store in cloud 610. Once on the web service, the remote client 641 may request the photos to be automatically tagged. The application host may then invoke a face recognition application running on the cloud to retrieve all photos that are similar to the faces in the photo uploaded from remote client 641. Where the retrieved photos do not have sufficient similarity to the photo uploaded from remote client 641, third party databases may be invoked. Based on the tags provided from PC client 642 as well as all other clients that stored photos in the database, the relevant tags may then be applied to the photo uploaded by remote client 641.

Because the correlation and presentation are integrated together FIG. 2, item 220, custom features such as autotagging are available. More importantly, because the embodiments as disclosed integrates with external data FIG. 2, item 230, and provides for metadata correlation FIG. 2, item 260, it can integrate with third party databases such as facial databases; including integration with cloud computing applications.

This integration with cloud computing applications provides for faster responses. Accordingly, remote client 241 might receive the names of the individuals just taken in a photo immediately. Additionally, the remote client 241 might receive additional information such as company name or other professional information. On a variation of the above scenario, the user could have taken a picture of a product in a store, used object recognition software in the cloud, and similarly retrieved product information. The foregoing is exemplary and not intended to be a limiting or exhaustive list of possible applications of extending the present platform to include cloud computing.

The integration of the described herein may not only provide feedback regarding the accuracy of the facial recognition, but may also work to improve matches. For example, if clients 641 and 642 are organized into a group, the likelihood of retrieving false matches from a general database is removed by limiting the face recognition database only to members of the group. Furthermore, by adding autotagged photos to the general database, especially after post capture corrections, provides an ever improving sample of photos to determine facial matches. Facial recognition capabilities may be augmented by taking changes over time, such as hair style, and the growth of mustaches and beards, and could return name information but also time period information.

One problem with cloud computing integration is that data may be widely distributed geographically, thus creating wide variances in network latency and performance. For example, in FIG. 6, cloud 610 may be located in or near Seattle, Wash. but cloud 620 may be located in or near Washington, D.C. Thus, a user located in Seattle would likely experience slow data retrieval if the data were based in cloud 620 but better performance of data based in cloud 610.

Accordingly the application host 630 may manage offline, edge, and nearline data by (1) caching data on application host 630 itself and (2) invoking server affinity, which guarantees that a particular server, or at least a particular cloud, is to serve data to a particular user. Data that is known to be needed commonly may be placed on the application host that is nearline. Data that is known to be needed by users geographically local to the cloud, but is not commonly used may be pinned to a local server or a local cloud via server affinity. Placing data redundantly on different edge points of the cloud may not be cost or storage prohibitive because cloud computing provides large amounts of storage. Further, data that is not time sensitive may be stored offline or arbitrarily on the cloud.

Another problem with cloud computing is over-reliance on a single cloud computing provider. For example, where the central storage is hosted on a cloud for a production system such as for law enforcement, cloud failure means data storage is lost. If the law enforcement force was in a major city such as New York with 1,000 policemen on duty, down time of a cloud for 1 hour would be a loss of almost a man-year of data. Cloud computing is a relatively new technology, cloud computing brownouts and blackouts are possible. Additionally, much data, in particular in law enforcement scenarios must be made secure.

The application host 630 may integrate storage across clouds 610 and 620 from different cloud computing providers and mirror. Alternatively, the application host 630 may implement a RAID scheme, which may subdivide data across three clouds, all from different providers. Security, which may include auto-encryption, may be enhanced since no single cloud provider is likely to have all the data. In both cases, storage availability is improved.

Exemplary Client Software Platform

Figure 7:
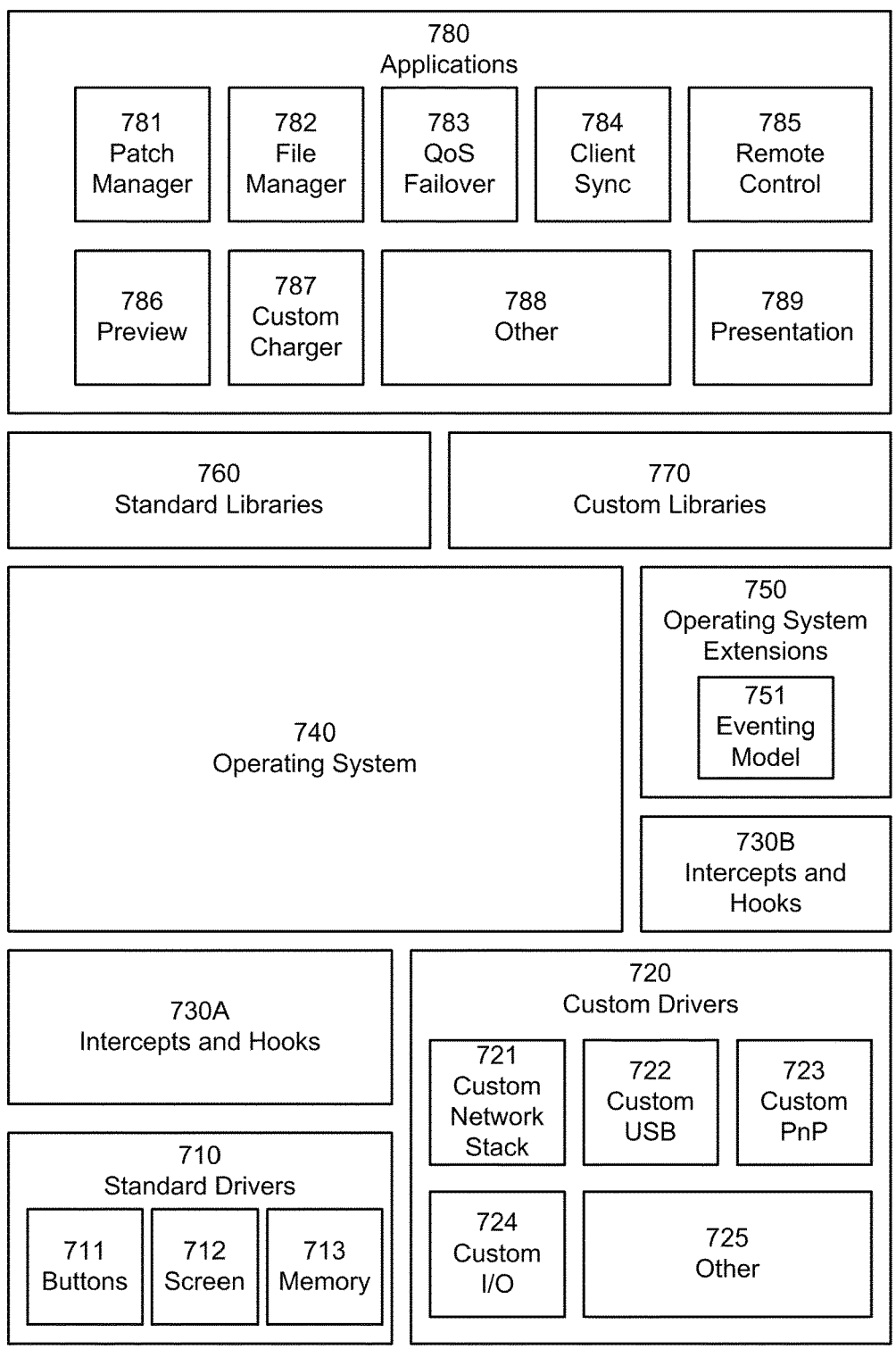
FIG. 7 is a diagrammatic illustration showing key components of software for an exemplary mobile client in accordance with various embodiments for correlating media for distributed services.

FIG. 7 illustrates an exemplary client software platform 700. The client software platform is based on an ordinary cell phone software stack. However, to support the custom applications, at each stage, a corresponding custom layer may be added. The main hardware interface may be the device drivers 710 and 720. Standard drivers 710 provide functionality to stock hardware. However, custom drivers 720 may be required for custom hardware. Typically drivers will communicate with the cell phone operating system 740. Examples include SYMBIAN™ and ANDROID™, the operating system for the Open Handset Alliance. The operating system 740, including the operating system kernel may require extensions 750 to provide support for custom software events, as an example. To provide the necessary information to the operating system 740 and the extensions 750, software "shims" 730A and 730B may intercept and hook notifications from the drivers and may provide alternative functionality. Standards libraries 760 may be built upon the operating system.

For custom functionality, the exemplary platform may include custom libraries 770, mostly exposing programmatic support for the software eventing model 751, and to custom hardware as exposed by the custom drivers 720. Finally, applications 780 may be built on top of the libraries 770. The following discussion will cover each of these areas in more detail.

Standard drivers 710 may include drivers for stock cell phone hardware including, but not limited to, buttons 711, screen 712, and memory 713. There may be other stock hardware, including e.g., a GPS receiver (not shown).

Custom drivers 720 may include drivers to support non-stock hardware for a cell phone. Custom drivers may be included in various embodiments by which a mobile client comprises a cell phone with additional hardware functionality.

One example of a custom driver 720 is a custom network stack 721 to compensate for the presence of a partial network stack, as in various cell phone embodiments. However, full implementations are to support functions typically not on a cell phone including Wi-Fi connectivity, FTP, to name a few.

Other examples of custom driver 730 include a custom USB implementation 722 and a custom Plug 'n Play ("PnP") implementation 723. Not all cell phones support PnP, which is the automatic installation of hardware drivers and automatic configuration and provisioning thereof. However, some cell phones may have additional hardware added for telemetry and metadata purposes. A full USB stack 722 and support for PnP 723 may provide such functionality in various embodiments. As USB is not the only serial interface stack, it optionally may be replaced with some other serial data interchange stack.

Standard drivers 710 and custom drivers 720 may serve to forward communications to the operating system 740. Generally there will be an event queue and a series of modifiable event handlers (not shown). Modification of the event handlers may include a recompilation of the operating system 740. An alternative is to create extensions 750 to the operating system 740 to isolate any necessary custom functionality. This includes a custom software eventing model 751.

Software events are different from the physical events that may be captured via media and multimedia, in accordance with the various embodiments described herein. Other terms for software events include "triggers" and "notifications." A software event may include a message that software sends when some occurrence discernable by software occurs. An example includes a hardware button being pushed, a driver triggering a software event that sends a message to all applications subscribing to the event for which a button has been pushed. If an application has an event handler, that event handler will contain functionality as to what the application should do when a button is pushed.

A software eventing model may support software events for custom hardware. For example, if a custom driver provides an interface for an RFID trigger, the custom driver may send a notification to the operating system extension's internal event queue. The internal event queue may then forward the notifications through custom libraries 770 to application 780. The application 780 may then handle the event of the RFID trigger by turning storing the camera's preview buffer and starting the record function of the camera. Alternatively, software events may be processed via a modification of the operating system's 740 event queue. Additionally, event notifications from applications 780 may be disseminated via the software eventing system 751.

The standard drivers 710 preferably are not modified, or are modified as little as possible and custom drivers 720 should be isolated from the operating system as much as possible. To enable custom eventing, in some cases, the communications may be intercepted or hooked by module 730A for the standard drivers and 730B for the custom drivers. For example, if a particular button sequence is to bypass the operating system and perform a custom function such as a triggering a hotkey mode, it may be necessary to intercept the button pushes and redirect execution to a hotkey executable. Further by way of example, if a combination of the default operation and a custom option is required, the button pushes can be simply hooked thus passing through the push notifications to the operating system at the same time triggering a custom button push software event handler.

The operating system 740 and the operating system extensions 750 generally will expose their functionality via an application programming interface (API). Standard libraries 760 generally provide function calls or object models to aid programming applications. Standard libraries 760 generally are distributed along with the operating system. Library extensions, that is custom libraries 770 provide function calls or objects models to support custom hardware, operating system extensions 750, or to provide new additional functionality on top of the original operating system 740.

There is a wide range of applications 780 now enabled by this extended platform as will be described as follows.

(i) Patch Manager

Patch manager 781 is an application that handles updates for the drivers and installed software. There are two ways of patching. The first optimizes saving memory, the second optimizes versioning. For both versions, the flash memory contains a lookup table mapping locations in memory for functions. When an application calls a function, it goes to a lookup table that was populated by the table mapping from flash. In this way, the function can proceed to the location of the function and properly execute.

The first example of patching stores the lookup table values in a well known location. It then stores drivers, the operating system, applications, and any other binaries in other locations of the memory. Each binary is allocated more memory than it currently needs in order to account for future patches. When the patch manager receives notice, which includes all new binaries and a new lookup table, perhaps over the network, or via an SMS message, the patch manager triggers a software event. The software event shuts down all software except for those necessary for patch functions. The patch manager first overwrites the lookup table, and then overwrites all binaries with the new binaries. The patch manager then forces a reboot. The reboot then restarts the mobile client, populates the software lookup table with the lookup table in flash. When an application calls a function, it then will go to the new location and to the new binary.

While the first example conserves memory, it does not provide provision for falling back in the event bad patches are installed or patches were improperly installed. In a second example of a patch manager, the same triggers and events are used as in the first example. However, additionally, the location of the current lookup table is stored. At a well known location, several bytes of empty storage store each new location of lookup table. The original lookup table address is in the first location. The lookup table of the first patch is in the second location, and so on. Whenever a patch is installed, lookup table and all binaries are stored contiguously. Upon reboot, the operating system looks for the last lookup table and then installs the lookup table into software from that location. In the event a patch has to be backed out, the patch manager can decrement the list of addresses of lookup table versions, reload the older lookup table, and in doing so revert back to the older software.

(ii) File Manager

File manager 782 is an application that provides advanced file management for on board removable storage. Typically when removable storage such as memory sticks are in a cell phone, the assumption is that the user will remove the memory stick and place it in a PC to remove and otherwise manage files. However, for scenarios such as security cameras where removing the memory stick may take long periods of time, an ability to manage files as not to run out of memory is required. To address these requirements, the file manager 782 contains four main functions: (1) deleting files upon upload, (2) round robin deletion, (3) metadata tagging upon upload or download, and (4) enumeration of data assets.

For the first function, as files are written to media, eventually a notification, perhaps from SMS will trigger uploading all files not currently open. Where a file is open, optionally the trigger will force a closing of a file and a reopening, for example with the onboard video camera is currently recording.

For the second function, where uploading is sporadic or non-existent, the file manager may maintain a queue of files and implement a first stored first out memory management approach. Specifically, when memory is no longer available, the oldest files will be deleted and that space allocated for a new file. The file manager may implement packing and compression algorithms as well.

For the third function, upon upload or download the file manager checks the Event ID of the data asset. If it is null, it populates the metadata field with the current Event ID on the mobile client. Where the Event ID is associated with other metadata, for example the name of the event, that field is populated if null. In the alternative, it may prevent upload or download.

For the fourth function, the file manager provides not only for enumeration of data assets, but simple search via metadata. The file manager maintains a table of data assets on the machine and maintains a list of metadata fields and offsets. When request, for example from SMS, or alternatively via a network requires a list of data assets matching metadata criteria, it sequentially iterates through all the data assets in the data asset table and retrieves the file name if the data asset matches. It then writes the file name into a text file. The text file is then returned over the data connection. The text file may be formatted with XML or with a proprietary format to aid enumeration and presentation on the receiver of the file.

(iii) Quality of Service ("QoS") Failover

A QoS failover application 783 manages the transmission of multiple data inputs from a client device that is running the client software platform 700 to a recipient device. The recipient device may be a recipient web service at the NOC, or a repeater device that relays the multiple data inputs to the recipient web service, such as the web service 120. For example, the client device may be the mobile client 500 worn by a police officer, and the recipient web service may be a server that is located the NOC. The repeater device may be a base station in a vehicle of the police officer that amplifies the data signal from the client device and transmits the data carrier signal to the recipient web service, a cellular communication transceiver, and/or the like. The multiple data inputs may include audio input from a microphone of the client device, video input from a camera of the client device, and correlating metadata that is produced at the client device. The correlating metadata may include geolocation data regarding the location of the client device and/or user-defined data (e.g., text comments related to scenes or persons captured by the audio and/or video input). Further, when the recipient web service is the web service 120, the web service 120 may store the multiple inputs into a data store, such as the central store 150.

Figure 8:
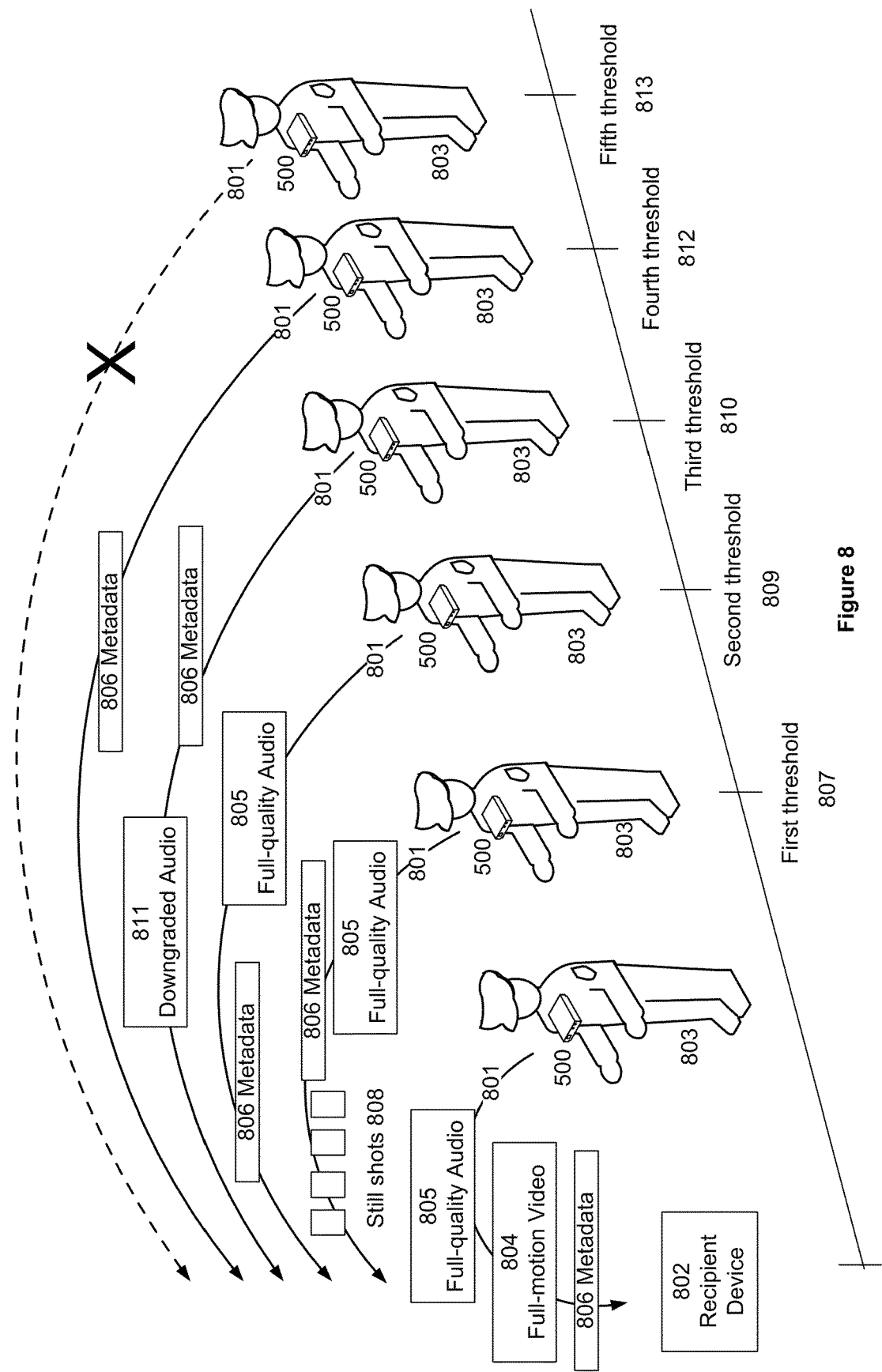
FIG. 8 is a diagrammatic illustration of the management of the wireless audio and video capture devices that are provide audio and video signals to a mobile client.

FIG. 8 is a diagrammatic illustration of the QoS failover application 783 managing a data signal 801 that carries the multiple data inputs from the mobile client 500 to a recipient device 802. The multiple data inputs may include an audio input from a microphone of the mobile client 500, and a video input from a camera of the mobile client 500. The multiple data inputs may also include correlating metadata produced at the mobile client 500.

The QoS failover application 708 may modify the amount, the type of data, or both, that is carried by the data signal 801 between the mobile client 500 and a recipient device 802 based on the comparison of a parameter of the mobile client 500 with pre-established parameter thresholds. In some implementations, the parameter may be the signal strength of the data signal 801 that connects the mobile device to the recipient device 802, and the pre-established thresholds may be signal strength thresholds.

In implementations where the thresholds are those of signal strength, the QoS failover application 783 may monitor the signal strength of the data signal 801 that carries the multiple inputs from the mobile client 500 to the recipient device 802. The signal strength of the data signal 801 may be dependent on the transmission power output of a transceiver, gain of an antenna, and/or other hardware factors, of the mobile client 500. The QoS failover application 783 may selectively modify the amount of data carried by the data signal 801 each time the signal strength of the data signal 801 reaches a different signal strength threshold. For example, signal strength thresholds may be established via experimentation or empirical analysis to represent distance thresholds.

In alternative implementations, the parameter of the mobile client 500 may be a distance between the mobile client 500 and the recipient device 802, and the pre-established thresholds may be distance thresholds.

As such, the mobile client 500 may be provided with a GPS locator, so that the mobile client 500 is able to determine its geolocation with respect to the recipient device 802. The QoS failover application 783 may continuously monitor the geolocation of the mobile client 500, and hence, the distance between the mobile client 500 and the recipient device 802. Distance between the mobile device 520 and the recipient device 802 may be indicative of the quality (e.g., signal strength) of the data signal 801 between the mobile client 500 and the recipient device 802.

In still other implementations, the parameter of the mobile client 500 may be one of the other parameters that represent the quality of the signal that connects the mobile device 502 to the recipient device 802. For example, the parameters may include, but are not limited to, noise-to-signal ratios (SNR), carrier-to-signal (CNR) ratios, and the like, and the one or more pre-established thresholds may be corresponding quantitative thresholds. The one or more pre-established thresholds may be predetermined based on experimentation and/or empirical analysis of the data transmission and reception capabilities of the mobile client 500 and/or the recipient device 802.

In any case, the modification of the amount of data carried by the data signal 801 based on one or more thresholds may ensure that the there is always sufficient signal bandwidth to reliably carry the at least some data. As a result, data deterioration due to insufficient bandwidth may be reduced or eliminated.

Consider the case where the recipient device 802 is a repeater device in a police car and a police officer 803 is wearing the mobile client 500 configured with the platform 700 as disclosed. While the police officer 803 is near the recipient device 802 (e.g., mobile client 500 parameter is a distance), the mobile client 500 may be streaming data to the recipient device 802. In particular, the mobile client 500 may be streaming full-motion video 804, full-quality audio 805, and metadata 806. When the parameter (e.g., distance) between the mobile client 500 and the recipient device 802 reaches a first threshold 807, the QoS failover application 783 may command the mobile client 500 to switch to the streaming of still shots 808 instead of full-motion video 804. This is because the streaming of still shots 808 consumes less bandwidth than the streaming of full-motion video 804. Therefore, the quality of the still shots 808 is less likely to degrade due to a decrease in the strength of the data signal 801 from the increased distance. In some instances, the QoS failover application 783 may further provide timing commands to camera of the mobile client 500 such that the number of still shots taken by the camera is inversely proportional to a variance in the parameter of mobile client 500, e.g., increase in distance of the mobile client 500 to the recipient device 802 up to the first distance threshold. However, the mobile client 500 may continue to transmit full-quality audio 805 and metadata 806.

The first threshold 807 may be a pre-established parameter value (e.g. distance between the mobile client 500 and the recipient device 802, or signal strength). At this pre-established parameter value, the mobile client 500 is unable to use the signal strength of the data signal 801 (degraded due to distance) to reliably transmit the full-motion video 804 to the recipient device 802 in conjunction with the other data inputs.

When the parameter value of the mobile client 500 reaches a second threshold 809, the QoS failover application 783 may allow the mobile client 500 to continue to transmit the full-quality audio 805 and the metadata 806. However, the transmission of the video data (i.e., still shots 808) by the mobile client 500 to the recipient device 802 may be terminated. The second threshold 809 may be a parameter value different that is different than the first threshold 807 (e.g. in the case of distance, the distance is greater, in the case of signal strength, the signal is lower). This second distance threshold may be such that the mobile client 500 is unable to use the signal strength of the data signal 801 to reliably transmit still shots 808 to the recipient device 802 in conjunction with the other data inputs. In some implementations, the QoS failover application 783 may initiate the mobile client 500 to begin buffer the still shots 808 in the memory 713 when the transmission of the still shots 808 is terminated.

When the parameter value of the mobile client 500 reaches a third threshold 810, the QoS failover application 783 may switch the mobile client 500 from the transmission of the full-quality audio 805 to the transmission of downgraded audio 811 to the recipient device 802. For example, the full-quality audio 805 may have a bit rate of 128 kilobits/second, while the downgraded audio 808 may have a bit rate of 32 kilobits/second. However, the mobile client 500 may continue to transmit metadata 806 to the recipient device 802. The third threshold 810 may be a parameter value threshold that is different than the second threshold 809. The third threshold 808 may be a parameter value at which the mobile client 500 is unable to use the available signal strength of the data signal 801 to reliably transmit the full-quality audio 805 to the recipient device 802 in conjunction with the metadata 806.

When the parameter value of the mobile client 500 reaches a fourth threshold 812, the QoS failover application 783 may terminate the transmission of the downgraded audio 811 to the recipient device 802. The fourth threshold 812 may be a parameter value threshold that is different than the third threshold 810. The fourth threshold 810 may be a parameter value at which the mobile client 500 is unable to use the available signal strength of the data signal 801 to reliably transmit the downgraded audio 811 to the recipient device 802 in conjunction with the metadata 806. In some implementations, the QoS failover application 783 may initiate the mobile client 500 to begin buffer the downgraded audio 811 in the memory 713 when the transmission of the downgrade audio 811 is terminated.

When the parameter value of the mobile client 500 reaches a fifth threshold 813, the QoS failover application 783 may terminate the transmission of the metadata 806 to the recipient device 802. The fifth threshold 813 may be a parameter value that is different than the fourth threshold 812. The fifth threshold 811 may be a parameter value at which the mobile client 500 is unable to use the available signal strength of the data signal 801 to reliably transmit the metadata 806 to the recipient device 802 even without the transmission of the other data inputs. This may correspond to a complete loss of signal that supports a communication link between the mobile client 500 and the recipient device 802. In some implementations, the QoS failover application 783 may initiate the mobile client 500 to begin buffer the metadata 806 in the memory 713 when the transmission of the metadata 806 is terminated.

Conversely, when each threshold is passed in reverse, the mobile client 500 may first transmit the metadata 806, then additionally transmit the downgraded audio 811, then full-quality audio 805 in place of the downgraded 809. The mobile client 500 then further transmits still shots 808. Subsequently, the transmission of the still shots 808 is replaced by the transmission of full-motion video 804. In some implementations, as the signal strength of the data signal 801 increases, the mobile client 500 may also use any spare bandwidth of the data signal 801 to transmit any buffered metadata 806, downgraded audio 811, and/or still shots 808 to the recipient device 802.

It will be appreciated that while the example given in FIG. 8 may be related to a distance parameter and example thresholds are distance thresholds, the parameter and corresponding thresholds may be establish based on the other measureable parameters of the client device. For example, the thresholds discussed above may be signal strengths in order of decreasing magnitude, or pre-established SNR or CNR thresholds in the order of increasing noise in proportion to the signal that actually carries data. Thus, the discussion of a parameter of the mobile client 500 as a distance parameter and the distance thresholds in FIG. 8 is not to be construed as limitations.

The QoS failover application 783 may further synchronize the metadata input 806, the video data input (full-motion video 804 or still shots 808), and/or the audio input (full-quality audio 805 or downgraded audio 811) over a timeline during transmission, accounting for gaps in the data inputs, so that any playback of the data inputs will present the data in real time. In this way, a single multimedia file may be generated for the data inputs. In some instances, as further described below, the multimedia file may be further tagged with an Event ID or Incident ID.

Figure 9:
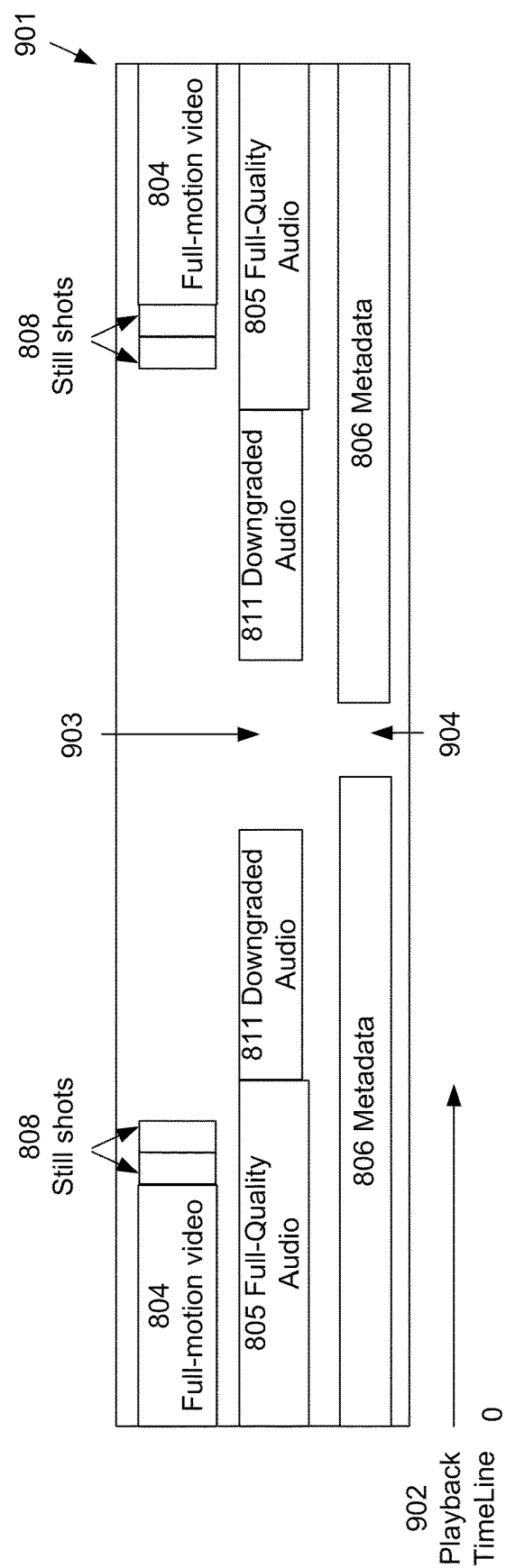
FIG. 9 is a diagrammatic illustration of an exemplary data asset in the form of a multimedia file that includes synchronized data inputs.

FIG. 9 is a diagrammatic illustration of an exemplary data asset in the form of a multimedia file generated by the QoS failover application 783 that includes synchronized data inputs from the mobile client 500. The multimedia file 901 is presented in the context of a playback timeline 902. As shown, the full-motion video 804, the still shots 808, the full-quality audio 805, the downgraded audio 811, and the metadata 806, as transmitted by the mobile client 500 may be temporally synchronized. For example, synchronization may be implemented so that the dialogue in the full-quality audio 805 matches mouth movements in the full-motion video 804, and the metadata 806 may indicate the geolocation at which the other data inputs are captured. In another example, at the point where the camera switches to still shots 808, the duration that each still shot is presented may correspond to the gaps in time between still shots 808. In such an example, if the camera was taking a still shot 808 every two seconds, each of the still shots 808 may be displayed for two seconds during the playback of the multimedia file 901.

In this way, a still shot 808 is always displayed during the continuous playback of a portion of the full-quality audio 805 that corresponds to the still shots 808. However, corresponding to the point in which the receipt of the still shots 808 by the mobile client 500 was terminated during the initial recording, no video data may be displayed during the playback as full-quality audio 805 continues to play. As further playback reflects the original data inputs capture, the full-quality audio 805 may become downgraded audio 811 as the playback progresses.

At some point in the playback, as shown by gap 903 in the audio input, the downgraded audio 811 may also cutout when the playback reflects the fact that the receipt of the audio by the mobile client 500 had also been terminated. No audio or video is presented during the gap 903, although any metadata 806 that indicates geolocation and/or that is user-defined may be continue to be displayed. However, at a further point shown by the gap 904, the metadata 806 may also cut out during playback if the data connection between the mobile client 500 and the recipient device 802 is completely severed. At such a point, a time counter may be displayed to indicate the passage of the playback timeline 902. When the time corresponding to the gap 904 passes, metadata 806, downgraded audio 811, and full-quality audio 805 may once again be available. When still shots 808 are again available as the playback timelines continues, the still shots 808 are once again presented in the same manner as previously described before the gap 903. The resumption of the still shots 808 may reflect the fact that the mobile client 500 had moved back into sufficient range of the recipient device 802 to provide the still shots 808. Finally, the full-motion video 804 may resume in synch with the full-quality audio 805, reflecting the fact that the mobile client 500 had moved further closer to the recipient device 802 during initial input capture. In this way, the data in a data asset that is captured by the mobile client 500 may always be temporally synchronized regardless of manipulation for quality of service purposes. In some implementation in which the mobile client 500 has the ability to buffer the downgraded audio 811, the still shots 808, and/or the metadata 806, the QoS failover application 783 may further fill in any gaps due to signal disruption when the data-asset is not consumed in real-time. Thus, depending on the size of the memory 713 and/or duration of signal disruption, one or more of the gaps 903 and 904 may be eliminated during subsequent playback.

Additionally, the QoS failover application 783 may also temporally synchronize each of the data inputs to real-time even in completed absence of any other data inputs. For example, each still shot related to an event may be presented for the duration until the next still shot is taken, so that a still shot is always displayed during playback until no video data is available. In another example, the QoS failover application 783 may also temporally synchronize full-motion video 804 to real time in absence of still shots 808 and/or audio inputs.

Further, as described below, in addition to the display of the metadata 806, metadata entered at a network operations center (NOC) may also be displayed during playback. In certain instances, the metadata may also be temporally synched with the video and/or audio inputs, so that the appropriate metadata is presented when a particular still shot, video portion, and/or audio portion is presented during playback.

Figure 10:
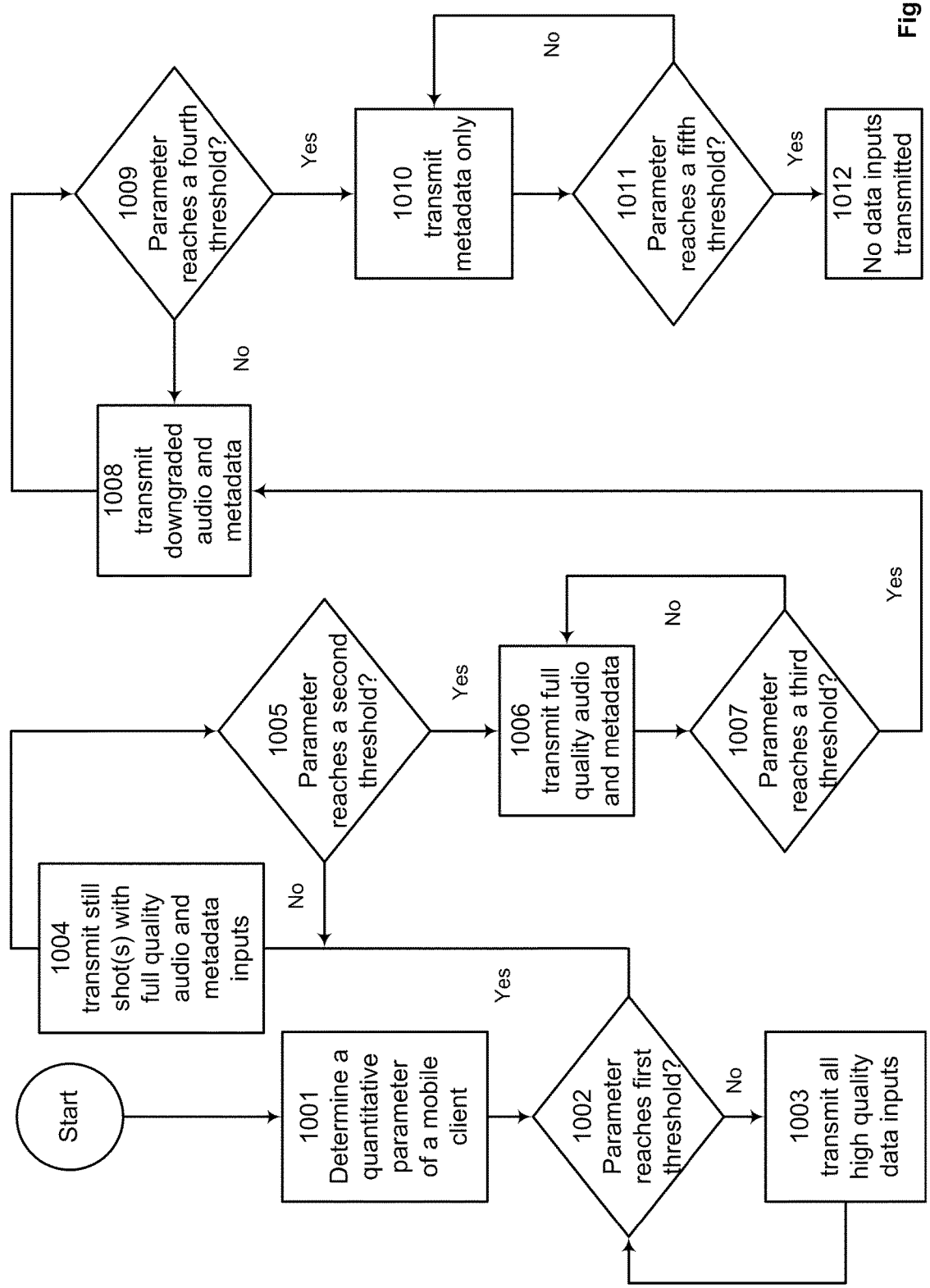
FIG. 10 illustrates an exemplary method of selectively modifying data inputs that are transmitted from a client device that is running the client software platform to a recipient device.

FIG. 10 illustrates an exemplary method of selectively modifying data inputs that are transmitted from a client device that is running the client software platform 700 to a recipient device 802. The client device may be the mobile client 500 described in FIG. 5. The modifications may change the amount and type of data inputs that are transmitted based on a quantitative parameter of the mobile client 500.

In step 1001, the QoS failover application 783 may determine a quantitative parameter of the mobile client 500 to use to modify the data inputs. In some implementation, the quantitative parameter may the distance between the mobile client 500 and the recipient device 802. In other implementations, the quantitative parameter may be the signal strength of the data signal 801 that carries the data inputs from the mobile client 500 to the recipient device 802, a SNR of the data signal 801, or a CNR of the data signal 801.

In decision step 1002, the QoS failover application 783 may determine whether the parameter reaches the corresponding first threshold. For example, if the parameter is a signal strength of the data signal 801, the QoS failover application 783 may determine whether the signal strength has fallen to a first signal strength threshold. If the parameter does not meet the first threshold, e.g., if the signal strength has not fallen to the first threshold strength, the QoS failover application 783 may enable the mobile client 500 to continuously transmit all high quality data inputs at step 1003 prior to proceeding to decision step 1005. The high quality data inputs may include full-motion video 804, full-quality audio 805, and metadata 806.

Otherwise, if the QoS failover application 783 determines that the parameter has reached the first threshold at step 1002, the QoS failover application 783 may transmit still shots 808, the full-quality audio 805, and the metadata 806 at step 1004 prior to proceeding to decision step 1005. For example, the parameter may be signal strength that has fallen to the first strength threshold.

In decision step 1005, the QoS failover application 783 may determine if the parameter reaches a second threshold. For example, the QoS failover application 783 may determine if the signal strength of the data signal 801 has fallen to a second signal strength threshold that is less than the first signal strength threshold. If the parameter does reach the second threshold, the QoS failover application 783 may cause the mobile client 500 to terminate the transmission of the still shots 808, and only transmit the full quality audio 805 and the metadata 806 to the recipient device 802 at step 1006. Otherwise, if the QoS failover application 783 determines that the parameter has not reached the second threshold at the decision step 1005, the mobile device 500 may continue the transmission of the still shots 807 with the full quality audio 805 and the metadata 806 when the process returns to the step 1004.

In decision step 1007, the QoS failover application 783 may determine if the parameter reaches a third threshold. For example, the QoS failover application 783 may determine if the signal strength of the data signal 801 has fallen to a third signal strength threshold that is less than the second signal strength threshold. If the parameter does reach the third threshold, the QoS failover application 783 may cause the mobile client 500 to transmit only the downgraded audio 809 and the metadata 806 to the recipient device 802 at step 1008. Otherwise, if the QoS failover application 783 determines that the parameter has not reached the third threshold at the decision step 1011, the mobile client 500 may continue the transmission of the full quality audio 805 and the metadata 806 when the process returns to the step 1006.

In decision step 1009, the QoS failover application 783 may determine if the parameter reaches a fourth signal strength threshold. For example, the QoS failover application 783 may determine if the signal strength of the data signal 801 has fallen to a fourth threshold that is less than the third signal strength threshold. If the parameter does reach the fourth threshold, the QoS failover application 783 may cause the mobile client 500 to terminate the transmission of all data inputs except the metadata 806 at step 1010. Otherwise, if the QoS failover application 783 determines that the parameter has not reached the fourth threshold at the decision step 1009, the mobile client 500 may continue transmission of the downgraded audio 809 and the metadata 806 when the process returns to the step 1008.

In decision step 1011, the QoS failover application 783 may determine if the parameter reaches a fifth threshold. For example, the QoS failover application 783 may determine if the signal strength of the data signal 801 has fallen to a fifth threshold that is less than the fourth threshold. If the parameter does reach the fifth threshold, the QoS failover application 783 may cause the mobile client 500 to terminate the transmission of all data inputs. In the context of signal strength, the fifth threshold may be a point at which the data connection based on the data signal 801 is completely lost. Otherwise, if the QoS failover application 783 determines that the parameter has not reached the fifth threshold at the decision step 1011, the mobile client 500 may continue the transmission of the metadata 806 at the step 1010.

It will be appreciated that while the example given in FIG. 10 is related to a signal strength parameter and thresholds that are signal strength thresholds, parameters of the mobile client 500 and corresponding thresholds that are based on other quantitative characteristics of the mobile client 500 may also be implemented. For example, the thresholds may be distance thresholds in order of increasing magnitude when the parameter of the mobile client 500 is its distance to the recipient device 802. In another example, SNR thresholds or CNR thresholds in the order of increasing noise in proportion to the signal that actually carries data may be implemented when the parameter is the SNR or CNR of the data signal 801. Thus, discussion of the parameter and the thresholds in FIG. 10 is not to be construed as limitations.

In other instances, since the capabilities of the camera on the mobile client 500 may vary, the QoS failover application 783 may also adjust the format of the video data from the camera based on the capabilities of the camera on the mobile client 500.

Figure 11:
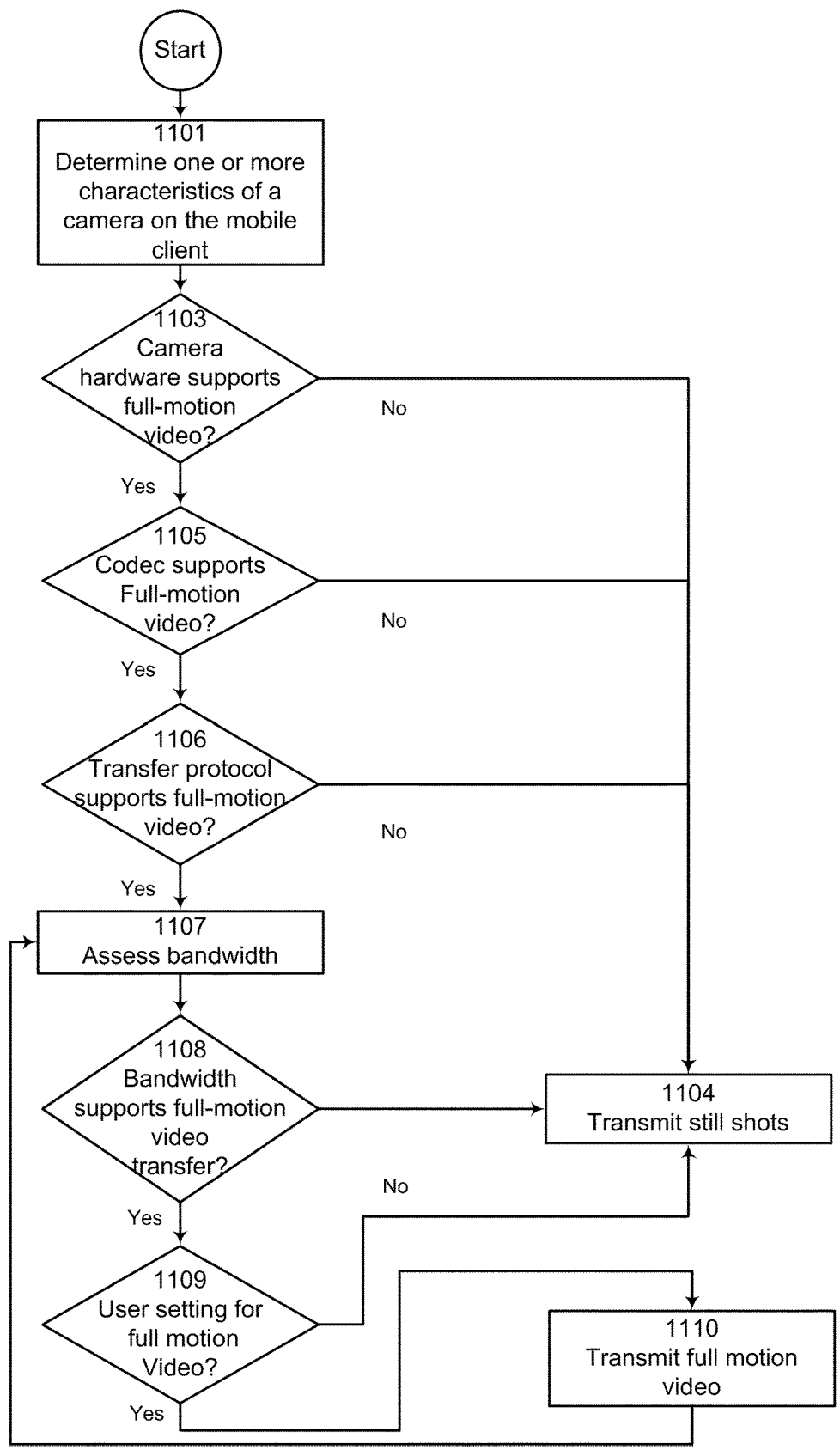
FIG. 11 illustrates an exemplary method of selectively transmitting still shots or full-motion video, as captured by a capture device, to a recipient device.

FIG. 11 illustrates an exemplary method of selectively transmitting still shots or full-motion video that are captured with a camera that is on a capture device. The capture device may be the mobile client 500. The camera on the mobile device 500 is at least capable of capturing and transmitting still shots. In at least one instance, the still shots or full-motion video may be transmitted with the audio captured by a microphone of the capture device.

In step 1101, the QoS failover application 783 may determine one or more characteristics of a camera of the mobile client 500. The characteristics of the camera may include, but is not limited to, a transfer protocol used to transmit the video data, a codec used to encode the video data, camera hardware specification, and/or the like. In instances in which the camera has "plug-and-play" capabilities, the QoS failover application 783 may automatically determine such characteristics. In some instances, the camera may provide metadata to the QoS failover application 783 that includes information on such characteristics. In other instances, the camera may provide only model and/or manufacturer information, and QoS failover application 783 may extract the characteristic information from an internal database using the model and/or manufacturer information.

In decision step 1103, the QoS failover application 783 may determine whether the camera hardware supports full-motion video. For example, the nature of the aperture, focus mechanism, night vision capability, image sensors, and/or processing circuitry employed in the camera may limit the camera to only able to capture still shots, rather than being able to capture full-motion video. If the QoS failover application 783 determines that the hardware of the camera does not support full-motion video, the QoS failover application 783 may command the mobile client 500 to transmit still shots to the recipient device 802 at the step 1104.

Otherwise, the QoS failover application 783 may determine whether the camera includes a codec that supports the encoding of captured video data into full-motion video. For example, codec may conform to MPEG-4, H.264, or other standards. A camera that does not support full-motion video may lack such a codec. If the QoS failover application 803 determines that the camera is not equipped with such a codec, the QoS failover application 783 may command the mobile client 500 to transmit still shots to the recipient device 802 when the process returns to the step 1104.

Otherwise, the QoS failover application 783 may determine whether the camera uses a transfer protocol that supports full-motion video. The transfer protocol may encode the video data into data packets for transfer from the camera to the mobile client 500. For example, real-time transport protocol (RTP) is a standardized protocol for delivering full-motion video and audio. If the QoS failover application 803 determines that the camera is not equipped with a transfer protocol that is capable of delivering full-motion video to the mobile client 500, the QoS failover application 783 may command the mobile client 500 to transmit still shots from to the recipient device 802 when the process returns to the step 1104.

Otherwise, in step 1107, the QoS failover application 783 may assess the bandwidth of a wireless communication connection between the mobile client 500 and the recipient device 802. Bandwidth may be assessed based on a rate of data transfer, which may be measured in bits per second (bps), or throughput, which is the average rate of successful data delivery.

In step 1108, the QoS failover application 783 may determine whether the assessed bandwidth supports full-motion video transfer from the mobile client 500 to the recipient device 802. The determination may be based on whether the bandwidth meets a predetermined rate of transfer threshold, and/or a predetermined throughput threshold. If the bandwidth does not support full-motion video transfer, the QoS failover application 783 may once again command the mobile client 500 to transmit still shots to the recipient device 802 when the process returns to the step 1104.

Otherwise, if the bandwidth is sufficient to support full-motion video transfer, the QoS failover application 783 may determine whether the user configured setting for the mobile client 500 provides for the transmission of full-motion video to the recipient device 802 at step 1109. In various implementations, a user may explicitly configure the mobile client 500 to transmit still shots rather than full motion video to the recipient device 802. For example, the user configuration for the transmission of still shots rather than full-motion video may be based on a time of the day, week, month etc. In another example, the mobile client 500 may be configured to transmit still shots rather than full-motion video due to business considerations. As such, a lower fee payment to the owner of the mobile client 500 may only provide still shots, while a higher fee payment may be made in exchange for full-motion video.

If the settings to the mobile client 500 configure the client to transmit still shots to the recipient device 802, the mobile client 500 may do so when the process returns to the step 1104. Otherwise, if the settings to the mobile client 500 configure the client to transmit full-motion video to the recipient device 802, the transmission of the full-motion video in such a manner may be accomplished at step 1110.

Since the bandwidth may change constantly, a loop back to step 1107 may be performed so that the QoS failover application 783 may continuously assess the bandwidth as long as the QoS failover application 783 is transmitting video data to the recipient device 802. It will be appreciated that if the full-motion video or the still shots is captured contemporaneously with audio, as previously discussed with respect to FIG. 9, the QoS failover application 783 may synchronize the video and the audio inputs to generate a single multimedia file. In some instances, as further describe below, the multimedia file may be further tagged with an Event ID or Incident ID. Moreover, in instances in which bandwidth is only capable of supporting the transmission of still shots, the number of still shots transmitted by the mobile client may be proportional to the bandwidth. In other words, the higher the bandwidth of the wireless communication connection, the more numerous the number of still shots transmitted.

It will be appreciated that while the capture device is described in the context of the mobile device 500 in FIG. 11, the capture device may be in the form of other devices that are capable of capturing video data in other embodiments. For example, the capture device may be one of the user devices described below in FIG. 15. Thus, the discussion of the mobile device 500 in FIG. 11 is not to be construed as limitations.

Multimedia File Control

As described above, the QoS failover application 783 may synchronize the video and the audio inputs to generate a single multimedia file. Since the multimedia file described above is similar to other data assets, the correlation and presentation tool 220 may also perform functions on such multimedia files as previously described. The correlation and presentation tool 220 treat a multimedia file that includes a plurality of still shots as a single data asset rather than discrete data assets, in the same way a multimedia file that includes full-motion video is treated as a single data asset.

The correlation and presentation tool 220 may be used to tag a multimedia file that captures an event with an Event ID or Incident ID, as previously described with respect to other data assets. The multimedia file may be further linked with a case. The correlation and presentation tool 220 may filter a multimedia file that captures a single event using queries based on metadata associated with the multimedia file. In this way, the correlation and presentation tool 220 may enable the user 144 to locate particular portions of multimedia file that contain video or audio data of interest.

The correlation and presentation tool 220 may also perform queries on a plurality of multimedia files, so that a particular multimedia file having certain video or audio data may be located based on associated metadata, or in conjunction with a certain Event ID or Incident ID.

The multimedia file may be further played back and manipulated via the presentation application 789 that is previously described. It will be appreciated that a similar presentation application with the same features may also be used at the NOC to display and enable user 1207 to manipulate the multimedia files.

(iv) Client Synchronization ("Client Sync")

Consider the case where data assets from multiple mobile client side support to aid consistency and reliability of media and metadata clients are to be correlated. The Client Sync application 784 provides the across the clients, hence the term sync. Upon activation, the Client Sync registers the mobile client with a web service or equivalent. The web service provides an Event ID and in turn the mobile client via the Client Sync uploads data assets to the web service. The data assets are tagged with the Event ID. The Client Sync also provides location samples to the web service, as to allow for tracking of the mobile client. When data assets are uploaded, the Client Sync also appends to the data asset a checksum. Upon upload, the web service can validate the authenticity of the uploaded data asset. The checksum (also called a heartbeat) can also contain additional metadata. For its part, the web service can also provide additional metadata. For example, consider a law enforcement scenario with multiple officers. Each of the officers has a mobile client and already is associated with an Event ID. When a particular incident occurs, the web service can provide an Incident ID that gets associated with the officers proximate to the event. This Incident ID gets associated with all data assets uploaded until the web service rescinds the Incident ID. In this way, later the data assets associated with the Incident ID may be easily identified.

Identifying relevant mobile clients to send the Incident ID relies on knowing the location of the mobile clients. If an officer indicates that an incident has occurred, either through a hotkey or a message, the web service attempts to identify which other mobile clients with the same Event ID are proximate. Usually this may be done via GPS. However, as described in the hardware section above, GPS is prone to error from GPS signals bouncing off of buildings, location may alternatively be determined by triangulating signal strength or weakness from different cell towers with known locations. For relatively immobile clients, such as surveillance tower cameras, geolocation via IP address may be employed.

(v) Remote Control

The remote control application 785 takes advantage of the full network stack on the mobile client. Consider the case where the mobile client has an IP address and is fully participating on a network. The remote control application contains a proxy to intercept remote instructions, either through SMS or from a direct IP connection to a remote site. Accordingly, a remote user can fully control the client, either for maintenance such as patching and upload of data assets.

(vi) Preview

The preview application 786 is not an application to preview data. Rather it is an application to guarantee that media captured in the preview buffer of a video camera is recorded along with the rest of the event. On video cameras with preview, a memory buffer stores the first few seconds of data. This buffer could store an arbitrary amount of time. Upon recording, the video begins recording at the time of triggering, in other words at the start of the event to be recorded. However, for security cameras and other applications, it may be preferable to store the previous few seconds in the preview buffer as well to ensure complete recording. Accordingly, a RFID triggered security camera function in a mobile client configured with the platform as disclosed would store not only the event upon triggering the camera, but also the first 10 seconds. In this way, the video would store not only the event, but the precursor events that led to the event.

(vii) Custom Charger

Mobile devices such as the mobile client as disclosed require constant recharging. A custom charger application 787 determines how much charge is left in the battery, and provides alerts when charge is low. Furthermore, in cases of inductance charging, the custom charger can store information about how much power is needed to recharge the battery. It could also store rules on detecting when charging coils were sufficient proximate and stable to trigger charging functions.

(viii) SMS Based Mobile Client Control

The ability to receive short message system (SMS) messages and trigger software events provides a general mechanism to remotely control a phone. Specifically, a mobile client that has an SMS capable transceiver may monitor SMS calls and perform software routines in responses. Specifically, one of the custom drivers 725 could be an SMS driver to allow the ability to monitor SMS calls for custom commands. Calls to and from the SMS driver could be intercepted and hooked. When a predefined SMS message to a predefined location is received, it could trigger an event in event model 751 which in turn could be utilized in an application 788.

An alternative embodiment is to have a daemon application 788 without the driver or event model to directly monitor SMS messages such that when a predefined SMS message to a predefined location is received it would perform a particular prespecified task.

An example application for monitoring SMS messages relates to law enforcement. A "stealth" recording feature may be implemented where a mobile client receives a SMS message which includes a phone number, the SMS message instructs the mobile client to start recording its environment and transmit the audio and/or video over the received phone number. Another SMS message could instruct the mobile client to stop recording and transmitting. Variations on this scenario where an SMS message instructs the mobile client to initiate a phone call but does not record, as to the type of media to transmit, and whether to use the calling number as the destination to transmit recorded media will be appreciated by one of ordinary skill in the art.

In particular, Table A as follows provides an exemplary mapping of events to SMS Messages to be interpreted a control instructions operative to control a mobile client's stealth recording function:

TABLE A

Event to SMS Mapping for Stealth Feature

| Event | SMS Message | Description |
| --- | --- | --- |
| Recording Start | #*77 | Start recording media |
| Call Start | #*27 + phone # | Initiate call to phone #. If phone # is not specified, then initiate call on the sender's phone #. |
| Recording/Call Start | #*7727 + phone # | Initiate call to phone # and start media recording. If If phone # is not specified, then initiate call on the sender's phone #. |
| Recording Halt | #*74 | Terminate ongoing media recording. |
| Call Halt | #*24 | Terminate ongoing phone call. |
| Recording/Call Halt | #*7424 | Terminate the ongoing media recording and phone call. |

The mobile client may optionally send a response SMS message to the sender to confirm receipt of messages, proper operation of the client, or error messages. The SMS messages could be used as a protocol, including but not limited to triggering software events by the receiver. For example, an SMS acknowledgement for starting a call could trigger a software server to start receiving streaming media. Another example would be to receive an error SMS stating that a connection could not be established, and displaying the error message as part of a computer application.

The mobile client could receive SMS messages from any SMS source. These include but are not limited to other mobile devices and computer applications with a cell that could transmit SMS. Accordingly, protocols could be established over SMS between two mobile devices or with a custom computer application with capable of transmitting and receiving messages compliant with the SMS protocol.

Although the SMS messages above are merely exemplary, a sample session may be as follows. The mobile client receives an SMS message #*27 1-555-555-1234. In response, the mobile client starts a phone call with 1-555-555-1234, and immediately sends an SMS acknowledgement. The mobile client then receives an SMS message of #*77. The mobile client immediate starts recording video and audio. If the recording cannot be performed, the mobile client would send back an SMS error message to 1-555-555-1234. Periodically, the mobile client will upload files to an FTP server or other host. Alternatively, the calling number 1-555-555-1234 could provide a connection to an FTP server or equivalent. In another alternative, the server to which 1-555-555-1234 provides connectivity could trigger a streaming receipt upon receiving the acknowledgement SMS from the mobile client. The mobile client, upon receiving #*74 and send an acknowledgement SMS and would halt recording. A new recording could be established the mobile client receiving #*77 and again halted by the mobile client receiving #*74. Similarly upon receiving #*24, the mobile client would stop the call and send an acknowledgement.

(ix) Playback

The presentation application 789 may be a media player that presents the data assets recorded by or stored on the mobile client 500. The data assets may include audio, full-motion video, and/or still shots. The data assets may also include full-motion video and/or still shots that are temporally synchronized by the QoS failover application 783. The presentation application 789 may include codecs that enable the presentation application 789 to decode and present data assets that are stored in various formats, such as H.264. During operation, the presentation application 789 may present a user interface that enables the selection of data assets by presenting thumbnails that represent corresponding data assets.

The presentation application 789 may further provide other playback control functions, such as, but not limited to, play, stop, fast forward, fast back, skip forward, skip back, and/or the like, for the manipulation of a data asset. The presentation application 789 may further include a time slider user interface that enables a user to skip forward and/or back through different portion of a data asset. The presentation application 789 may have further ability to render still shots in a data asset as a slide show.

(x) Other

The above applications are not intended to be an exhaustive list of applications available. General utilities such as profile management (not shown) are available. A profile manager could store user information such as name to be used as default metadata. It could also store results about memory usage, bit rate, and resolution of stored media.

Commercial utilities can also be implemented on this platform. For example in the case of law enforcement, the mobile client might have a hot key for a police officer to indicate the officer has been attacked or shot. The video would trigger to store the preview buffer as well as the current events, and a central station could call for backup asking other police to converge on the attacked officer's GPS location.

Another law enforcement example is the alternative log on/password utility for undercover policemen. The alternative log on/password utility accepts two passwords. One password activates all the law enforcement functionality on the mobile client and displays a user interface specific to the law enforcement functionality. A second password simply displays an ordinary user interface expected on an ordinary cell phone, and additionally may activate a call for backup to the central station. Specifically, when an undercover policeman begins to be suspected to be a cop by those he or she is investigating, the policeman might be searched. Ordinarily, if the policeman is searched, and the mobile client is found, an inspection of the mobile client might arouse suspicions that the undercover policeman is a cop. The undercover policeman could enter a the second password into the alternative log on/password utility while would show the ordinary cell phone user interface and may help convince others that the undercover policeman is not a cop. In the meantime, the backup call to the central station would allow other policemen nearby to rescue the undercover cop.

Commercial utilities are not limited to law enforcement. The mobile client may support applications not specific to its video or networking capabilities. An example of a commercial utility not specific to law enforcement is where the client could store an audit function (not shown) that indicates that an unauthorized person has attempted to open the tamper-proof chassis. An example of using the SMS based mobile client control feature, such as used by the Stealth feature described above, is the case of a lost mobile client. The mobile client may host an application that upon receiving a message, such as an SMS text message, may un-mute a mobile client with its ringer turned off or alternatively may activate a mobile client that is in sleep mode, and then ring the device. In this way, a mobile client that has been misplaced in a room, where the ringer has been turned off or cannot otherwise be located simply by dialing the mobile client's number.

Exemplary Non-Client Software Applications

Once the data assets are tagged and available on a central store, they may be searched, correlated, tagged, edited, and presented either collectively via a web service, or to a closed set of users via a standalone application. The platform as disclosed gives rise to both types of applications.

Regarding a web service, groups may correspond to a group. The data reviewed by the groups, the content of the tags, and comments, made by the group may be queried for possible advertising. Because the group is self selecting, the fit of ad selection will improve a selection algorithm, based strictly on scanning media content, and metadata. In FIG. 2, the external data store 230 as provided with correlating metadata in 260 could be the correlation of advertising.

Network Operations Center

Figure 12A:
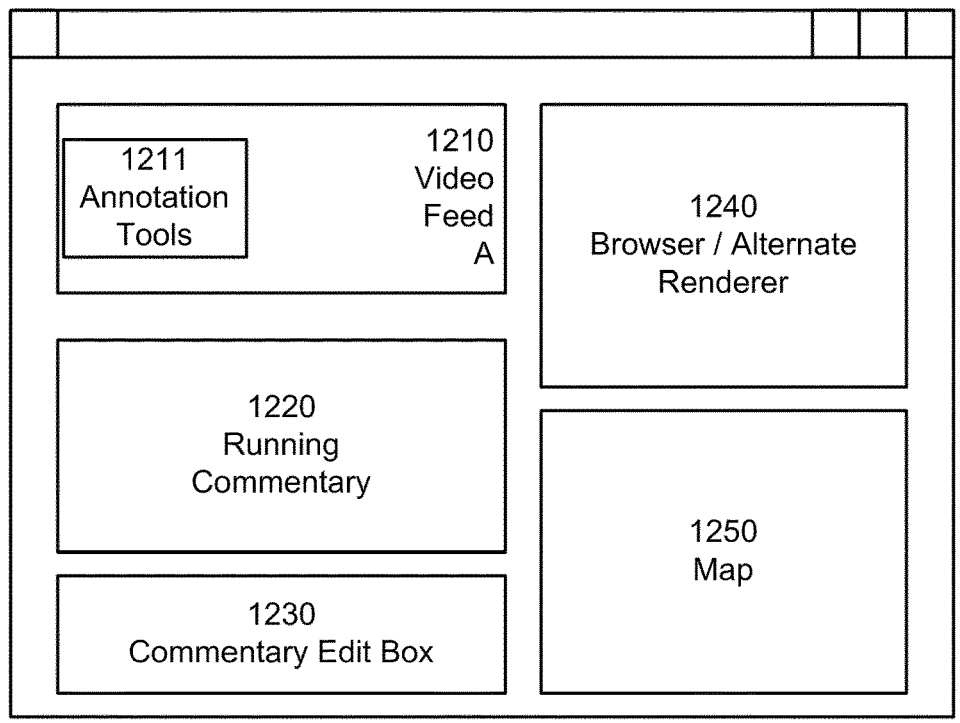
FIGS. 12A and 12B are diagrammatic illustrations of exemplary non-client software applications in accordance with various embodiments for correlating media for distributed services.
Figure 12B:
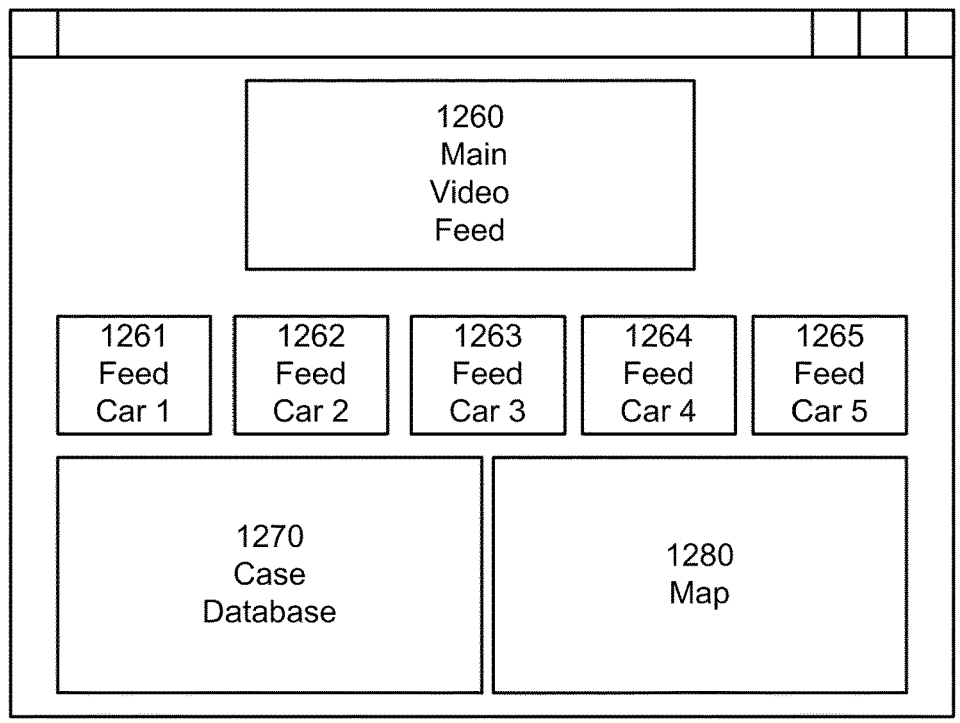

FIGS. 12A and 12B show a non-client based commercial application of the present platform, a network operations center ("NOC") of a law enforcement agency.

The NOC provides the capability of viewing individual videos. In video feed 1210, a video, or potentially another form of multimedia will be rendered. Annotation tools 1211 provided allow a user select one or more frames of running video, superimpose text, links, or other content, perhaps associating to a single object, such that the annotations render upon playback. Many tools presently exist for annotation of video and multimedia in general. Running commentary box 1220 provides a control with which to view commentary and commentary edit box 1230 provides a place to add additional commentary. Commentary text is persisted to a database and is associated with the multimedia file being rendered. Commentary is distinct from annotation in that the text is visible at all times in the running commentary box 1220 during rendering, whereas annotation only appears for specific frames and is superimposed over video as rendered in the video feed 1210. Associated videos, stills, text or other multimedia may render at the same time in browser 1240. For example, links from the annotation may render in browser 1240. Map 1250 may also display the location of the video. For example, if the video is by a police car in hot pursuit, the map may show a point rendering geolocation of the path of the pursuit itself.

The NOC has a "supervisor mode" shown in FIG. 12A, where data feeds, including video and audio, are coming from police officers proximate to an incident. Specifically, a police officer encounters an incident and presses a hot key telling the NOC that an incident is under way. The NOC can start an incident record and the police officer's feed appears in Car Feed 1, item 1251. Because it is the first feed, it also appears in the main video feed 1260. The map 1280 then centers on the location of that particular officer. The incident ID may be used as an Event ID.

On the map, the user can view other officers near to the incident and can either manually select other officers individually by clicking on the officers, or by dragging and dropping a bounding rectangle over the location. In the alternative, the application can use a predefined distance and automatically join other officers. Each joined officer's feed then shows in feeds 1261, 1262, 1263, 1264, 1265 and so on.

When an officer is joined, the officers' feed is associated with the Event ID and defines a group. Thus joining officers within a predefined distance and unjoining officers that go out of that predefined distance is an autogrouping feature.

The main video feed 1260 may display which of the feeds 1261, 1262, 1263, 1264 or 1265 to concentrate on. Alternatively, the main video feed may automatically switch between which officer is closest to the incident. Note that the video feed is not a composite view, but rather is an example of multiple videos being shown side by side based on correlation metadata.

If the data is being viewed after the fact, browser 1270 can bring up data from the law enforcement's case database. All media files with the Event ID may then be automatically tagged with the Case ID from the case database. In this way, data from the case database may be provided in an integrated view along with the media.

Law enforcement mobile clients have redundant local storage that is eventually uploaded for archiving. The application can provide a scanner function (not shown) that can manage uploading from the mobile clients, can tag the file as archived thus preventing redundant storage. In the alternative the scanner function could seek similar clips based on Event ID and location and timestamp information and delete redundant clips. Because of the redundant storage, the NOC can provide security functions. Specifically the scanner function could also detect files tampered with by noting files with the matching data with different checksums. Additionally the NOC can check checksums on uploaded files to detect files intended to spoof the NOC.

Vertical Applications

The embodiments as disclosed may be used for both personal and commercial vertical applications. Advantages include but are not limited to: (1) reducing the price of camera monitoring via use of commoditized ever miniaturizing hardware and ever cheaper storage, (2) guaranteed full capture of an event by implementing preview buffers, (3) custom eventing where a camera may be triggered on an arbitrary event, (4) integration with other media via correlating metadata, and (5) integration with third party data via correlating metadata. The following sections will describe an exemplary application for personal use, an exemplary application for law enforcement, an exemplary application for security cameras, and will more generally enumerate other exemplary commercial scenarios.

Mobile NOC

The NOC application may be accessible via a web page on a notebook computer or other web enabled mobile device. Accordingly, all or portions of the NOC application may be viewed while in the field by a law enforcement officer.

An example application would be allowing a junior officer to patrol an area and to view indicia of incidents that occurred within a time frame in the present locale. In this way, the officer could more quickly learn the crime history of his location even though he had never been in the area before.

One embodiment would be to let an officer travel through a neighborhood. The officer would enter a time range of data to browse for the area, for example over the past year. The NOC application would pick up geolocation information of the roaming officer such as GPS location and display a map in the NOC would show pushpins indicating incidents within the specified time frame. The pushpins could be color coded, or have size or shape changes indicating the severity or recentness of the incidents. The officer could click on the event and view the video or associated media to learn more. In this way, the officer could familiarize himself as to the crime history of an area in near-real time.

The mobile NOC need not be in real-time. An officer could be in an area, and if he wished to learn more about the crime history of his location, he could open the NOC application and specify his current location and search for crimes within a time area and various search criteria. In this way, upon entering a crime scene the officer might find related crimes not readily discernable from the crime scene itself. For example if there was an assault at a crime scene, the officer could quickly identify other assaults nearby and consider suspects from those crimes as well as leads from the present crime scene.

Peer to Peer Scenario Embodiment

Video cameras, digital cameras, and digital recorders are to be ubiquitous among law enforcement officers. It is not uncommon for several policemen, each with their own camera or recorder, to be proximate to a crime in progress. The embodiments as disclosed enable sharing and the automatic correlating of the resulting data assets.

Figure 13:
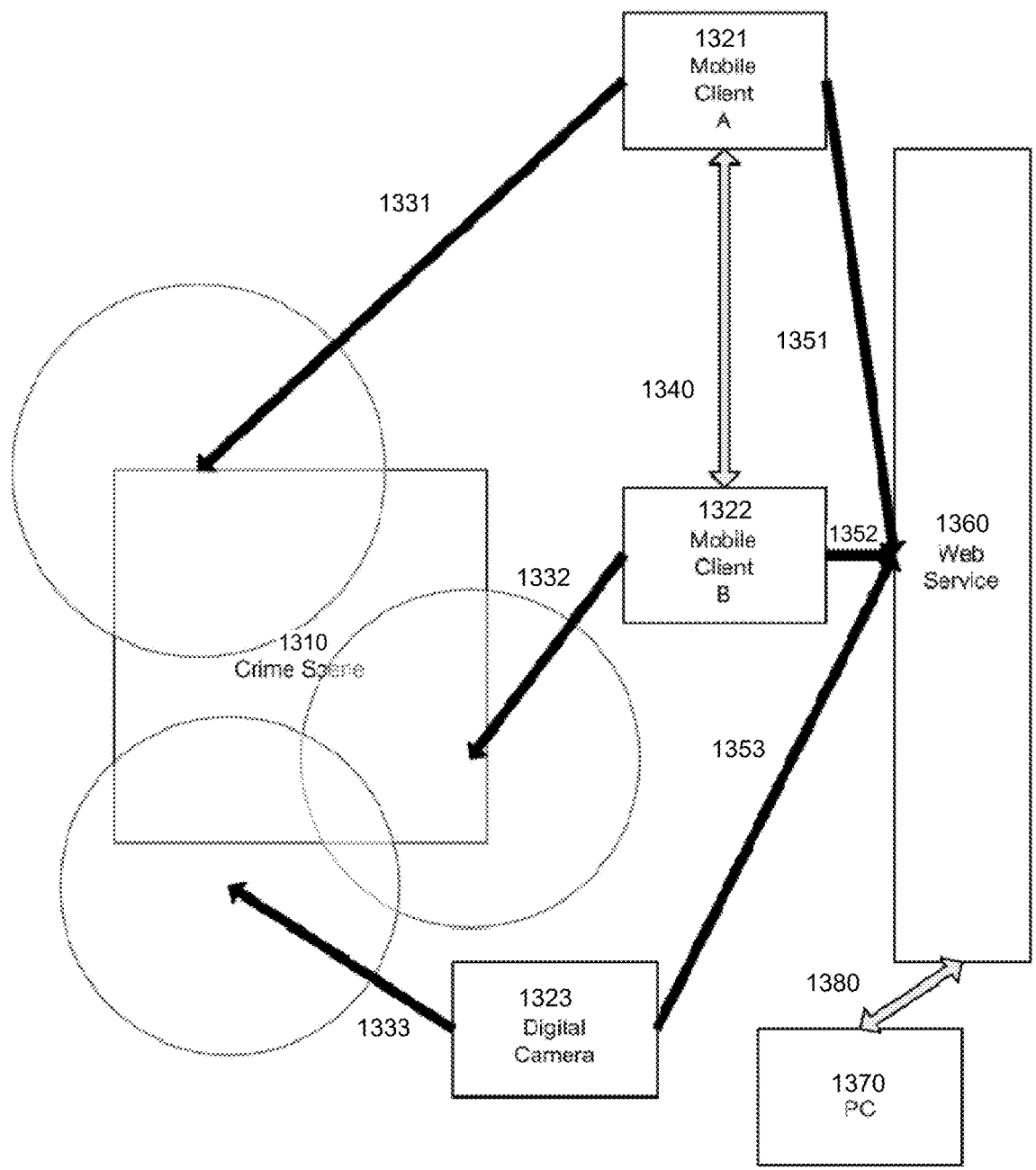
FIG. 13 is a diagrammatic illustration of the individual actors, hardware, and software applied to a personal use scenario of correlating media for distributed services.

FIG. 13 illustrates a scenario where three police officers, one with a personal camera 1323, the other two with cell phones enabled per the disclosure 1321, 1322, are proximate to the same crime scene 1310 in progress and start taking photos. The still shots capture different parts of the crime scene 1310, some overlapping, some not. Mobile client 1321 captures still shots 1331, mobile client 1322 captures still shots 1332, and digital camera 1323 captures still shots 1333.

Because mobile clients 1321 and 1322 are enabled per the disclosure, they are able to perform a peer to peer connection. Per the embodiment as disclosed, the initiating client 1321 identifies its device id, and enters a tag called "Robbery 1" and sends both to 1322 to use as an Event ID and as extra metadata. Mobile client 1322 sends an acknowledgement back to 1321, thus fully establishing data link 1340. Mobile client 1321 then downloads via IRDA all photos time stamped during a time frame corresponding to that of the crime from 1322, and mobile client similarly downloads all photos form 1321. Both clients automatically tag the photos moved through the data link 1340.

Standard camera 1323 is not configured per the present disclosure and cannot perform peer to peer transfer as mobile clients 1321 and 1322. Instead, the users of mobile clients 1321 and 1322 establish a group (not shown) on web service 1360 using mobile client 1321's Device ID as an Event ID. The user of standard camera 1323 then joins the group and when standard camera 1323 uploads chosen photos to the web service over data link 1353, the photos are automatically tagged with the Event ID and the meta tag "Robbery 1."

A user, such as a police supervisor back at headquarters, who is a member of the group (not shown) subsequently may access the web service 1360 via a PC 1370 over a data link 1380. The user may further upload related photos, such as getaway scenes of the robbery crime scene 1310 of persons of interest driving away, and again via the data link the photos are automatically tagged with the Event ID and the meta tag "Robbery 1." The user may also query, edit, tag, and combine photos on the PC.

It is to be emphasized that in the above scenario, media is not limited to photos. Video or audio could have been uploaded as well. The web service could have been a standalone application running on a network. Most importantly, the event, here exemplified by a crime scene 1310, need not have been at the same time or place. An Event ID could tie together any media regardless if they previously were related at all.

Law Enforcement Scenario Architecture Embodiment

Figure 14:
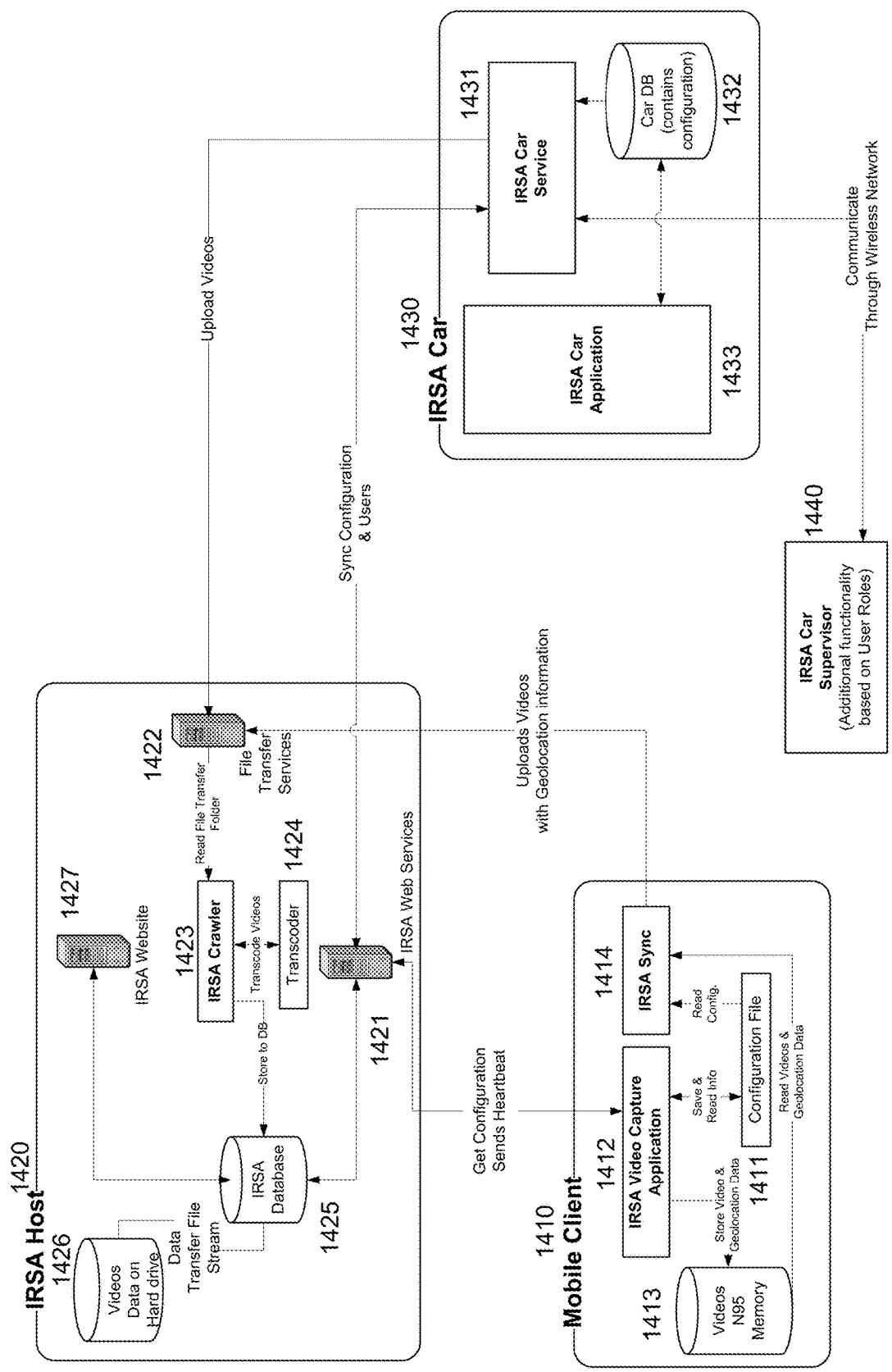
FIG. 14 is a diagrammatic illustration of the individual actors, hardware, and software applied to a law enforcement scenario of correlating media for distributed services.

FIG. 14 illustrates an exemplary law enforcement architecture embodiment. Consider the case where multiple active duty police officers are carrying mobile clients per the embodiments as disclosed. Police officers on foot carry a mobile client 1410, and police cruisers carry a mobile client 1430 in a chassis where the video camera is connected to the windshield, and the data is stored in a tamperproof, secure location. Exemplary tamperproof, secure locations include the trunk of the vehicle or glove box of the vehicle. In particularly hot climates, the trunk or glove box could be become so hot as to be beyond the operating temperature range of the data storage hardware portion may be in a secure cage integrated with the chassis of the vehicle, in a shaded and ventilated portion of the backseat. Alternatively, the tamperproof secure location could be integrated with cooling, such as an insulated cavity with refrigeration powered by electricity from the vehicle. Host 1420 provides data asset storage and archiving and backup services. Supervisor application 1440 is based on Wi-Fi connectivity and is hosted on a PC in a NOC. Both mobile clients 1410 and 1430 and the chassis of 1430 are based on the exemplary client described in FIG. 5 and supporting text. The supervisor application is as described in FIG. 12B and supporting text.

Host 1420 receives data assets from mobile clients 1410 and 1430 both in synchronous and via asynchronous upload. A web service 1421 can remotely configure a mobile client 1410 by checking the existing profile 1411 sending an updated profile via client application 1412. In general, client application 1412 functionality includes providing network connectivity to the host. The profile includes and is not limited to frequency of receiving an IP signal to poll the status of the mobile client. This signal is also called a heartbeat. Upon configuration, web service 1421 will send out a heartbeat according to that frequency, for example every 15 seconds. Client application 1412 will receive the heartbeat and return geolocation information, such as GPS coordinates. In the event of connectivity error, website 1427 would be able to indicate which mobile clients 1414 and 1430 have failed to connect or have not transmitted a heartbeat.

Because a mobile client 1410 and 1430 in the field broadcast geolocation information, a network operating center ("NOC") can get mobile location information from the host and know in real time the location of mobile units. This enables map applications. For example a NOC application may display selected units on a computerized view of a map, perhaps accessible via a web site 1427. Alternatively, particular mobile clients may be searched by geolocation. By way of another example, the NOC can have the location of a crime scene and the current location of a mobile unit 1410 and automatically map the optimal route for the mobile unit to get to the crime scene. This feature is also known as a "Get Me There" feature.

As client application 1412 captures media, it stores the corresponding data assets on storage 1413. Via synchronizing application 1414, the mobile client 1410 may either push the stored media via file transfer protocol ("FTP") to the file transfer server 1422, or the synchronizing application 1414 may be remotely triggered, for example via an SMS command, to affirmatively upload the stored media as data assets.

Once the data assets are uploaded to file transfer server 1422, a crawler application 1423 periodically scans the uploaded data assets. The data assets are placed into a folder queue and optionally associated with metadata, for example in the form of metadata tags corresponding to incident, or case. Transcoder 1424 converts the file formats of the data assets into a standard format, for example one based on H.264. Once transcoding is completed, if the transcoding is successful, crawler application 1423 archives the original file and stores the transcoded video to store 1426 and a reference to the transcoded video to database 1425. In the event of error, the uploaded data asset is placed into another directory for later review.

One error that may occur in particular with data assets stored as H.264 compliant files is the loss of the file index. A file might be partially uploaded, but because the file index is stored at the end of the file, none of the partial uploaded file is usable. Prior to transmission, synchronization application 1411 might store the H.264 index in a separate file, and redundantly upload the index. Because the index is much smaller than the media data in the H.264 file, corruption is less likely. In the event the uploaded H.264 file is truncated, the complete index, uploaded separately may be used to decode the portion of the H.264 file that arrived. If the H.264 file arrived intact, then the redundant index may be discarded.

Once data assets have been stored in the database 1425 and store 1426, they are accessible via a website 1427. The website may include functionality to search and view videos including external data such as case data. For example, it may enable "computer aided dispatch", where an officer is dispatched to a crime scene, incident information is entered by the dispatch via website 1427 and uploaded to database 1425, data assets are uploaded from mobile client 1410 or 1430, tagged with metadata corresponding to the incident, and the searched and viewed in composite afterwards.

Website 1427 may also provide various ways to quickly review video files. For example website 1427 might provide thumbnail or videocap views of videos to aid visual search. In some cases, a scroll bar might be displayed to allow the user to scan through individual frames in the video, rather than merely viewing a default frame.

Website 1427 may also integrate with external websites. For example, a supervisor may access website 1427 and upload a video to a public social networking site as part of a public alert such as missing child alert ("Amber alert").

Website 1427 may also provide visibility to monitor the status of uploaded data assets, and provide for bandwidth management and prioritization. For example, website 1427 may show what data assets have been uploaded, transcoded, or what percentage of the process is complete. It may also show which data assets have errors or are otherwise corrupt. Specifically, the website 1427, may review the contents of the file transfer server 1422 directories which store uploaded data assets, archived data assets, and corrupt data assets. It may further receive notifications from crawler application 1423 as to what percentage of an operation such as transcoding is complete. If a data file is to be prioritized for upload or transcoding, the website 1427 might provide a control to configure the crawler application 1423 accordingly.

Mobile client 1430 shows an alternative architecture for a client. Here car service 1431 combines the functionality of client application 1412 and synchronizing application 1414. Additionally, it provides network connectivity to a supervisor application 1440. Supervisor application provides the ability to provide remote control over client 1430 and to view configuration, status, and stored data assets on client 1430. On mobile client 1430, the mobile configuration and the captured data assets are stored in the same store 1432. Data assets are captured and reviewed locally by application 1433.

The following describes features and advantages enabled by the platform as disclosed for law enforcement.

(i) Chain of Custody

Police and security video may be used in evidence at trial. However, in order to be admissible, the evidence must be stored such that an unbroken chain of custody can be made, ensuring that the evidence was not tampered with. With the embodiments as disclosed, a metadata tag to store an Officer ID and a metadata tag to store a timestamp and action may be made. When the police video is stored, the tag stored the Officer ID of the owner of the mobile client. When the officer uploads for storage, the officer authorizes the upload which again tags the police video with Officer ID, timestamp, and action. When the data is received and archived, the archival officer may again tag the police video with his Officer ID, timestamp and action. Thus at all stages, the chain of custody of the video may be verified. For further security the metadata may be encrypted. Alternatively, checksums may be archived in a database to detect later tampering.

(ii) Providing Video ID

Because all video is uploaded and archived, witnesss who have been stopped may request an identifier for the video clip capturing their stop and a limited access account. The witness may then go to the law enforcement agency's web site, log on, and then view the footage of their stop. This will provide an incentive for officers to avoid excessive force and can provide evidence for and against any culpability.

(iii) Monitored Interrogation

When suspects in custody are interrogated by police officers, typically there is a camera to memorialize the event. However, a determined police officer can disable a typical security camera. If a mobile client enabled with RFID and preview is in the room, it will be difficult to tamper with the camera. Specifically, an officer with an RFID badge enters the interrogation room. The RFID badge not only triggers video recording, it also makes use of preview mode to capture the first 10 seconds prior to entry. Therefore, even if the officer were to tamper with the camera, the camera would have captured the first few seconds and would detect the tampering.

(iv) Emergency Dispatch

Often officers enter hazardous situations. When an officer is assaulted, the officer may hit a hotkey on the mobile device that acts as a panic button. The mobile client sends a notification that includes the officer identity and the officer's location which then goes to the NOC. The supervisor mode of the NOC includes map showing nearby officers which are also broadcasting their locations via GPS or other location services. The officer at the NOC may then quickly dispatch the proximate officers to the location.

(v) Blackout Versions of Video

Police videos are often used as evidence in trial. The embodiments as disclosed support post process editing of videos. Because it may be desirable to black out portions of video as unfairly prejudicial, both district attorneys and defense lawyers may edit out or black out portions of the video to be left out of the trial record. One way to do this is via professional post processing tools. A less expensive alternative would be to use an overly tool (a block of non color over top of the video) to place overlays blocks over the portions of the video to be blocked out. In this way, not only could portions of frames be provided rather than full blackout, faster turnaround of editing could occur.

Security Camera Scenario Embodiment

A variation of mobile officers carrying mobile clients is to have a mesh of security towers covering a geographic area. This would enable close circuit surveillance over an arbitrary area with minimal installation costs. Examples of locations where these may be applicable include but are not limited to be college campuses, airports, prisons and high crime areas. It is to be noted that a mesh of camera towers need not be limited to law enforcement scenarios. For example, a mesh of camera towers at a sporting event or an entertainment event would provide improved media coverage of the event. Each of the towers would have a mobile client configured with a full network stack to allow remote control over IP and Wi-Fi and a file manager to manage file upload and file deletion. Both the network stack and the file manager are discussed in FIG. 7 and the supporting text.

Each camera is network enabled and is independent in that it is a self contained recording and storage device that adds metadata such as time and location. Because the cameras house these on board capabilities, all that is needed locally is power. No communication cabling would be required.

Each camera could be configured to host a synchronizing application that was able to detect proximate cameras. An embodiment would be to refer to a web service that tracked the location of each installed camera, and from knowledge of its local location, could select proximate cameras.

To aid in backwards compatibility, where a camera did not have the necessary hardware initially, a hardware block with the missing hardware, e.g. to enable network connectivity, could be attached, and the necessary software components installed. Accordingly, previously purchased hardware could be made to be compatible for mesh applications.

However, collectively the cameras act together as a mesh of cameras that give a law enforcement agency a comprehensive view of what happened at the same location or close by locations at the same time. A NOC's supervisor mode could quickly search for all uploaded data assets from the camera at a particular time and location, and then view and edit them together.

Note that the cameras all networked peer to peer devices. Accordingly, an officer could come to a location where there were several devices present, such as the scene of a crime or other event, and could determine on his laptop or cell phone the locations of all the cameras. The officer could then choose cameras to download video to his laptop or cell phone, or by default download all videos from the surrounding cameras.

A camera need not start out as part of a mesh. A camera may operate independently until another camera is added to the network to establish a mesh. Thus a single camera, perhaps mounted on a pole, could provide ad hoc surveillance in a relatively short period of time. As time went on, other cameras could be incrementally added to establish a mesh. Cameras could also be removed as necessary.

Sports Replay Scenario Embodiment

A non-law enforcement scenario for using mesh is to replay sports games. Professional and other sports team's videotape games and practices to better assess points of weakness and to identify ways to improve the team and individual player's performance. An ability to view a play or action from multiple angles would provide a comprehensive way to assess the action.

By providing a mesh of multiple cameras incorporating the disclosures herein, multiple cameras may synchronize to the same clock. If four surrounding cameras were configured to view a play and were synchronized, the configuration would provide a quad view. Alternatively, cameras in the mesh could provide a mix of different views, for example a coach's view, views from two different players, and perhaps two sideline shots.

Per editing software using the metadata features disclosed herein, metadata specific to game analysis indicating for example the particular play, the context of the game and players involved could be added. For example for a football game, metadata indicating that a particular segment of media represented a first down, a running play, where Jones was the runner could be added. In addition to providing context upon playback, it also provides metadata enabling searching and filtering on kinds of plays, players, and other elements of interest in analyzing the game.

The game analysis metadata need not be rendered, but could also be used for statistical analysis of the game. One could determine likelihood of how a team or player reacted according to different situations. For example in football, one could determine that a team was significantly more likely to do a long pass on a first down than other teams.

Cameras using the present embodiment have a sharable format, thus different teams could agree to share media with each other. Because the camera's clocks could be synced to a global source, e.g. a web accessible value of global time, the different media could be synchronized with each other, even though they had been recorded separately by different parties. Accordingly, different views designed from different perspectives may be correlated together.

Other Possible Commercial Embodiments

Commercial embodiments are not limited to law enforcement. The following are some other commercial scenarios supported by the platform.

(i) Taxicab Scenario

The embodiments as disclosed can replace a taxicab's meter box and camera with a single device. Currently, most taxicabs install a meter box to show the fare charge. Some taxicabs also install a camera to show the face of the driver to the passenger. However meter boxes only show charges, not distance, route, or other information that may be of interest to the passenger.

A taxicab hosted client as disclosed, with a video camera and a GPS or other geolocation tracker, integrated with a map database and an external charge database may perform the roles of the meter box and camera for a lower price and with greater functionality including but not limited to: (a) a view for the passenger with start and end points on the map, with the specified route as calculated by software also shown so the passenger could proactively request a different route; (b) the passenger view displaying progress on the route by showing the taxicab's GPS tracking samples as the trip progresses; (c) the passenger view additionally showing not just taxicab fare information, but also time and distance information, traffic alerts, predictions of arrival time; (d) a log of the trip could be stored and uploaded via the mobile connection, or in the alternative could update via Wi-Fi upon parking, in order to provide an audit trail to a central office; (e) the passenger view could provide average trip times and other aggregated information from the audit information; (f) the client integrated with a printer could give a receipt with the information from the view upon request of the passenger; and (g) uploaded audit information could be used in training new taxicab drivers.

(ii) School Bus Scenario—Child Tracking

The present embodiments could monitor pickup and drop off of children. Currently typical school buses do not have onboard cameras. Accordingly, determining whether a child was dropped off at the correct location on the way home, or in the alternative determining if a child was correctly picked up relies on the bus driver's memory. In the case of a missing child, the camera could provide objective evidence as to whether the child was on the bus or not.

A school bus hosted client of the present embodiments with an eventing system for door opening and closing, a video camera with preview, and a geolocation tracker, integrated with a map database includes but is not limited to the following advantages: (a) when the school bus door opens or closes, the custom eventing system could trigger recording of the video camera; (b) the video camera would have several seconds of preview buffer, so would record a those several seconds along with the actual event of a child entering or exiting the school bus; (c) the custom eventing system could trigger turning off the video camera; (d) the geolocation tracker could trigger upon turning on the camera as well and along with a map database indicate where the pickup or drop off occurred; (e) the information could be archived to a central office via cellular upload or Wi-Fi; and (f) the archived information could be aggregated for statistics and in where no errors of pickup or drop off occurred, the information could be deleted to save storage.

(iii) Trucker Scenario

The present embodiments could monitor accidents for bulk transportation such as semi-rig trucks. Currently semi-rigs do not have onboard cameras. Accordingly, disproving the liability of a semi-rig in the event of an accident is difficult.

A truck hosted client of the present embodiments with an eventing system triggered by a vehicle crash detector such as disclosed in U.S. Pat. No. 4,161,228 which triggers airbags, a video camera with preview, a geolocation tracker integrated with a map database includes but is not limited to the following advantages: (a) when the vehicle crash detector detects a crash, the custom eventing system could trigger recording of the video camera; (b) the video camera would have several seconds of preview buffer, so would record a those several seconds along with the actual event of the crash; and (c) the geolocation tracker could trigger upon turning on the camera as well and along with a map database indicate where the accident occurred and upon upload could notify a central office as to dispatch a response team. Additional advantages may be realized by further integration with a telematics system which provides additional digital telemetry about the state of the truck. For areas that did not have cell phone coverage, alternative data transport such as packet radio could be implemented.

(iv) School Bus Scenario—Accident Tracking

As a hybrid of the previous School Bus and Trucking scenarios, an embodiment of the present disclosure could monitor accidents on school buses as well. Currently school buses do not have onboard cameras. Accordingly, determining causality and harm to children on the bus is difficult to prove.

A set of school bus hosted clients as described by the present disclosure, specifically with one or more cameras recording events outside of the bus and one or more cameras recording events within the bus, with an eventing system for crash detection, a video camera with preview, and a geolocation tracker, integrated with a map database includes but is not limited to the following advantages: (a) comprehensive monitoring for how events outside of the bus impact events inside the bus, including but not limited to bus collisions; (b) the video camera would trigger from a collision and would have several seconds of preview buffer enabling it to record several seconds prior to the collision; (c) the crash detector event could also trigger a collision message to a central location along with geolocation data indicating where the collision occurred; (d) the information could be archived to a central office via cellular upload or Wi-Fi; and (e) the central office could collect media from cameras not on the bus to provide different angles of the accident.

Exemplary Video Emergency Call Embodiment

Mobile devices with video capture and audio capture capabilities, as well as wireless Internet access capabilities, are nearly ubiquitous among residents of urban and rural areas. Some of such devices are described as devices 111-114 in FIG. 1. It is not uncommon for a resident to constantly carry or have access to a telecommunication device that is equipped with a camera and a microphone, video capture application that enables the capture of still shots or full-motion video clips that includes audio. Indeed, some of these telecommunication devices may be equipped with a camera and software application for making videoconference calls. Moreover, such telecommunication devices may also be capable of data connectivity by connecting to the Internet via a wired communication connection (e.g., Ethernet) and/or a wireless communication connection (e.g., Wi-Fi, 3G, edge, and/or the like). The embodiments as disclosed enable the users of such mobile devices to provide data assets to a law enforcement NOC described above. Such data assets may be provided in the form of live feeds, or pre-recorded video or still images. The data assets may depict persons (e.g., wanted suspects) or events (e.g., crime or disaster) that are of interest to law enforcement officials. It will be appreciated that the mobile devices are not limited to telecommunication devices, any other device that is capable of video capture and Internet connectivity may also be used for video emergency call.

Figure 15:
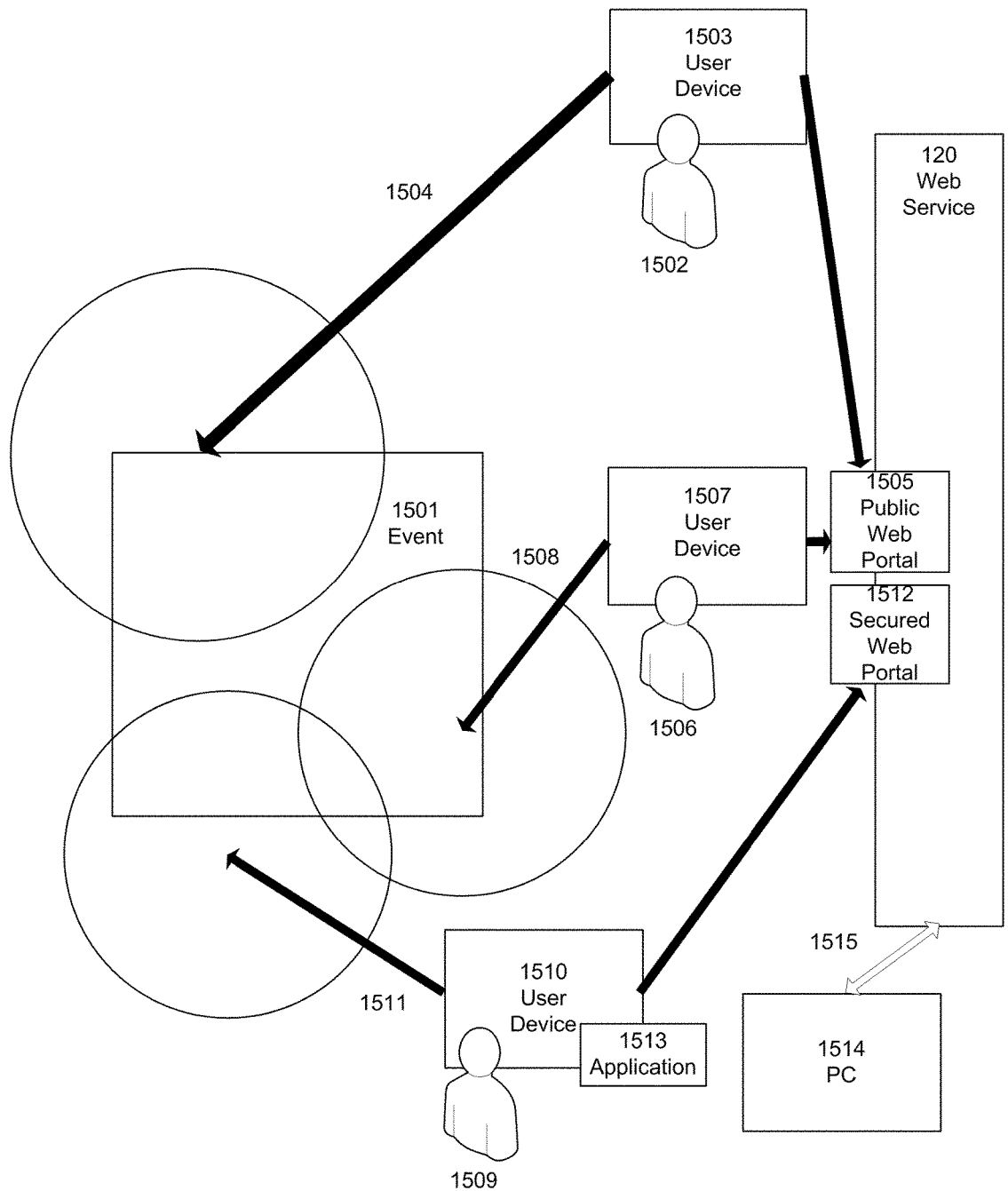
FIG. 15 is a diagrammatic illustration of a video 911 law enforcement architecture embodiment in which multiple witness are proximate to a scene where an event is taking place.

FIG. 15 is a diagrammatic illustration of a video 911 law enforcement architecture embodiment in which multiple witness are proximate to a scene where an event 1501 is taking place. For example, the event 1501 may be a crime that is in progress. A witness 1502 with a user device 1503 may arrive at the vicinity of the event 1501 and is capturing the event with the device. The user device 1503 may be a telecommunication device that is only capable taking still shots 1504. After taking a series of still shots, the witness 1502 may upload the still shots 1504 to the web service 120 via the Internet. The web service 120 may provide a public web portal 1505 (e.g., a website or file transfer site) that enables the witness 1502 to upload the still shots from the user device 1503 via a web browser. As described above with respect to FIG. 2, the uploaded still shots 1504 may be stored in the central store 150 for further analysis. The public web portal 1505 may be designed to enable the witness 1503 to upload the still shots 1504 anonymously, that is, without having to provide any personal information during the upload process. However, as further described below, the NOC may be equipped with tools that are capable of ascertaining an identifier of the user device 1503, and thus, in some cases, the identity and contact information of the witness 1502.

In instances in which the public web portal 1505 is a webpage, the webpage may further include a text input field that enables the user 1502 to provide additional information regarding the event 1501 (e.g., a description of another suspect that is not captured by the still shots 1504, contact information of the witness 1502, etc.) Alternatively, the web site may display a unique SMS number for the witness 1502 to use in order to provide additional information related to the still shots 1504 and/or contact information of the witness 1502. Similar to previously described, the web service 120 may correlate the information provided by the witness 1502 as metadata to the still shots 1504.

In an instance that the witness 1502 has supplied contact information, the public web portal 1505 may provide the witness 1502 with the option to receive one or more future updates regarding the status of the event 1501. For example, the public web portal 1505 in the form of a webpage may include a check box that enables the witness 1502 to opt to receive SMS text updates or email on the status. In another example, the webpage may include a link to a webpage or a SMS number to text to receive the updates on the status.

A witness 1506 may arrive at the event 1501 with a user device 1507. The user device 1507 may have the ability to record full-motion video 1508, with or without audio. As such, the witness may upload the full-motion video 1508, which may include audio, to the web service 120 via the public web portal 1505. As described above, the public web portal 1505 may provide ways for the witness 1506 to supply additional information related to the full-motion video 1508, and/or obtain a future status report on the status of the event 1501.

Alternatively, in an instance in which the user device 1507 is capable of making a web video call, the public portal 1504 may enable the witness 1506 to place the web video call to a law enforcement official (e.g., live emergency operator). In such an instance, the witness 1506 may direct a camera of the user device 1507 to capture the event 1501 and feed the capture full-motion video 1508 in real time for viewing by the law enforcement official and/or storage in the central store 150 for further analysis. Since the witness 1506 is also able to verbally communicate with the law enforcement official during the video call, the witness 1506 may also provide additional information related to the full-motion video 1508. Thus, the web service 120 may correlated the information provided by the witness 1506, whether as raw audio, or transcribed into text, as metadata to the full-motion video 1508.

While the witness 1506 may have the option of remaining anonymous by not providing any personal information during the upload the full-motion video 1508, the web service 120 may be equipped with tools that are capable of ascertaining an identifier of the user device 1503, and thus, in some cases, the identity and contact information of the witness 1502.

A witness 1509 may also arrive at the event 1501 with a user device 1510. The user device 1510 may be capable of capture video data 1511 in the form of still shots or full-motion video, which may also be accompanied by audio. The user device 1510 may be pre-registered with the web service 120 so that the identity of the user device 1510 and/or the identity and contact information of the user 1509 are known to the NOC. For example, the witness 1509 may be a neighborhood watch volunteer who has underwent a background check with the law enforcement authority operating the NOC and is deemed as a reliable source of information.

When the witness 1509 has acquired such status, the web service 120 may provide a secure web portal 1512 for the upload of the video data 1511 from the user device 1510 via a web browser. In some instances, the web portal 1512 may be a webpage or a file transfer site. As part of accessing the secure web portal 1512, the web service 120 may automatically ascertain the identity of the user device 1510 and the witness 1510. In other instances, the secured web portal 1512 may be set up to request that the witness 1510 supply authentication information (e.g., password, biometric information, etc.) prior to uploading the video data 1511. Since the video data 1511 is from the registered witness 1509, the web service 120 may give priority to the analysis of the video data 1511, or at least alert NOC personnel of the special status of the video data 1511. The secure web portal 1512 in the form of a webpage may include a text input field for the witness 1509 to enter additional information related to the video data 1511, and/or display a SMS number for the witness 1509 to use to provide additional information related to the video data 1511. Further, the webpage may include a check box that enables the witness 1509 to opt to receive SMS text updates on the status of the event. In another example, the webpage may include a link to another webpage or a SMS number to text to receive the updates on the status.

In some instances, because of the registered status of the witness 1509, the user device 1510 may be provided with an application 1513. The application 1513 may be tailored for installation on the user device 1510 based on the hardware and/or software specifications (e.g., operating system, memory capacity, etc.) of the user device 1510. The application 1513 may be designed to streamline the process of uploading the video data 1511 to the web service 120 via the secure web portal 1512. For example, the application 1513 may be configured to automatically initiate the camera for recording of the video data 1511 upon activation. The application 153 may also include a custom user interface with options such as "record", "stop", "upload", "login", and "status info" that minimizes the number of steps performed on the user device 1510 to upload the video data 1511 and/or receive status information. Each of the various options may activate a select menu that enables the user 1509 to specifically select a video data for interaction.

In additional instances, because of the registered status of the witness 1509, the user device 1510 may be the mobile client 500 described in FIG. 5. As such, the witness 1509 may receive special training on the use of the mobile client 500, For example, the witness 1509 may receive training on the button entry function 552 and the hotkeys 553. While the user devices in the FIG. 15 in the context of telecommunication devices and mobile devices, it will be appreciated that the user device are not intended to be limited to such devices. In fact, any user device that has the ability to capture audio data and/or video data, as well as ability to upload such data to the web server 120 via a wireless or wired connection may be used in the context of the architecture embodiment described in FIG. 15.

As further described below in FIG. 16, the audio data and video data captured from the various user devices may be analyzed via the web service 120 and analysis and dispatch tools that reside on a PC 1514 that is linked to the web service 120 via a data link 1515.

Figure 16:
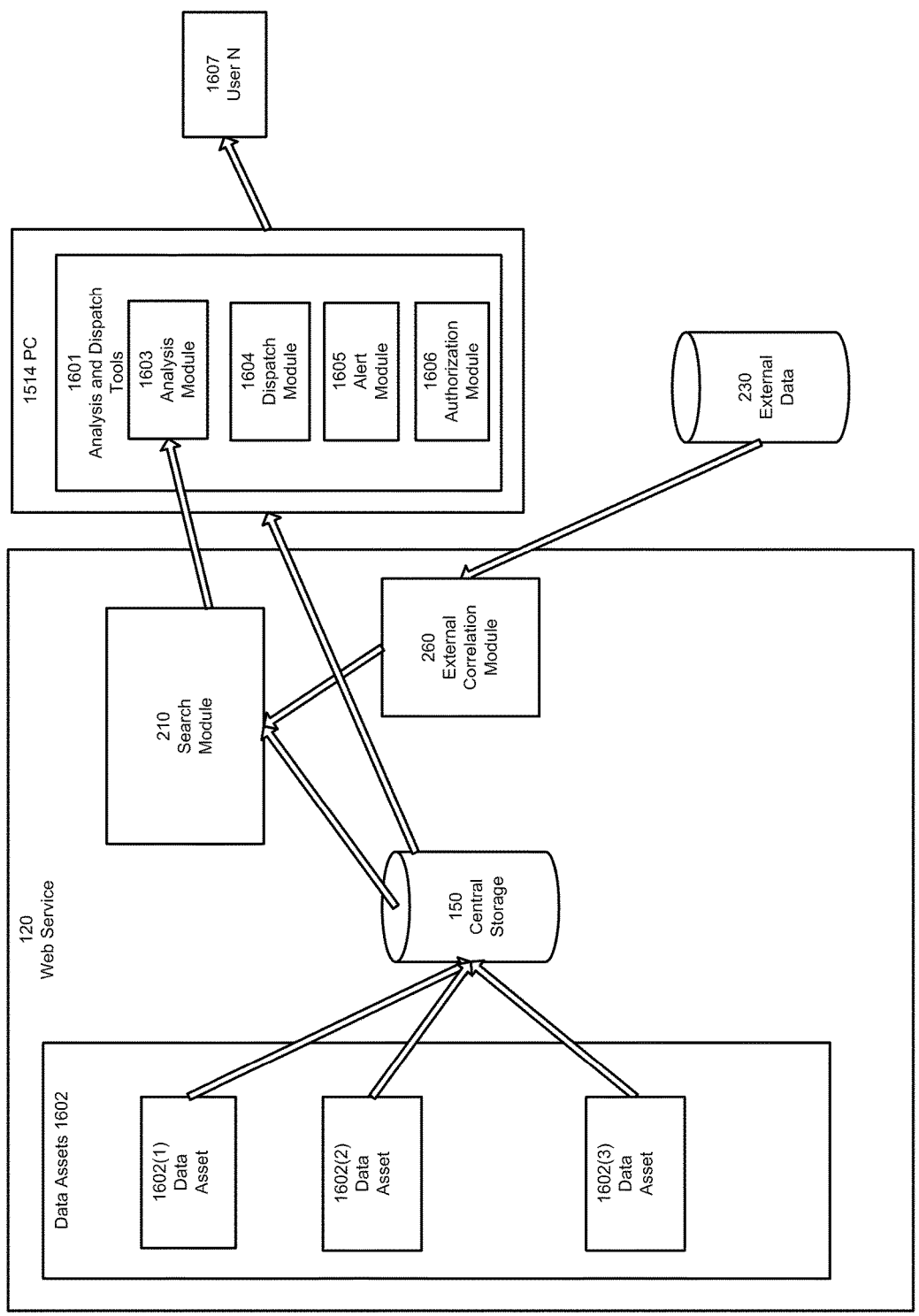
FIG. 16 illustrates an exemplary use of a web service in conjunction with the analysis and dispatch tools to analyze captured data assets for dispatching one or more responders to an event.

FIG. 16 illustrates an exemplary use of the web service 120 in conjunction with the analysis and dispatch tools 1601 to analyze captured data assets 1602 for dispatching one or more responders to an event. For example, the data assets 1602 stored in the central storage 150 may include a data asset 1602(1) that contains the still shots 1504, and may further include corresponding audio and/or metadata. The data assets 1602 may further include a data asset 1602(2) that contains the full-motion video 1508, and may further include corresponding audio and/or metadata. The data assets 1602 may further include a data asset 1602(3) that contains the video data 1511, which may further include corresponding audio and/or metadata The analysis and dispatch tools 1602 may include an analysis module 1603, a dispatch module 1604, an alert module 1605, and an authorization module 1606. The different modules may be implemented as different dynamic link libraries (DLLs) within a single application, or as separate plug-ins from a browser.

(i) The analysis Module

The analysis module 1603 may analyze each of data assets 1602 for relevant information that assists in the determination that one or more responders are to be dispatched to an event shown. The analysis module 1603 may read any embedded metadata related to the time and date information, as well as location information associated with each data asset 1602. For example, each of the still shots 1504 in the data asset 1602(1) may include time and date information related to when each still shot 1504 is taken, as well as a metadata data, such as global position data, regarding the location each shot is taken. In some instances, once the time and date information and/or geolocation data of a particular data asset 1602 is ascertained, the analysis module 1603 may invoke the correlation and presentation tool 220 to determine whether the particular data asset 1602 is to be correlated with other data assets stored in the central storage 150. For example, based on the time and data information and the geolocation data of each, the still shots 1504, the full-motion video 1108, and the video data 1511 may be correlated together as depicting the event 1501.

In another example, a data asset 1602 may be a newly uploaded full-motion video of the event 310 that was previously captured by police officers via the mobile device 321 and the mobile device 322. As such, based on the time and data information and the geolocation data of the data asset 1602, the correlation and presentation tool 220 may correlate the data asset 1602 with data assets that are captured by the mobile device 321 and the mobile device 322.

In an event that a data asset 1602 does not contain any geolocation data, the analysis module may invoke the search module 210 and the external correlation module 260 to attempt to ascertain the location depicted in the data asset. For example, the external data store 230 may contain images of known locations. Accordingly, the analysis module 1603 provide a query to the search module 210 to cause the external correlation module 260 to perform image recognition comparison between the objects and/or landmarks captured in a data asset 1602 and the object and/or land marks depicted in the images stored in the external data store 230. In this way, it may be possible to pinpoint the location depicted in the data asset.

The analysis module 1603 may use the search module 210 and the external correlation module 260 to perform image recognition to determine if any known suspects or persons of interest are depicted in the data asset 1602. For such a purpose, the external data store 230 may store images of known suspects or persons of interest.

Further, the analysis module 1603 may further screen the images for events that may warrant a dispatch of one or more responders (e.g., crime in progress). For example, the analysis module 1603 may be programmed to recognize certain images as captured in the data asset 1602 such as muzzle flashes, explosions, smoke, vehicles, or people that are rapidly moving, and/or the like. The analysis module 1603 may also be programmed to recognize certain audio as captured in the data asset 1602, such as gunfire noise, screams, alarms, and/or the like. As further described below, the presence of such images or audio may result in an automatic dispatch of the one or more responders by the dispatch module 1604.

The analysis module 1603 and/or the external correlation module 260 may perform the image recognition and screening tasks via classifiers. Various classification schemes (explicitly and/or implicitly trained) and/or systems (e.g., support vector machines, neural networks, expert systems, Bayesian belief networks, fuzzy logic, data fusion engine, and/or the like) may be employed in connection with performing the image recognition and or screening tasks.

A classifier is a function that maps an input attribute vector, $x=(x1, x2, x3, x4, x_n)$, to a confidence that the input belongs to a class, that is, $f(x)=confidence(class)$. Such classification may employ a probabilistic and/or statistical-based analysis (e.g., factoring into the analysis utilities and costs) to predict or infer an action that a user desires to be automatically performed. A support vector machine (SVM) is an example of a classifier that may be employed. The SVM operates by finding a hypersurface in the space of possible inputs, which hypersurface attempts to split the triggering criteria from the non-triggering events. Other directed and undirected model classification approaches include, e.g., naïve Bayes, Bayesian networks, decision trees, neural networks, fuzzy logic models, and probabilistic classification models providing different patterns of independence may also be employed.

The analysis module 1603 may further generate metadata for each data asset 1602 for which image recognition and screening tasks are performed. For example, the analysis module 1603 may assign a metadata label of "explosion" to the event captured by the data asset 1602. As further described below, the analysis module 1603 may receive metadata that is entered by a user 1607 of the PC 1514 regarding each data asset 1602. The user 1607 may be a law enforcement official on duty at the NOC.

Thus, the analysis module 1602 may invoke the correlation and presentation tool 220 to correlate the event captured in the data asset 1602 to older events stored in the central storage 150 based on at least one of (1) metadata embedded in the data asset 1602; (2) metadata related to the data asset 1602 as entered by a witness who provide the data asset 1602; and/or (3) metadata related to the data asset 1602 as entered by the user 1607. Based on such correlation, the correlation and presentation tool 220 may ascertain past events, as captured in other data assets, which share similarities with the event captured in the data asset 1602. In a scenario in which the events are crimes, the metadata stored in the central storage 150 may indicates persons of interest associated with these past events. As further described, the one or more responders (e.g., police officers) dispatch to a location of the event captured in the data asset 1602 may be informed to look out for the persons of interest.

In instances in which a witness that provided a data asset 1602 also provided witness identity and contact information, the data analysis module 1603 may append the witness and identity contact information as metadata to the data asset 1602. However, the analysis module 1603 may also track and store Internet Protocol (IP) address, header, and/or packet information of the data in a data asset 1602 as associated metadata. Further, the analysis module 1602 may include a built-in function, or has the ability to call an external function that traces an IP address to an Internet Service Provider (ISP) that facilitated the transfer of the data asset 1602 from a mobile device to the NOC. In some instances, the NOC may have a relationship with the ISP such that the data analysis module 1603 may automatically obtain from the ISP the identity of the mobile device and/or identity and contact information of a person who owns the mobile device that uploaded the data asset 1602, upon showing of proper legal authorization. The analysis module 1602 may append such information to the data asset 1602 to facilitate location of the witness who provided the data asset 1602.

(ii) The Dispatch Module

The dispatch module 1604 may automatically dispatch one or more responders based on the event depicted in one or more data assets 1602, taking into consideration the time and data associated with the depicted event. For example, the analysis module 1603 may indicate that a certain event is captured in a data asset (e.g., gunfire noise), and a certain wanted suspect is capture by the data asset 1602 as being at the location of the event, as indicated by image recognition. Accordingly, the dispatch module 1604 may automatically dispatch one or more responders (e.g., police officers) to the location of the event when the captured event occurred within a predetermined time period (e.g., 15 minutes) of the current time. On the other hand, if the capture event is a "stale event" that occurred outside of the predetermined time period (e.g., 24 hours ago), it may be a waste of resources to automatically dispatch responders. In such a case, as described below, the data asset 1602 may be displayed on a visual display as a "stale event", so that a dispatcher may make a decision as to the dispatch of personnel to the location.

However, in other scenarios, the capture of a certain event (e.g., gunfire noise) at a location or the indication of a wanted suspect is at the location may be sufficient to trigger an automatic dispatch of one or more responders, assuming the event or wanted suspect is captured within the predetermined time period of the current time. In still other scenarios, the dispatch module 1604 may automatically dispatch one or more responders when the number of data assets 1602 depicting an event that is occurring at a particular time within the predetermined time period reaches a predetermined threshold (e.g., 10 data assets), regardless of the exact nature of event. In such a scenario, the assumption may be that the event has gained sufficient notoriety as an event 1501 that an official response is warranted.

During automatic dispatch, the dispatch module 1604 may dispatch one or more responders (e.g., police officers) within a predetermined range of the location of the event. However, if there are no responders available or an insufficient number of responders available within the predetermine range, the dispatch module 1604 may progressively increase the range until a predetermined number of responders are responding to the location. For example, the dispatch module 1604 may be preconfigured to send three responders to an event that involves gunfire noise, two responders to an event that involves an alarm, and one responder to an event that involves a scream. Moreover, the predetermined range to the location of the event may also vary according to the type of event. For example, the dispatch module 1604 may attempt to dispatch available responders within a 10-block radius of an event that involves a scream, dispatch available responders within a 20-block radius of an event that involves an alarm, and dispatch available responders within a 30-block radius of an even that involves gunfire noise.

However, in other configurations, the dispatch module 1604 may dispatch responders such that the number of responders is proportional to the number of data assets received that capture the event. In other words, the more numerous the data assets that capture the event, the greater the number of responders dispatched to the location of the event.

As for a data assets 1602 in which the nature of the event cannot be determined by the analysis module 1603, but the data asset 1602 is captured within a predetermined time period, the dispatch module 1604 may mark the data asset 1602 with a "to be reviewed" indicator and display the data asset 1602 for review by the user 1607. Following review, the user 1607 may determine whether the dispatch of personnel to the location of the event is warranted. Further, a data asset 1602 from a pre-registered device, such as video data 1511 from the user device 1510, may be marked with a "priority review" indicator to alert the user 1607 to prioritize review of the video data 1511.

However, the dispatch module 1604 may also be set so that it will not automatically dispatch any responders. Rather, the dispatch module 1604 may present each data asset for review by the user 1607. The dispatch module 1604 may also provide the user 1607 with the ability to alter or override any automatic dispatch decisions made by the dispatch module 1604, such as canceling the automatic dispatch or altering the number of responders to dispatch.

(iii) The Alert Module

The alert module 1605 may generate a map display showing associated data assets 1602 that capture the same event. The data assets 1602 included in the map display may be manually associated via an Event ID, as previously described, that is assigned by the user 1607. Alternatively, the data assets 1602 included in the map display may also be associated by the correlation and presentation tool 220 based on the location and time and date information obtained from each data asset by the analysis module 1603. The map display may be displayed as map 1650 as described below in FIG. 16.

For each data asset 1602, the map display may show a marker that indicates the location from which the data asset was captured, the time and date the capture of the data asset was initiated and/or terminated, the identity and contact information of the witness associated with the mobile device that provided the data asset, whether the data asset was capture by an anonymous mobile device or pre-registered electronic, and/or the like.

In some instances, the alert module 1605 may present the map display at the NOC. In other instances, the alert module 1605 may make the map display available to a witness who accesses the public web portal 1505 and the secure web portal 1512 as part of a status update. In this way, an interested witness who uploaded one of the associated data assets 1602 that captures the event is able to see who else has reported the same event. For example, the witness may navigate a web browser to the public web portal 1505 or the secure web portal 1512 to download the map display. The alert module 1605 may "sanitize" the map display that is provided to the witnesses such that the identity of the other witnesses and/or the identity of other mobile devices that uploaded the associated data assets are not revealed, or only selectively revealed.

The alert module 1605 may also activate selected cameras of the mesh of cameras described above. In a circumstance that the analysis module 1603 determines that an event captured in an original data asset 1602 occurred with a predetermined time period of a current time, the alert module 1605 may automatically activate camera of the mesh that are within a predetermined range (e.g., ¼ mile) of the location of the event. In further instances, the selected cameras may be activated when in addition to the fact that the event captured in an original data asset 1602 occurred with a predetermined time period of a current time, the event is of a type determined by the analysis module 1603 as warranting automatic dispatch of personnel. The alert module 1606 may also provide the user 1607 with the ability to manually activate selected cameras of the mesh of cameras, alter or cancel the activation of each camera in the mesh, or modify the range of camera activation.

The newly activated cameras of the camera mesh may provide data assets that include both still shots and full-motion video. The data assets acquired by the newly activated cameras of the camera mesh may be displayed to the user 1607 at the NOC, and/or analyzed by the analysis module 1603 in the same manner as the original data asset.

Alternatively or concurrently, the alert module 1605 may also selectively activate the cameras on the mobile client 500 that are worn by police officers and/or the cameras on the pre-registered user devices (e.g., user device 1511) of witnesses who are within a predetermined range of the location of the event. As with the cameras in the mesh, the alert module 1606 may also provide the user 1607 with the ability to manually activate selected cameras within the predetermined range, alter or cancel the activation of each camera within the predetermined range, or modify the range of camera activation.

The alert module 1603 may further enable the user 1607 to generate an alert message that is to be broadcasted to subscribers of a message service maintained by the NOC. To this end, the user 1607 may generate the alert message via an alert edit box that is similar in function to the commentary edit box 1230 shown in FIG. 12A. The message service may be a micro blog (e.g., Twitter™), an email distribution service, and/or the like. The user 1607 may compose a message that includes a description of an event captured in a data asset 1602. The description of the event may further include description of a person of interest, a picture of the personal of interest, and/or information useful for tracking down the person of interest (e.g., vehicle description, license plate number, etc.). the alert message may further include a request for additional information related to the event or person of interest, including contact information of the law enforcement officials at the NOC. The alert message may also include a link to a website operated by the NOC at which additional information may be found. The alert module 1603 may deliver the alert message to the subscribers via the messaging service. In the same manner, the alert module 1603 may also status reports composed by the user 1607, including any resolution of the event, to the subscribers via the message service. In some scenarios, the alert module 1603 may also send the status reports via email or SMS to a witness who provided a data asset 1602 related to the event, provided the witness opted to receive such updates as described above.

(iv) The Authorization Module

The authorization module 1606 may register the mobile devices of one or more witnesses. The registration of a mobile device enables the analysis module 1603 to identify the mobile device as an authorized device, so that the identity of the witness who possesses the authorized device may be easily obtained. Moreover, any data asset 1602 that is captured by the authorized device may be given priority analysis by the analysis module 1603 or priority manual review by the user 1607. The witness who possesses an authorized device may be requested to authenticate to the authorization module 1606 prior to being granted the ability to upload a video assert. In this way, the authorization module 1606 may ensure that the witness is an actual authorized operator of the authorized device to prevent the authorized device from falling into the wrong hands.

It will be appreciated while the analysis and dispatch tools 1601 is depicted as having modules 1603-1206, each of the modules 1603-1606 may be divided into any number of sub modules. Conversely, any plurality of the modules 1603-1606 may be combined into a single module. Accordingly, the modules 1603-1606 are show as an exemplary embodiment of the analysis and dispatch tools 1601, rather than a limiting embodiment.

Figure 17:
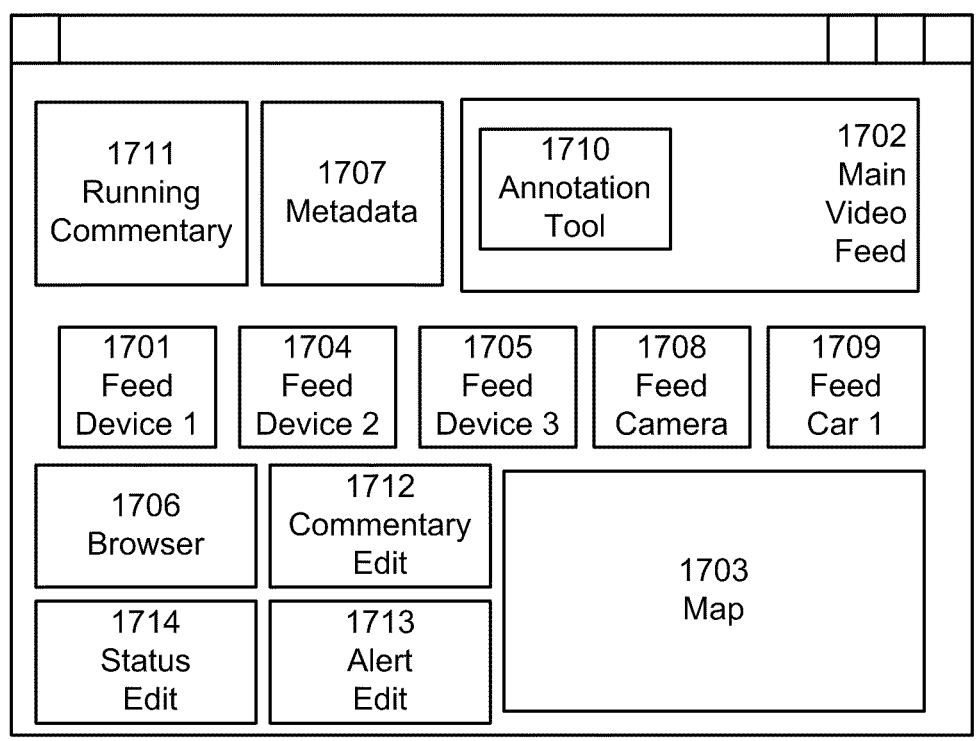
FIG. 17 is a diagrammatic illustration of an exemplary non-client software application in accordance with various embodiments for managing witness data assets.

FIG. 17 is a diagrammatic illustration of an exemplary non-client software application in accordance with various embodiments for managing witness data assets. The non-client software application may provide a command interface that is viewable at a network operations center ("NOC") of a law enforcement agency. The non-client software application may present the command interface to the user 1607, as well as receive input from the user 1607. The command interface may show various feeds, including still shots, full-motion images, which may include audio, that are coming from mobile devices of various witnesses. The NOC may start an incident record as a first feed 1701 is received and determined, either manually by the user 1607 or by the analysis module 1603, as capturing an event that warrants a response. Because it is the first feed, it also appears in the main video feed 1702. The incident ID may be used as an Event ID. The map 1703 may center on the location captured by the first feed 1701, with an indicator showing the location. As additional feeds 1704 and 1705 are identified by the analysis module 1603 and/or the correlation and presentation tool 220 as capturing the same event or having video data from the same proximate location, the map 1702 may also show the locations of those feeds.

If the data asset shown in the first feed 1701 is of a past event for which a case file has already been establish, browser 1706 can bring up data from the law enforcement's case database. All media files with the Event ID may then be automatically tagged with the Case ID from the case database. In this way, data from the case database may be provided in an integrated view along with the data asset.

The user 1607 may view the feeds to determine if the feeds indeed capture the same event. When the user 1607 determines that a feed does not actually capture the same event, the user 1607 may dismiss the feed. For example, the user 1607 may close the feed 1705 when the feed 1705 is determined to not capture the same event. The metadata window 1707 may display any metadata associated with the main video feed 1702. The metadata presented by the metadata window 1707 may include an identity of the mobile device and/or an identity of a witness associated with the main video feed 1702. The metadata window 1707 may also display any additional information provided by the witness regarding main video feed 1702.

When the alert module 1605 automatically activates a camera in the vicinity of the event, the feed from the camera may show up as feed 1708. It will be appreciated that while only feed 1708 is depicted, there may be multiple camera feeds from the camera mesh previously described. Further, when the dispatch module 1604 or the user 1607 dispatches one or more responders to the location of the event, any video and/or audio data from a client device of each responder (e.g., police officer) may be presented as feed 1709. Once again, it will be appreciated that while only feed 1709 is depicted, there may be multiple multimedia feeds from the different responders (e.g., different police officers).

The user 1607 may select each of the feeds 1701, 1704, 1705, 1708, and 1709 for display in the main video feed 1702 for closer inspection or if one of the feeds 1701, 1704,1705, 1708, and 1709 shows a better perspective of the event. Annotation tools 1710 enables the user 1607 to select one or more frames of running video, superimpose text, links, or other content, perhaps associating to a single object, such that the annotations render upon playback. Running commentary box 1711 provides a control with which to view commentary and commentary edit box 1712 provides a place to add additional commentary. Commentary text is persisted to a database and is associated with the data asset displayed. Commentary is distinct from annotation in that the text is visible at all times in the running commentary box 1711 during rendering, whereas annotation only appears for specific frames and is superimposed over video as rendered in the main video feed 1702.

The alert edit box 1713 may enable the entry of alerts that are broadcasted to the subscribers via the alert module 1605. The alert may include descriptions that are relevant to an event, as well as requests for information related to the event. Likewise, the status edit 1714 may enable the entry of status, including resolution of the event, to witnesses that contributed data assets related to the event and who also opted to receive status updates.

Figure 18:
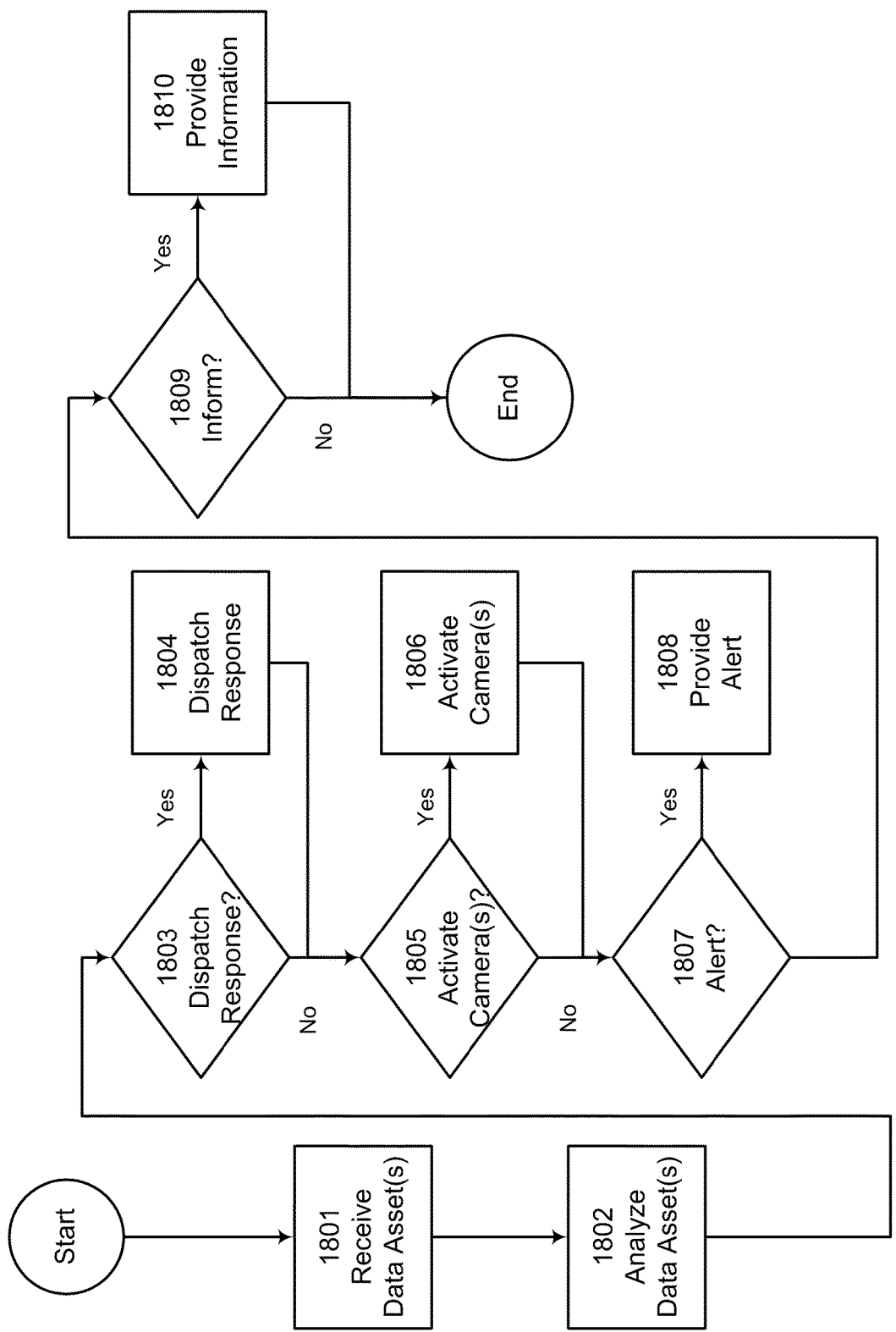
FIG. 18 illustrates an exemplary method for responding to a video emergency call.

FIG. 18 illustrates an exemplary method for responding to a video emergency call. In step 1801, the NOC may receive one or more data assets. The data assets may include still shots and full-motion videos. The data assets may be received from anonymous mobile device and/or wirelesses devices that are pre-registered with the NOC as authorized devices.

In step 1802, the NOC may employ the correlation and presentation tool 220 and/or the analysis and dispatch tool 1601 to analyze the received data assets. Each of the data assets may be analyzed to determine (1) whether the data asset captured an event that warrants the dispatch of responders; (2) whether the capture event occurred within a predetermined time period of the current time; and (3) location of the event.

Further analysis may include whether a data asset depicts the same event as another data asset, in which case the data assets may be correlated into a single case or incident. Further analysis may also include whether the capture event correlates with any past event, i.e., whether it is a previously unavailable footage of a past event, or correlates in pattern with a past event. Metadata that is embedded in data assets, and/or data assets submitted as supplementation to the data assets, may be used in such analysis. Based on such analysis, one or more persons of interests (e.g., suspects) may be developed. Various screening and correlation techniques (e.g., image or audio recognition) may be employed to facilitate such determinations.

In decision step 1803, a decision may be made at the NOC as to whether to dispatch one or more responders. The automatic dispatch of the responders may be triggered when the use of analysis and dispatch tool 1601 and/or the correlation and presentation 220 determines that a particular type of event occurred (e.g., gunfire noise, alarm, scream), or a predetermined number of data assets related to the event are received. The actual number of responders to be automatically dispatched may be based on the type of the event or the number of the event-related data assets received. Responders within a predetermined range of the event may be dispatched. The predetermined range may be progressively increased until a sufficient number of responders are dispatched to the location of the event. In some instances, the one or more dispatched responders may be informed by the NOC to be on the lookout for one or more persons of interest (e.g., suspects) that have been determined to be possibly associated with the event. The automatic dispatch decision may be performed by the dispatch module 1604. However, the automatic dispatch decision may be altered or overridden by the user 1607 at the NOC. The user 1607 may also independently decide whether to dispatch one or more responders independently of the dispatch module 1604.

If a decision is made at the NOC that one or more responders are to be dispatched, the appropriate number of responders may be dispatched at step 1804. Each dispatched responder may be equipped with a client device, such as the mobile client 500. The feed from such a mobile client 500 may be further correlated and analyzed in combination with the event.

Otherwise, at decision step 1805, a decision as to whether to activate cameras that are within a predetermined range of the location of the event may be made at the NOC. The camera may include cameras in a mesh, cameras on the mobile clients 500, and/or cameras on the pre-registered user devices (e.g., user device 1511). The decision may be made automatically by the alert module 1605 based on whether the event captured in a data asset 1602 is an actionable event that warrants the dispatch of responders and/or whether the event occurred within a predetermined time period of a current time. The decision may also be made by the user 1607 at the NOC based on a manual review of the data asset 1602. The user 1607 may also alter or override any automatic activation of cameras by the alert module 1605. If a decision is made at the NOC that one or more cameras are to be activated, the appropriate number of cameras may be activated at step 1806. Each of the activated cameras may be a still shot camera or a full-motion video camera.

Otherwise, at decision step 1807, a decision may be made at the NOC as to whether at least one alert message is to be sent regarding the event. Each alert message may be sent to subscribers via a micro blog, an email distribution, a SMS message service, and/or the like. The decision to send each alert message may be made by the user 1607 at the NOC. An alert message may include a description of an event captured in a data asset 1602. The description of the event may further include information related to a person of interest (e.g., vehicle description, license plate number, etc.). the alert message may further include a request for additional information related to the event or person of interest, including contact information of the law enforcement officials at the NOC. An alert message may also describe an outcome or resolution to the event. If a decision is made at the NOC that at least one alert message is to be sent, the at least one message may be sent at step 1808.

Otherwise, at decision step 1807, a decision may be made at the NOC as to whether witnesses who provide data assets 1602 capturing the event are to be provided with further information regarding the event. The information may include status reports. Each status report may be sent to subscribers via, an email distribution or a SMS message service, and or the like. Additionally, the status report may be made available at a website that is provided by the NOC, in which the link of the website is made available to each witness. The status reports may include the same information as the alert message, or different message content. Alternatively or in combination, the information may include generated maps of all witnesses who provided data assets 1602 related to the event. The generated maps may be made available on the website or emailed to each witness who provided a data asset 1602 that is related to the event, and who also opted to receive such maps. In addition, a witness with an authorized device may also directly access the status report and generated via an application on the authorized device. Accordingly, if a decision is made at the NOC that further information is to be sent, the information may be send to the one or more witnesses at step 1810.

It will be appreciated that while responders have been discussed above in the context of police officers, other professionals may also serve as responders in different situations. These other professionals may include, but are not limited to, medical personnel, firefighting personnel, military personnel, and/or others.

The descriptions of the above scenarios are not intended to be an exhaustive list of uses of the present embodiments and are only some of the many possible applications made possible.

Conclusion

In compliance with the statute, the subject matter of this application has been described in a language more or less specific as to structure and method features. It is to be understood, however, that the embodiments are not limited to the specific features described, since the disclosure herein comprise exemplary forms of putting the present embodiments into effect. The present embodiments are, therefore, claimed in any of its forms or modifications within the proper scope of the appended claims appropriately interpreted in accordance with the doctrine of equivalents and other applicable judicial doctrines.

I claim:

1. One or more non-transitory computer readable media storing computer-executable instructions that, when executed, cause one or more processors to perform acts comprising:
    determining a distance between a mobile client that captures video and audio data and a recipient device, the distance corresponding to a quality of a communication connection between the mobile client and a recipient device, the recipient device being a repeater base station in a vehicle that amplifies a data signal from the mobile client for transmission to a network operations center (NOC);
    transmitting full-motion video and full-quality audio captured by the mobile client along with metadata generated at the mobile client to the recipient device when the distance corresponding to the quality of the communication connection has yet to reach an initial distance threshold for the distance between the mobile client and the recipient device;
    providing one or more timing commands to a camera of the mobile client such that a number of still shots captured by the camera of the mobile client based on the one or more timing commands is inversely proportional to the distance between the mobile client and the recipient device; and
    transmitting at least one still shot and the full-quality audio captured by the mobile client and the metadata to the recipient device when the distance corresponding to the quality of the communication connection reaches the initial distance threshold for the distant between the mobile client and the recipient device.

2. The one or more non-transitory computer readable media of claim 1, further comprising instructions that when execute, cause the one or more processors to perform additional acts comprising:
    transmitting only full-quality audio and the metadata to the recipient device when the distance corresponding to the quality of the communication connection reaches a second distance threshold for the distance between the mobile client and the recipient device that is larger than the initial distance threshold;
    transmitting only downgraded audio captured by the mobile client and the metadata to the recipient device when the distance corresponding to the quality of the communication connection reaches a third distance threshold for the distance between the mobile client and the recipient device that is larger than the second distance threshold;
    transmitting only the metadata to the recipient device when the distance corresponding to the quality of the communication connection reaches a fourth distance threshold for the distance between the mobile client and the recipient device that is larger than the third distance threshold; and terminating the transmitting of the metadata when the distance that corresponds to the quality of the communication connection reaches a fifth distance threshold for the distance between the mobile client and the recipient device that is larger than the fourth distance threshold.

3. The one or more non-transitory computer readable media of claim 1, further comprising instructions that when executed, cause the one or more processors to perform an act of presenting a playback of the full-motion video that is temporally synchronized with the audio or presenting a playback of a plurality of still shots that are temporally synchronized with the audio.

4. The one or more non-transitory computer readable media of claim 1, wherein the metadata is inputted by an operator of the mobile client or automatically generated by the mobile client.

5. The one or more non-transitory computer readable media of claim 1, wherein the transmitting the at least one still shot includes transmitting a plurality of still shots that are associated with an event in a group.

6. A mobile device, comprising:
a processor; and
memory storing computer-executable components that are executed by the processor to perform a plurality of actions, the actions comprising:
determining a distance between a mobile client that captures video and audio data and a recipient device, the distance corresponding to a quality of a communication connection between the mobile client and a recipient device, the recipient device being a repeater base station in a vehicle that amplifies a data signal from the mobile client for transmission to a network operations center (NOC); and
transmitting full-motion video and full-quality audio captured by the mobile client along with metadata generated at the mobile client to the recipient device when the distance corresponding to the quality of the communication connection has yet to reach an initial distance threshold for the distance between the mobile client and the recipient device;
providing one or more timing commands to a camera of the mobile client such that a number of still shots captured by the camera of the mobile client based on the one or more timing commands is inversely proportional to the distance between the mobile client and the recipient device; and
transmitting at least one still shot and the full-quality audio captured by the mobile client and the metadata to the recipient device when the distance corresponding to the quality of the communication connection reaches the initial distance threshold for the distance between the mobile client and the recipient device.

7. The mobile device of claim 6, wherein the actions further comprise:
transmitting only full-quality audio and the metadata to the recipient device when the distance corresponding to the quality of the communication connection reaches a second distance threshold for the distance between the mobile client and the recipient device that is larger than the initial distance threshold;
transmitting only downgraded audio captured by the mobile client and the metadata to the recipient device when the distance corresponding to the quality of the communication connection reaches a third distance threshold for the distance between the mobile client and the recipient device that is larger than the second distance threshold;
transmitting only the metadata to the recipient device when the distance corresponding to the quality of the communication connection reaches a fourth distance threshold for the distance between the mobile client and the recipient device that is larger than the third distance threshold; and
terminating the transmitting of the metadata when the distance that corresponds to the quality of the communication connection reaches a fifth distance threshold for the distance between the mobile client and the recipient device that is larger than the fourth distance threshold.

8. The mobile device of claim 6, wherein the actions further comprise presenting a playback of the full-motion video that is temporally synchronized with the audio or presenting a playback of a plurality of still shots that are temporally synchronized with the audio.

9. The mobile device of claim 6, wherein the metadata is inputted by an operator of the mobile client or automatically generated by the mobile client.

10. The mobile device of claim 6, wherein the transmitting the at least one still shot includes transmitting a plurality of still shots that are associated with an event in a group.

11. A method, comprising:
determining a distance between a mobile client that captures video and audio data and a recipient device, the distance corresponding to a quality of a communication connection between the mobile client and a recipient device, the recipient device being a repeater base station in a vehicle that amplifies a data signal from the mobile client for transmission to a network operations center (NOC); and
transmitting full-motion video and full-quality audio captured by the mobile client along with metadata generated at the mobile client to the recipient device when the distance corresponding to the quality of the communication connection has yet to reach an initial distance threshold for the distance between the mobile client and the recipient device;
providing one or more timing commands to a camera of the mobile client such that a number of still shots captured by the camera of the mobile client based on the one or more timing commands is inversely proportional to the distance between the mobile client and the recipient device; and
transmitting at least one still shot and the full-quality audio captured by the mobile client and the metadata to the recipient device when the distance corresponding to the quality of the communication connection reaches the initial distance threshold for the distance between the mobile client and the recipient device.

12. The method of claim 11, further comprise:
transmitting only full-quality audio and the metadata to the recipient device when the distance corresponding to the quality of the communication connection reaches a second distance threshold for the distance between the mobile client and the recipient device that is larger than the initial distance threshold;
transmitting only downgraded audio captured by the mobile client and the metadata to the recipient device when the distance corresponding to the quality of the communication connection reaches a third distance threshold for the distance between the mobile client and the recipient device that is larger than the second distance threshold;

transmitting only the metadata to the recipient device when the distance corresponding to the quality of the communication connection reaches a fourth distance threshold for the distance between the mobile client and the recipient device that is larger than the third distance threshold; and terminating the transmitting of the metadata when the distance that corresponds to the quality of the communication connection reaches a fifth distance threshold for the distance between the mobile client and the recipient device that is larger than the fourth distance threshold.

13. The method of claim 11, further comprising presenting a playback of the full-motion video that is temporally synchronized with the audio or presenting a playback of a plurality of still shots that are temporally synchronized with the audio.

14. The method of claim 11, wherein the metadata is inputted by an operator of the mobile client or automatically generated by the mobile client.

15. The method of claim 11, wherein the transmitting the at least one still shot includes transmitting a plurality of still shots that are associated with an event in a group.

* * * * *